United States Patent [19]
Gopher et al.

[11] Patent Number: 5,642,108
[45] Date of Patent: *Jun. 24, 1997

[54] CHORDIC KEYBOARD SYSTEM FOR GENERATING A SIGNAL IN RESPONSE TO A CHORD THAT IS ASSIGNED USING A CORRELATION BASED ON A COMPOSITE CHORD-DIFFICULTY INDEX

[75] Inventors: Daniel Gopher, Tivon, Israel; John Hilburn; David Vicknair, both of Baton Rouge, La.

[73] Assignee: Infogrip, Inc., Ventura, Calif.

[ * ] Notice: The term of this patent shall not extend beyond the expiration date of Pat. No. 5,493,654.

[21] Appl. No.: 365,926

[22] Filed: Dec. 29, 1994

Related U.S. Application Data

[63] Continuation of Ser. No. 288,220, Aug. 9, 1994, Pat. No. 5,493,654, which is a continuation of Ser. No. 722,326, Jun. 28, 1991, abandoned.

[51] Int. Cl.⁶ ........................................ G06F 3/02
[52] U.S. Cl. .................... 341/22; 400/486; 400/489; 395/800; 395/887; 364/234; 364/DIG. 1
[58] Field of Search .................. 395/800; 400/486, 400/100; 364/709.16, 709.12; 341/22

[56] References Cited

U.S. PATENT DOCUMENTS

| | | |
|---|---|---|
| 2,319,273 | 5/1943 | Sterling . |
| 2,387,330 | 10/1945 | Johnson et al. . |
| 2,393,781 | 1/1946 | Johnson et al. . |
| 2,532,228 | 11/1950 | Hesh . |
| 2,717,686 | 9/1955 | Seeber, Jr. . |
| 3,022,878 | 2/1962 | Seibel et al. . |
| 3,225,883 | 12/1965 | Ayres . |
| 3,633,724 | 1/1972 | Samuel ............................. 400/485 |
| 3,833,765 | 9/1974 | Hilborn et al. ..................... 178/79 |
| 3,967,273 | 6/1976 | Knowlton ........................... 341/28 |
| 4,029,915 | 6/1977 | Ojima ............................ 364/709.15 |
| 4,042,777 | 8/1977 | Bequaert et al. .................. 178/79 |
| 4,067,431 | 1/1978 | Whitaker .......................... 400/485 |
| 4,081,068 | 3/1978 | Zapp ................................ 341/32 |
| 4,201,489 | 5/1980 | Zapp ............................... 400/485 |
| 4,211,497 | 7/1980 | Montgomery ....................... 400/486 |
| 4,344,069 | 8/1982 | Prame ............................. 341/26 |
| 4,360,892 | 11/1982 | Endfield ...................... 364/419.15 |
| 4,442,506 | 4/1984 | Endfield ........................... 341/22 |
| 4,443,789 | 4/1984 | Endfield ........................... 341/22 |
| 4,502,038 | 2/1985 | Lowenthal et al. ............... 341/26 |
| 4,516,939 | 5/1985 | Crimmins, Jr. ................... 434/114 |
| 4,549,279 | 10/1985 | Lapeyre ....................... 364/709.15 |
| 4,584,443 | 4/1986 | Yaeger ............................ 200/6 A |
| 4,638,306 | 1/1987 | Rollhaus et al. .................. 341/28 |
| 4,655,621 | 4/1987 | Holden ............................ 400/100 |

(List continued on next page.)

FOREIGN PATENT DOCUMENTS

| | | |
|---|---|---|
| 0 085 645 | 8/1983 | European Pat. Off. . |
| 0 279 553 | 8/1988 | European Pat. Off. . |
| 2 064 187 | 6/1981 | United Kingdom . |

OTHER PUBLICATIONS

David Raij et al., "Perceptual and Motor Determinants of Efficient Data Entry," Proceedings of the Human Factors Society, 31st Annual Meeting, 1987, pp. 820–824.

M. Gladwell, "Redesigning Illogical Keyboards," The Washington Post, Science Section, Sep. 18, 1989.

S. Owen, "Qwerty is Obsolete," Interface Age, Jan. 1978, p. 56.

J. Jedamus & G. Wheelwright, "Designing a Speedier Keyboard," Newsweek, May 12, 1986, p. 3.

(List continued on next page.)

*Primary Examiner*—Alyssa H. Bowler
*Assistant Examiner*—Walter D. Davis
*Attorney, Agent, or Firm*—Finnegan, Henderson, Farabow, Garrett & Dunner, L.L.P.

[57] ABSTRACT

An improved chordic keyboard system is disclosed. The chordic keyboard system is comprised of dual chordic keyboards wherein primary symbols are mapped based on a random access concept in accordance with the Gopher Correlation.

9 Claims, 15 Drawing Sheets

U.S. PATENT DOCUMENTS

| | | | |
|---|---|---|---|
| 4,680,572 | 7/1987 | Mequire et al. | 341/24 |
| 4,694,280 | 9/1987 | Rollhaus et al. | 341/26 |
| 4,737,040 | 4/1988 | Moon | 400/110 |
| 4,775,255 | 10/1988 | Langley | 400/485 |
| 4,791,408 | 12/1988 | Heusinkveld | 340/365 R |
| 4,804,279 | 2/1989 | Berkelmans et al. | 400/94 |
| 4,824,268 | 4/1989 | Diernisse | 400/486 |
| 4,833,446 | 5/1989 | Eilam et al. | 341/22 |
| 4,846,598 | 7/1989 | Livits | 400/472 |
| 4,849,732 | 7/1989 | Dolene | 341/20 |
| 4,891,777 | 1/1990 | Lapeyre | 364/706 |
| 4,897,649 | 1/1990 | Stucki | 341/22 |
| 4,911,565 | 3/1990 | Ryan | 400/100 |
| 4,913,573 | 4/1990 | Retter | 400/489 |
| 4,917,516 | 4/1990 | Retter | 400/489 |
| 5,006,001 | 4/1991 | Vulcano | 400/486 |
| 5,059,048 | 10/1991 | Sirkin | 400/486 |
| 5,184,315 | 2/1993 | Lapeyre | 364/709.16 |
| 5,267,181 | 11/1993 | George | 364/709.12 |

OTHER PUBLICATIONS

S. Dillingham, "Pressured Wrists Get Redesigned Keyboard," Insight On the News, Nov. 28, 1988, p. 45.

"Death of the Qwerty Keyboard," Design World, No. 8, 1985, pp. 36–43.

P.K.C. Maher & H.V. Bell, "The Man Machine Interface—A New Approach," 1976, pp. 122–125.

"A Computer in Every Hand," The Economist, Nov. 26, 1988, p. 76.

D. Gopher, "The Contribution of Vision-Based Imagery to the Acquisition and Operation of a Transcription Skill," Cognition and Motor Processes, 1984, pp. 195–208.

N. Rochester, F.C. Bequaert, & E.M. Sharp, "The Chord Keyboard," IEEE, Dec. 1978, pp. 57–63.

H.C. Ratz & D.K. Ritchie, "Operator Performance on a Chord Keyboard," Journal of Applied Psychology, vol. 45, No. 5, 1961, pp. 303–308.

L.R. Creamer & D.A. Trumbo, "Multifinger Tapping Performance as a Function of the Direction of Tapping Movements," Journal of Applied Psychology, vol. 44, No. 6, 1960, pp. 376–380.

J.I. Elkind & C.D. Forgie, "Characteristics of the Human Operator in Simple Manual Control Systems," IRE Transactions on Automatic Control May, 159, pp. 44–55.

K.H. Eberhard Kroemer, "Human Engineering the Keybord," Human Factors, 1972, 14(1), pp. 51–63.

I. Litterik, "Qwertyuiop—dinosaur in a computer age," New Scientist, Jan. 8, 1981, pp. 66–68.

D.E. Rumelhart & D.A. Norman, "Simulating a skilled Typist: A Study of Skilled Cognitive-Motor Performance," Cognitive Science, vol. 6, 1982, pp. 1–36.

D. Raij, D. Gopher & R. Kimchi, "Perceptual and Motor Determinants of Efficient Data Entry," Proceedings of the Human Factors Society, 31st Annual Meeting, 1987, pp. 820–824.

D. Gopher, D. Karis & W. Koenig, "The Representation of Movement Schemes in Long Term Memory: Lessons from the Acquisition of a Transcription Skill", Acta Psychologica 60, 1985, pp. 105–134.

D. Gopher, "Experiments with a Two Hand Chord Keyboard-The Structure and Acquisition Process of a Complex Transcription Skill", Report for the U.S. Office of Naval Research, Aug., 1986, pp. 1–63.

D. Gopher & D. Raij, "Typing with a Two-Hand Chord Keyboard: Will the Qwerty Becomes Obsolete?," IEEE Transactions on Systems, Man, and Cybernetics, vol. 18, No. 4, Aug. 1988, pp. 601–609.

Vatell Corporation, "Tests of a Ternary Chord-Type Keyboard," Final Report, 1987, pp. 1–65.

H.M. Bowen & G.V. Guinness, "Preliminary Experiments on Keyboard Design for Semiautomatic Mail Sorting," Journal of Applied Psychology, vol. 49 No. 3, 1965, pp. 194–198.

R. Seibel, "Performance on a Five-Finger Chord Keyboard," Journal of Applied Psychology, vol. 46, No. 3, 1962, pp. 165–169.

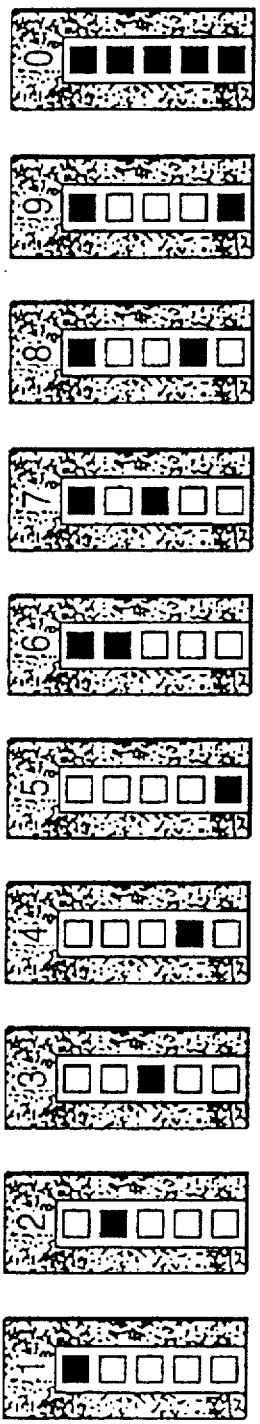

*FIG. 10A*

QUICK REFERENCE GUIDE

RED DIAMOND SHIFT FAMILY (All the chords in this family use a White thumb key)   Numbers And Mathematical Signs

| Character/Function | Chord | Character/Function | Chord |
|---|---|---|---|
| + Add | A | − Subtract | S |
| * Multiply | M | / Divide | D |
| % Percent | P | # Number | N |

| Character/Function | Chord | Character/Function | Chord | Character/Function | Chord |
|---|---|---|---|---|---|
| = Equal | E | $ (US Dollar) | U |  |  |
| > Greater Than | H | Space (Blank) | B |  |  |
| < Less Than | Z | (Higher) |  |  |  |

FIG. 10B

RED DIAMOND AND INDEX FINGER SHIFT FAMILY

| Character/Function | Chord | Character/Function | Chord |
|---|---|---|---|
| ! Exclamation | E | @ At | W |
| ? Question Mark | Q | - Hyphen | H |
| : Colon | C | _ Underline | U |
| ; Semicolon | S | | Vertical Line | V |
| & Ampersand | A | / Forward Slash | F |
| " Double Quote | D | \ Back Slash | B |

(Think of a <u>W</u>ave)

Punctuation and Symbols (Use a White thumb key)

| Character/Function | Chord | Character/Function | Chord |
|---|---|---|---|
| ^ Caret (<u>K</u>aret) | K | ( <u>O</u>pen Parenthesis | O |
| ~ Tilde | T | ) Close (e<u>X</u>it) Parenthesis | X |
| # Pound | P | [ <u>I</u>nitiate Bracket | I |
| * Aste<u>R</u>isk | R | ] <u>L</u>ock Bracket | L |
| ` Grave (quote) | G | { Open Brace | Y |
| Space | | } Close Brace | Z |

White Thumb

FIG. 10C

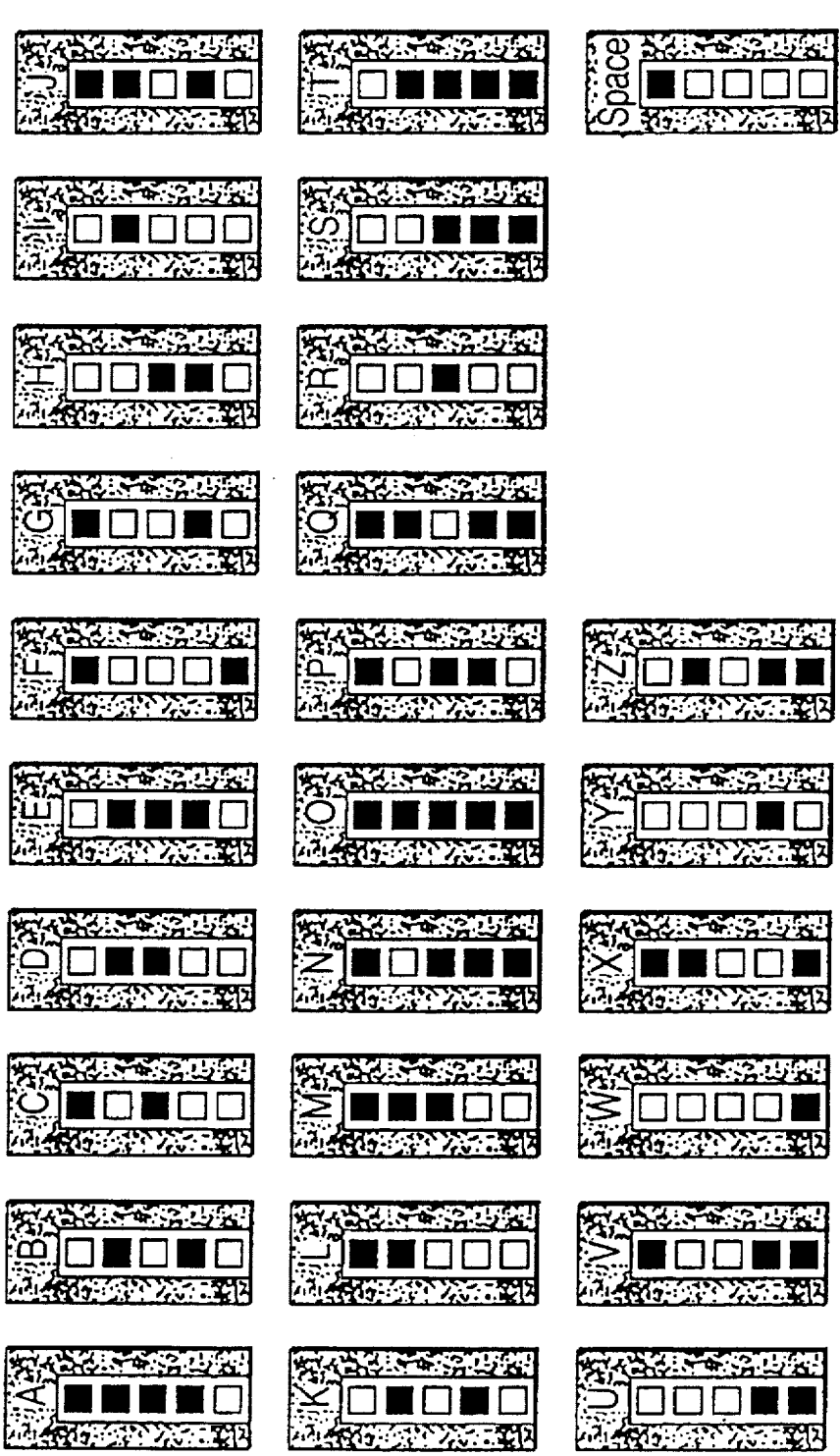

FIG. 11C

RED DIAMOND FAMILY  (No SHIFT chord required - use a Red thumb key ◆)     Editing and Control Functions Enter the chord for the letter AND a Red thumb ◆

| Character/Function | Chord | Character/Function | Chord | Character/Function | Chord |
|---|---|---|---|---|---|
| Alt | Red+ T | End | Red+ E | Page Up | Red+ U |
| Control (Ctrl) | Red+ K(trl) | Escape (Esc) | Red+ S(eSc) | Page Down | Red+ D |
| Delete (Del) | Red+ W(ipe) (Think of Block out) | Insert (Ins) | Red+ B | Scroll Lock | Red+ R(soft) |
| Home | Red+ H | Print Screen | Red+ Z | | |

CHORDIC KEYBOARD SYSTEM FOR GENERATING A SIGNAL IN RESPONSE TO A CHORD THAT IS ASSIGNED USING A CORRELATION BASED ON A COMPOSITE CHORD-DIFFICULTY INDEX

This is a continuation under 37 C.F.R. §1.60 of prior application Ser. No. 08/288,220, filed Aug. 9, 1994, now U.S. Pat. No. 5,493,654, which is a continuation application of Ser. No. 07/722,326, filed Jun. 28, 1991, and now abandoned.

BACKGROUND OF THE INVENTION

A portion of the disclosure of this patent document contains material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

1. Field of the Invention

This invention relates generally to the art of man-machine interfaces; and, in particular, to keyboard interfaces which use one or both hands to signal chords of information to a computer.

2. Discussion of Related Art

Since the dawn of computers, people have been communicating with computers in many ways, but none so prolific as the standard QWERTY keyboard. The QWERTY keyboard was established more than 100 years ago in the golden age of mechanical engineering. Yet, while the mechanical design constraints of that golden era have long since passed away, the QWERTY keyboard has not—despite its many disadvantages. The layout of the QWERTY keyboard was designed to slow down an operator who might otherwise tax the response time of a mechanical assembly.

We are frequently amazed by the speed at which the fingers of an accomplished typist can fly over the QWERTY keyboard. Our amazement resides in the fact that we know that touch typing on a QWERTY keyboard is a highly complex skill requiring many many hours of practice to master, as well as continuous hours of practice to maintain. Yet, we also know that an alternative keyboard, which requires less time to master but which provides equal or superior performance, is certainly desired.

A chordic keyboard has been suggested as an alternative to the QWERTY keyboard. Compared to the QWERTY keyboard, a chordic keyboard is a keyboard with a limited number of keys. While the QWERTY keyboard requires a unique key for each letter, the chordic keyboard does not. Instead of assigning unique keys to each letter, a chordic keyboard may assign a chord of keys to each letter. Thus, the term "chordic keyboard" is derived from the fact that the operator may actuate several keys simultaneously to signal the letter or other symbol to the machine. The keys which are simultaneously activated are referred to as a "chord." In the domain of man-machine interfaces, each chord corresponds to a symbol from a symbol set. When the symbol set is the English language, each letter is defined as a symbol.

U.S. Pat. Nos. 4,360,892, 4,442,506 and 4,443,789, to Endfield et al. suggests a five key chordic keyboard wherein chord assignment is based on the pictorial relationship of the keys to letters and punctuation marks. In assigning chords based solely on pictorial relationships, the Endfield chordic keyboard ignores other relevant criteria, such as motor and perceptual determinants. These determinants were investigated and indexed by Raij, Kimchi and Gopher. (See "Perceptual and Motor Determinants of Efficient Data Entry," Proceedings of the Human Factors Society 31st Annual Meeting 1987 pages 820–829 hereinafter referred to as the "PM Determinant Paper").

U.S. Pat. No. 4,516,939 to Crimmins describes, among other matters, a ten key device for receiving and translating chords made by an operator. However, Crimmins does not in any way address chord mapping schemes.

U.S. Pat. No. 4,833,446 to Eilam et al. describes a chordic keyboard wherein the chord assignment is based on groups of letters and wherein each group forms a recognizable combination of letters. These combinations are provided to assist the operator in associating the chord with the character. However, while such memory assisting associations may allow an operator to more easily learn chordic data entry skills, such memory assisted associations ultimately limit an operator's ability to achieve a performance level which is physiologically attainable.

Eilam et al.'s and Endfield et al.'s groupings are purely memory aids—aids which eventually inhibit ultimate performance.

SUMMARY OF THE INVENTION

A. Overview

The present invention is a primary chord random access chordic keyboard system comprised of: a) dual, tilt-rotated, chordic keyboards interfacable to a computer-based machine (the "Smart Machine"); and, b) a chordic keyboard driver software program (the "Driver Program") loadable and executable on the Smart Machine. The tilt-rotated feature presents certain ergonomic conveniences.

The chordic keyboard is said to be "tilt-rotated" in that the chordic keyboard has certain ergonomic features which, when compared to the hand position used to operate a QWERTY keyboard, 1) upwardly tilt the hands with respect to the wrist and 2) rotate the hands inward toward the operator's body. This rotation also tends to displace the operator's elbows such that the operator's elbows are further away from the operator's torso.

This tilt and rotate feature provides a postural and perceptual feature in which both hands can be mapped symmetrically in space and in anatomy. It allows the operator to perceive the relative positions of the thumb and finger in a vertical sense. Thus, the thumb is easily perceived as being higher than the forefinger, the forefinger higher than the middle finger, etc. This "verticality" or "spatial congruence" feature is most beneficial in training operators and in operating dual chordic keyboards.

In a preferred embodiment of the invention, the chordic keyboard is tilted and contains an integrated palm rest. Ergonomically, these features combine to provide an optimal posture for the hand and arms, relief from carpal tunnel tension and relief from the weight of the arms and hand. These features assure an operator's long term performance without fatigue. Also, in a preferred embodiment of the invention, the dual chordic keyboards can be separated into two single chordic keyboards which can be placed on either side of the QWERTY keyboard, or other existing input device, so as to allow the operator the flexibility and versatility to freely use the various input devices.

The Driver Program enables the Smart Machine to interpret chords from either or both chordic keyboards in accordance with a chord map wherein the primary symbols are mapped to the primary chords based on a correlation of two indices: 1) the index of relative frequency of use of the primary symbols; and, 2) the index of perceptual and motor constraints (shown in Table "A"). The use-frequency index for the alphabet as the primary symbols is shown in Table "B". The primary chord map assures that the most frequently used primary symbols are mapped into the chords which are the easiest and most efficient to use. Thus, the invention assures optimal and fast data entry and retrieval primary symbols. The Driver Program also enables the Smart Machine to interpret chords based on a multi-family organizational scheme which assists the operator in learning and using the chordic keyboard system. The multi-family organizational scheme assures ease of chord memorization and learning.

The Driver Program also enables the Smart Machine to interpret chords from a dual chordic keyboard in a manner which supports parallel and simultaneous chord entry by both hands. This dual-hand operating feature provides for increased functional efficiency and flexibility of use. The Driver Program also allows the chordic keyboard to be used in conjunction with, rather than as a replacement for, any existing input device (such as a QWERTY keyboard).

B. Optimization of Data Entry and Retrieval

There are several features of the invention which assure optimal and fast data entry and retrieval of the primary chords.

1. It is a feature of the invention to develop chord maps based on the motor and perceptual index which is shown in Table "A" (referred to hereinafter as the MP Index). The MP Index is correlated with the relative use frequency of each of the primary symbols used by the operator to communicate with the Smart Machine. For example, as the primary symbols in an English Language symbol set are the 26 letters of the alphabet and the space bar, these 27 symbols are mapped by correlating their frequency of use with the MP Index. (We note that, in the English language, the average length of a word is five characters. Thus, every sixth character, or approximately 17% of the characters, are spaces). This insures that the most frequently used letters are associated with the easiest chords in terms of motor and perceptual constraints.

2. It is a feature of the invention that the chords are mapped across the operator's two hands in a manner which supports both spatial congruence and hand symmetry. To illustrate the hand-symmetry feature, as illustrated in FIG. 9 of the Detailed Description of the Invention below, if the operator wants to communicate the letter C to the Smart Machine and the letter C is communicated with the right hand by using the thumb and middle finger, then the operator can likewise communicate the letter C with the left hand by using the thumb and middle finger. Likewise, to illustrate the spatial congruence feature, if the operator wants to communicate the letter C to the Smart Machine and the letter C is communicated with the right hand by using the top key (i.e., the thumb) and the third key (i.e., the middle finger), then the operator can likewise communicate the letter C with the left hand by using the highest member and the third highest member. Thus, the combined use of spatial congruence and hand symmetry eliminates perceptual confusion in two-handed systems. These two concepts unite to achieve a better machine. (Thinking horizontally creates confusion.) In short, the chord map for each hand is perceived as being identical anatomically and spacially.

3. It is a feature of the invention to use a "random access" method of chord map memorization rather than a mnemonic method (e.g. by grouping letters into words) to memorize the primary chords in the symbol set. For example, in terms of the English Language, mnemonics are not used to memorize the 26 letters of the alphabet. While others encourage the use of such memorization association techniques, such as Endfield and Eillam, et al, and while such memorization association techniques may allow for faster acquisition of the initial chordic keyboard skills, such memory association techniques eventually act as a restraint on achieving fast and efficient data entry and retrieval and attenuate the ultimate performance which can be physiologically achieved by an operator. Thus, in the present invention, the primary chords are memorized on a "random access" basis. This random access feature in the mapping of the primary chords allows an operator to achieve faster and more efficient data entry and retrieval and to approach the ultimate physiological performance threshold. In short, the random access feature allows the operator to efficiently communicate with the Smart Machine as quickly as possible.

4. It is a feature of the invention to use long travel, light touch keys as the only source of proprioceptive feedback.

It is thus an object of the invention to assure that the primary chords (which in the case of the English letters are the 26 letters of the alphabet and the space bar) are communicated to the Smart Machine in the fastest and most efficient manner.

C. Ease of Code Memorization and Learning

There are several features which assure that an operator can easily memorize and learn the chordic keyboard system. The present system maps letters to the primary chords without using any explicit mnemonics or memory aids. Thus, to the user, letters appear to be randomly mapped to chords. This approach was adopted to eliminate a cognitive step in the processing and memorization of letters. While the present invention relies on several memory aids to establish family groups, such aids were intentionally excluded from the mapping of the primary chord family (e.g., letters of the alphabet) to facilitate random access to letter codes in memory.

1. It is a feature of the invention to organize the language used to communicate with the Smart Machine into multiple families and to use thumb control shift keys to associate between those families. In particular, in the case of the English language symbol set, five families have been established as follows:
   a. Primary Symbols (alphabet and space bar)
   b. Numbers and Mathematical Signs
   c. Punctuation and Cursor Control
   d. Editing Control Functions
   e. Special Characters Functions 2. It is a feature of the invention to color code and to differentially texture the thumb control keys to assist the operator in associating between the various families. The differential texture allows an operator the freedom to never have to look at his hands. This is particularly beneficial to those who are blind or whose sight is otherwise impaired in the operating environment.

3. It is a feature of the invention to use learning charts which present the chords in a vertical and color-coded mode.

4. It is a feature of the invention to use mnemonics (semantic and graphic) to assist in the memorization of non-primary chords. (For example: the chord for A is used for the addition symbol the chord for S is used for the subtract symbol.)

These features, as well as other features of chordic keyboards which we have discovered, have been combined so as to develop a superior chordic keyboard system. It is thus an object of the invention to allow the operator to more easily memorize and learn the complete chord map.

D. Ergonomic Factors

There are several features of the invention used to assure that an operator can perform long term, without fatigue. In particular, our invention reduces carpal tunnel tension and relieves certain other biomechanical constraints. When in use, the invention supports the weight of the operator's arms and hands.

1. It is a feature of the invention to have an integral palm rest as part of the chordic keyboard. This palm rest supports the hand and leads the operator to place his hand into the correct position.
2. It is a feature of the invention to have an approximately 20° upright tilt of the keyboard face. In this way, the hand of the operator is in a more relaxed and natural position. This operating position also avoids the harms associated with carpal tunnel tension and avoids other biomechanical constraints. In particular, the invention, when in use, relieves the weight of the operator's arms and hands.

Each side of the dual chordic keyboard is easily oriented to its optimum ergonomically proper positions due to the design of each keyboard housing. The top inside corners of each chordic keyboard are designed to be pressed against each other such that the bottom of the keyboards are displaced from each other. This assures that the operator's arms are properly oriented when operating the invention. The opposing hand forces assist in stablizing the invention housing.

It is thus an object of the invention to reduce carpal tunnel tension and to assure long-term operator performance without fatigue.

E. Functional Efficiencies and Flexibility of Use

There are several features which assure increased functional efficiencies and flexibility of use.

1. It is a feature of the invention that each of the chordic keyboards in a dual chordic keyboard are functionally parallel and can be operated simultaneously. It is a feature of the invention that the Driver Program can program the Smart Machine to accept two-handed simultaneous and parallel operation of a dual chordic keyboard. In essence, completely two-handed independent use can be achieved without conflict or confusions as there can be a complete division of labor between each hand of the operator. (e.g., the operator could use one-hand to enter text from the Bible and use the other hand to enter text from the Koran).

It is thus an object of the invention to allow the operator to use each of his hands independently while also facilitating hand coordination in two-handed operation.

2. It is a feature of the invention to have the Driver Program allow an operator to assign macros to chords. It is thus an object of the invention to allow an operator to customize a chordic keyboard system for any given application.
3. It is a feature of the invention to have the Driver Program run in conjunction with, rather than as a replacement for, other I/O device driver programs running in the Smart Machine. It is a further feature of the invention that a dual chordic keyboard can be physically separated into two single chordic keyboards which can be placed at either side of an existing input device (such as a QWERTY keyboard). It is thus an object of the invention to allow the operator the freedom and flexibility to use multiple input devices. It is a further object of the invention to allow the operator to be gradually weaned away from less efficient and/or slower data entry and retrieval devices.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification illustrate embodiment(s) of the invention and, together with the description, serve to explain the objects, advantages and principles of the invention. In the drawings.

FIGS. 10 and 11, the Quick Reference Guide, show the five families of chords.

DETAILED DESCRIPTION OF THE INVENTION

Figure 1:
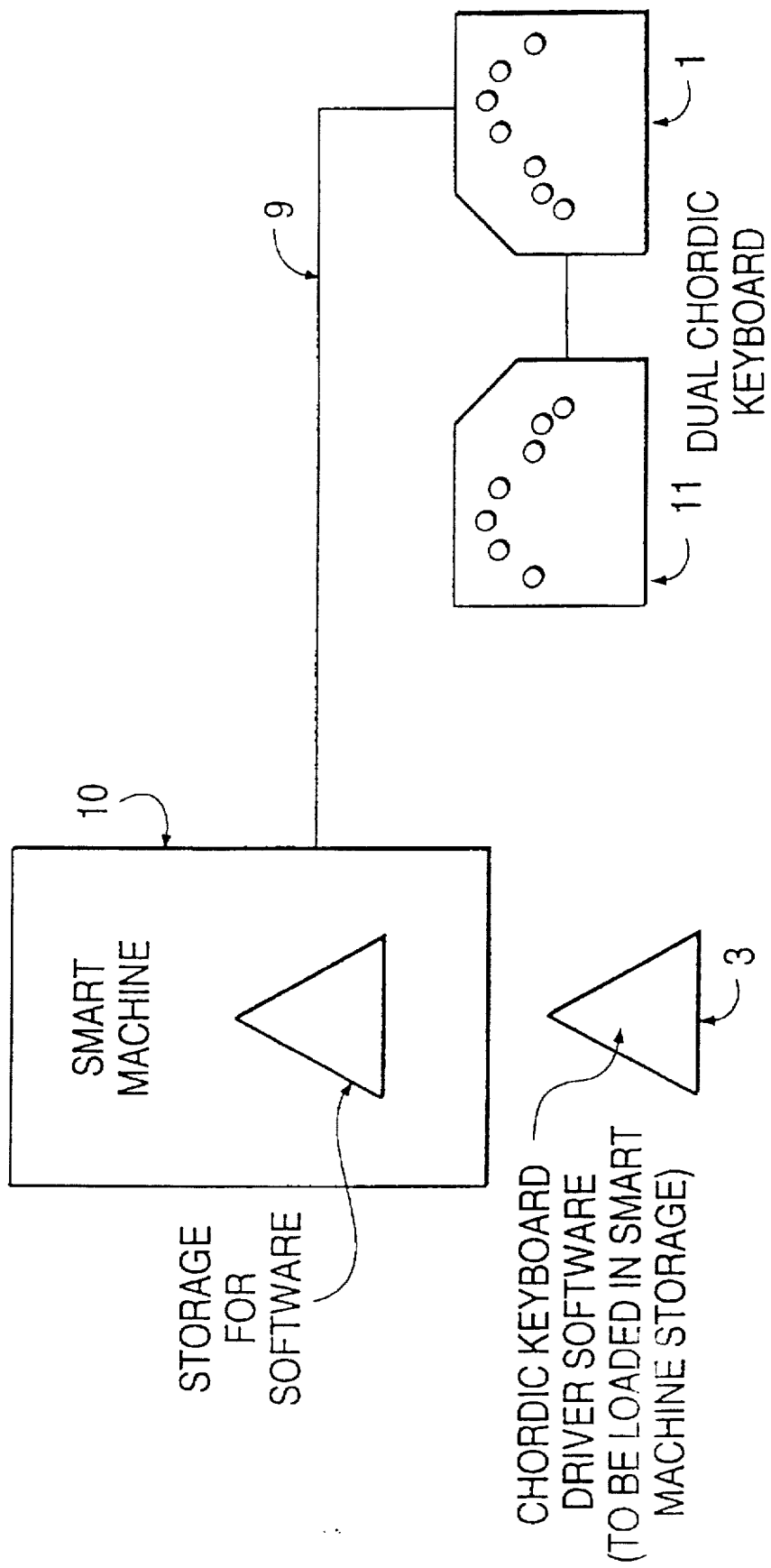
FIG. 1 shows a dual chordic keyboard system connected to the Smart Machine which is loaded with the Driver Program.

An embodiment of the present invention as illustrated in FIG. 1 comprises a keyboard (1) with two groups keys (4) and (5) is coupled to a computer-based machine (the "Smart Machine") (10) through a transmission medium (9). The keys (4) and (5) are arranged in a hand pattern which facilitates one-handed operation. The Smart Machine (10) is programmed with a chordic keyboard Driver Program (hereinafter, the "Driver Program") (3). An operator actuating the keys (4) and (5) with one hand will produce chords of information which are transmitted to the Smart Machine (10) through the transmission medium (9). The Smart Machine (10), which is executing the Driver Program (3), receives the chords, and maps the chords into a symbol set. For each chord mapped by the Driver Program (3), the Driver Program (3) provides a symbol which can be used by the Smart Machine (10) for further processing. The symbol can be letters, words, or instructions. The meaning of the symbol is dependent on the application running in the Smart Machine.

Figure 2:
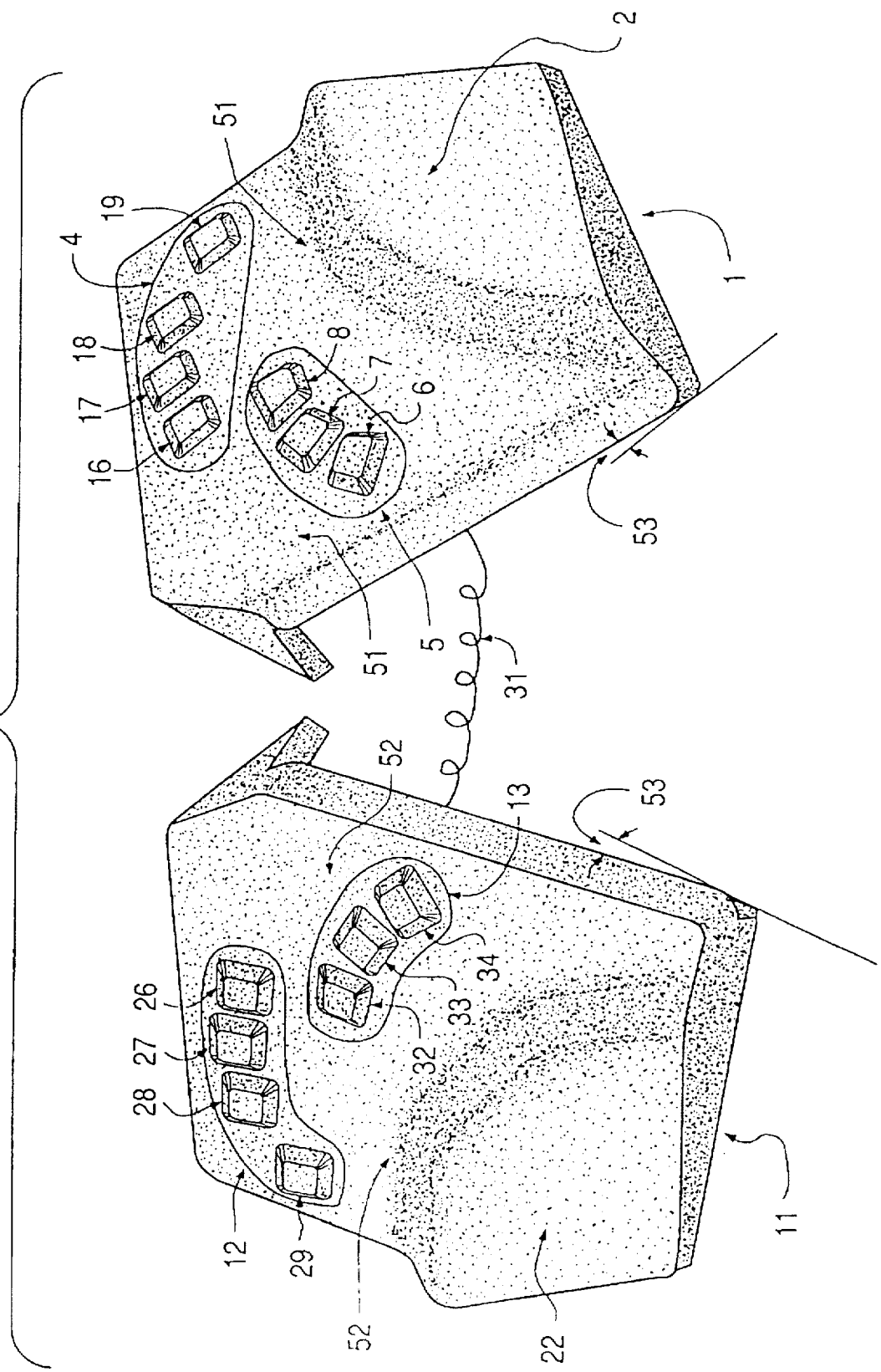
FIG. 2 is a view of the dual chordic keyboard showing the relative positions of the keys and the palm rest and the tilt angle of the keyboard housing.

In a preferred embodiment of the invention illustrated in FIG. 2, a keyboard (11) with two groups of keys (12) and

(13) is coupled to keyboard (1) through transmission medium (31) to allow the operator to communicate with the Smart Machine (10) with both hands. Chords originating from the keyboard (11) are received and mapped by the Driver Program (3). The group of keys (12) and (13) are arranged in a pattern which facilitates one-handed operation and are arranged in the hand-opposite pattern as that used for the groups of keys (4) and (5). Thus, if the groups of keys (4) and (5) are arranged in a right-hand pattern then the groups of keys (12) and (13) are arranged in a left-hand pattern. Likewise, if the groups of keys (12) and (13) are arranged in a right-hand pattern then the groups of keys (4) and (5) are arranged in a left-hand pattern.

So as to implement the spacial congruence feature, and for ergonomic goals, the keyboard (1) and the keyboard (11) are tilted such that the face (51) of the keyboard (1) and the face (52) of the keyboard (11) are at an angle (53) with respect to the plane horizontal to the operator. In a preferred embodiment of the invention, the angle (53) is in the range of 20° to 45°. If the angle is less than 19° or 20°, the invention's advantages in relieving carpal tunnel tension are essentially lost. If the angle is over 45°, then the height of the housing tends to exceed that of a QWERTY keyboard and thus loses the advantage of placing the keyboards on each side of the QWERTY keyboard. Also, if the angle exeeds 30°, then additional improvements are required to counteract the hand-pushing force on the housings.

In a preferred embodiment of the invention, keyboard (1) has an integral palm rest (2) and keyboard (11) has an integral palm rest (22). The palm rests (2) and (22) are raised and contoured in a palm receptive profile such that the palm rests (2) and (22) allow the operator to rest his hands on the palm rests (2) and (22) and thus support his hands and arms. The palm rests (2) and (22) and the tilt (as provided by angle (53)) of the keyboards (1) and (11) serve to reduce carpal tunnel tension and other biomechanical constraints.

The keyboard (1) has a finger group of keys (4) and a thumb group of keys (5). The finger group of keys (4) is comprised of four keys (16), (17), (18) and (19) arranged in a finger pattern (i.e. key (16) for forefinger, key (17) for middle finger, key (18) for ring finger and key (19) little finger). The thumb group of keys (5) are located on the keyboard such that when the fingers of an operator are actuating the finger keys (4), the thumb of the operator can actuate the thumb keys (5).

The keyboard (11) also has a finger group of keys (12) and a thumb group of keys (13). The finger group of keys (12) is comprised of four keys (26), (27), (28) and (29) arranged in a finger pattern. The thumb group of keys (13) are located on the keyboard such that when the fingers of an operator are actuating the finger keys (12), the thumb of the operator can actuate the thumb keys (13).

Figure 8:
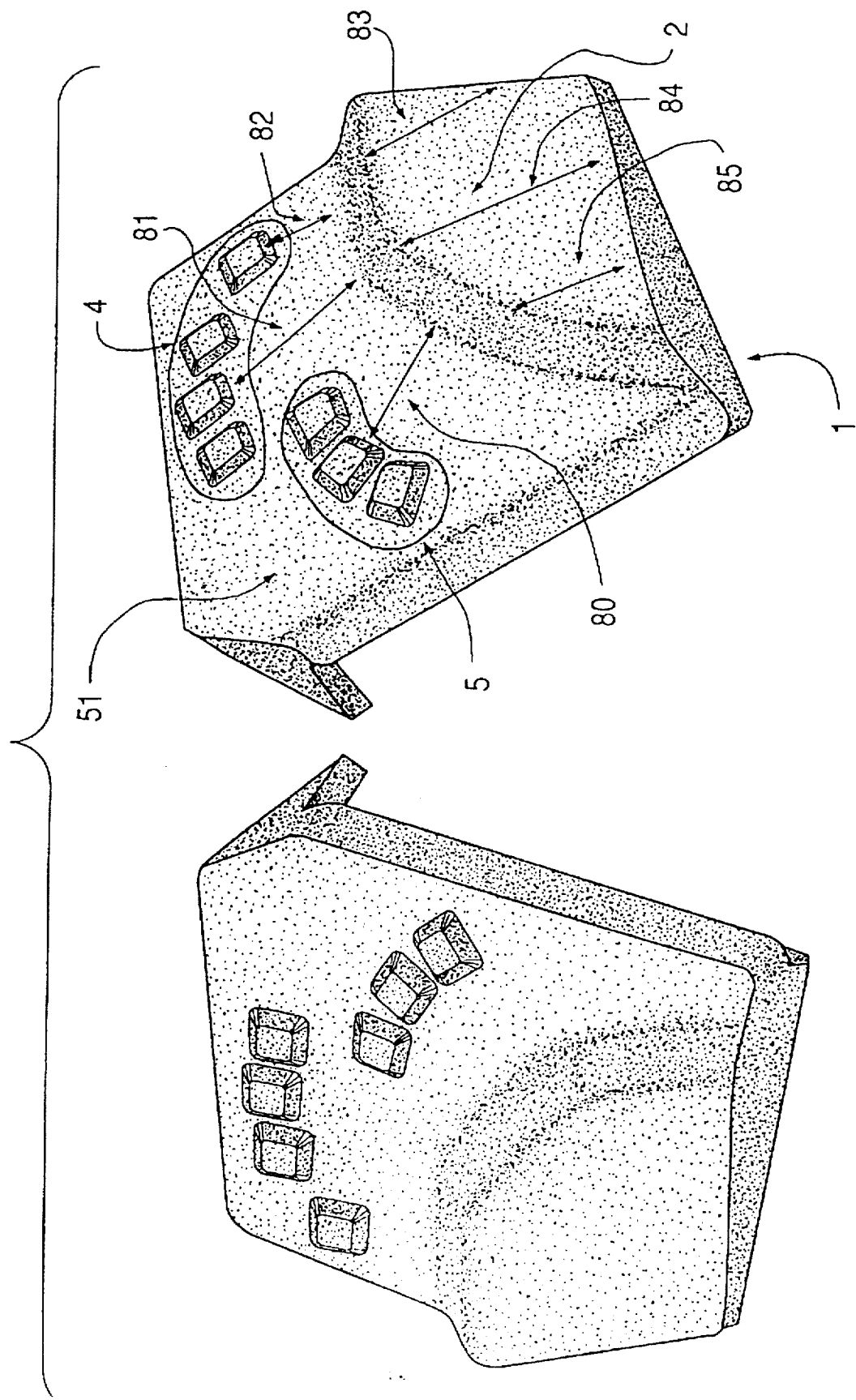
FIG. 8 shows the relative positions of the keys and palm rest as well as the size of the palm rest.

In a preferred embodiment of the invention, the group of keys (5) consist of three keys, (6), (7) and (8), and the thumb group of keys (13) consist of three keys (32), (33) and (34) wherein keys (6), (7), and (8) are arranged in an arc approximating the arc formed by the travel of the tip of the operator's other thumb when the other fingers of the operator are positioned on the finger keys (4) and wherein keys (32), (33) and (34) are arranged in an arc approximating the arc formed by the travel of the tip of the operator's thumb when the fingers of the operator are positioned on the finger keys (12). The palm rests (2) and (22)) are fixed, elevated and spacy, thus enabling comfortable placement of the operator's palms while entering chords at high speeds. The distance from the groups of keys (4) and (5) to palm rest (2) and, likewise, the distance from the groups of keys (12) and (13) to palm rest (22), as well as the size and area of palm rests (2) and (22) have been especially designed to cover and fit the variability of palm and hand sizes in the adult population. Additionally, the palm rests (2) and (22) have sufficient margins to accommodate children of ten or eleven years and older. The palm rests (2) and (22) are also designed so that operators with small hands may rest their palms close enough to the row of typing keys while those with large hands can rest their palms far enough away from the typing keys as illustrated in FIG. 8 by the distances 81 and 84 so as to achieve a comfortable typing posture. This is the reason for the wide area palm rest. It accomodates the population and assure maximum comfort even though it is a fixed surface.

In a preferred embodiment of the invention, the distance from the center of the middle finger keys (17) and (27) to the palm rests (2) and (22), respectively, is approximately 9 cms; the distance of the thumb keys (5) and (13) and little fingers (19) and (29) to the palm rests (2) and (22), respectively, are, approximately 6 cms; the depth of the palm rests (2) and (22) end to end at the center is approximately 9 cms; and, the depth of palm rests (2) and (22) is approximately 6 cms at the groups of thumb keys (5) and (13), respectively.

The anthropometric measures are taken from the following reference: Anthropometric Source Book Volume II Handbook of Anthropometric Data. NASA Scientific and Technical Information Services, 1978.

The relevant information are in the following pages:

|  | percentiles | |
| --- | --- | --- |
|  | 1% | 99% in Cms |
| Hand length pp 239 | 16 | 21.5 |
| Palm length pp 311 | 9 | 12 |
| Thumb-crotch length pp 379 | 3.8 | 6.2 |

Assuming that people enter chords with convexed hands, the respective palm rest should span from 12.2–15.3 cms from the center of the middle finger keys. The palm rests (2) and (22) range from 9 to 18 cms, thus accomodating smaller and larger hands.

In a preferred embodiment of the invention, the keys (6) and (34) of the groups of thumb keys (5) and (13), respectively, are color coded blue, the keys (7) and (33) are color coded white and the keys (8) and (32) are color coded red. The features associated with this color coding are described later.

In the preferred embodiment of the invention, the groups of keys (4), (5), (12) and (13) are long travel, light touch, and serve as the only source of pro-preioceptive feedback to the operator.

Figure 3:
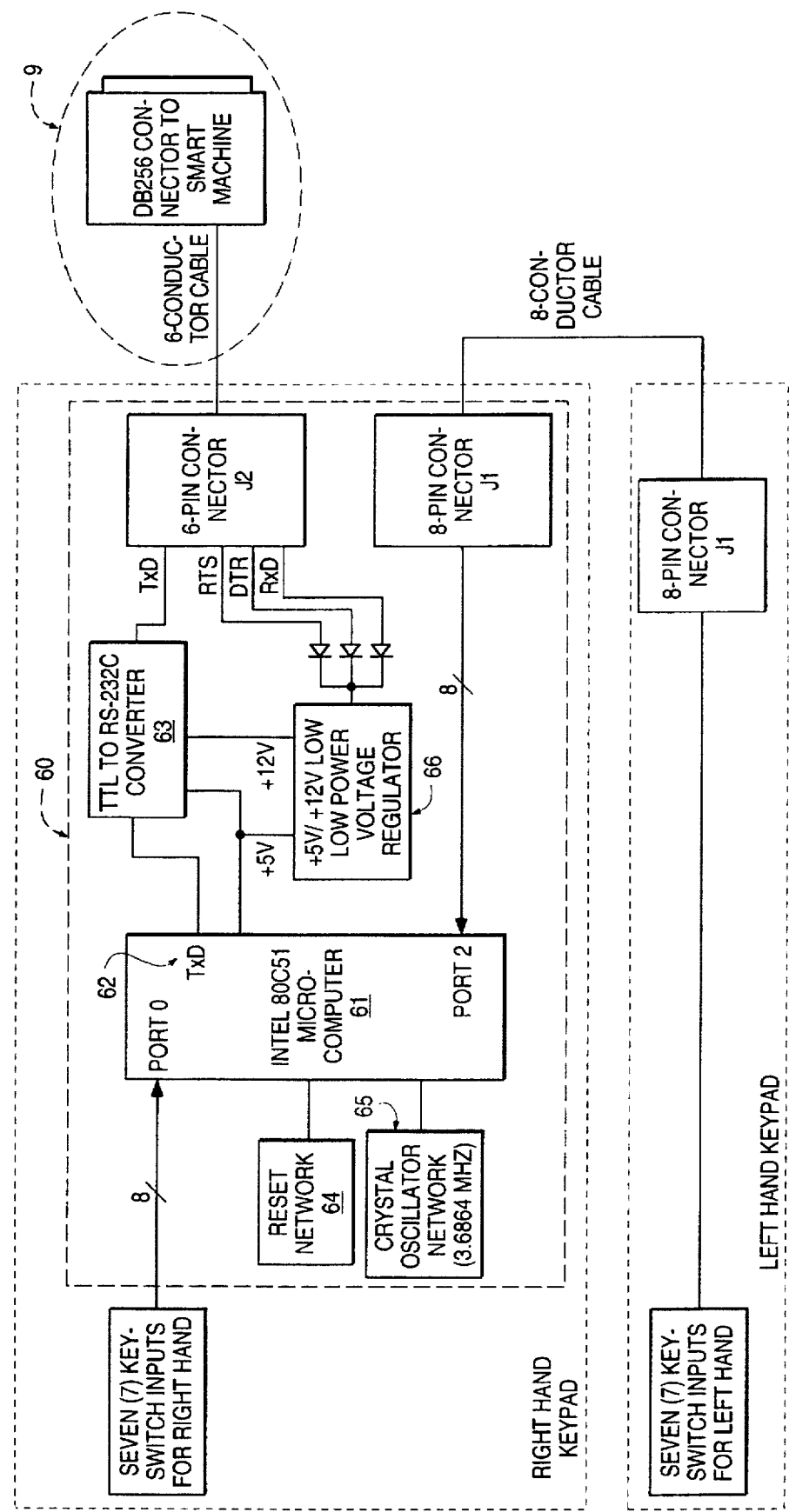
FIG. 3 shows the schematic diagram of the detector, debouncer and communication circuit.

As illustrated in FIG. 3, in the preferred embodiment of the present invention, the groups of keys (4), (5), (12) and (13) are electrically coupled to a detector, debouncer and communication system (60). This detector, debouncer and communication system (60) serves to detect any changes in the state of any of the keys groups of (4), (5), (12) and (13) and to debounce those keys so as to determine when a chord has been completed and to communicate the chord to the Smart Machine (10) through the transmission medium (9). In the preferred embodiment of the invention, the detector, debouncer and communication system (60) is comprised of a micro-computer (61) which is electrically coupled to the keys groups of (4), (5), (12) and (13). The micro-computer is programmed to periodically interrogate the keys groups of (4), (5), (12) and (13) to detect any change in the keys groups of (4), (5), (12) and (13) to debounce those changes. A flow chart of the software used to implement such interrogation, detection and debounce is shown in FIGS. 4 and 5.

Figure 4:
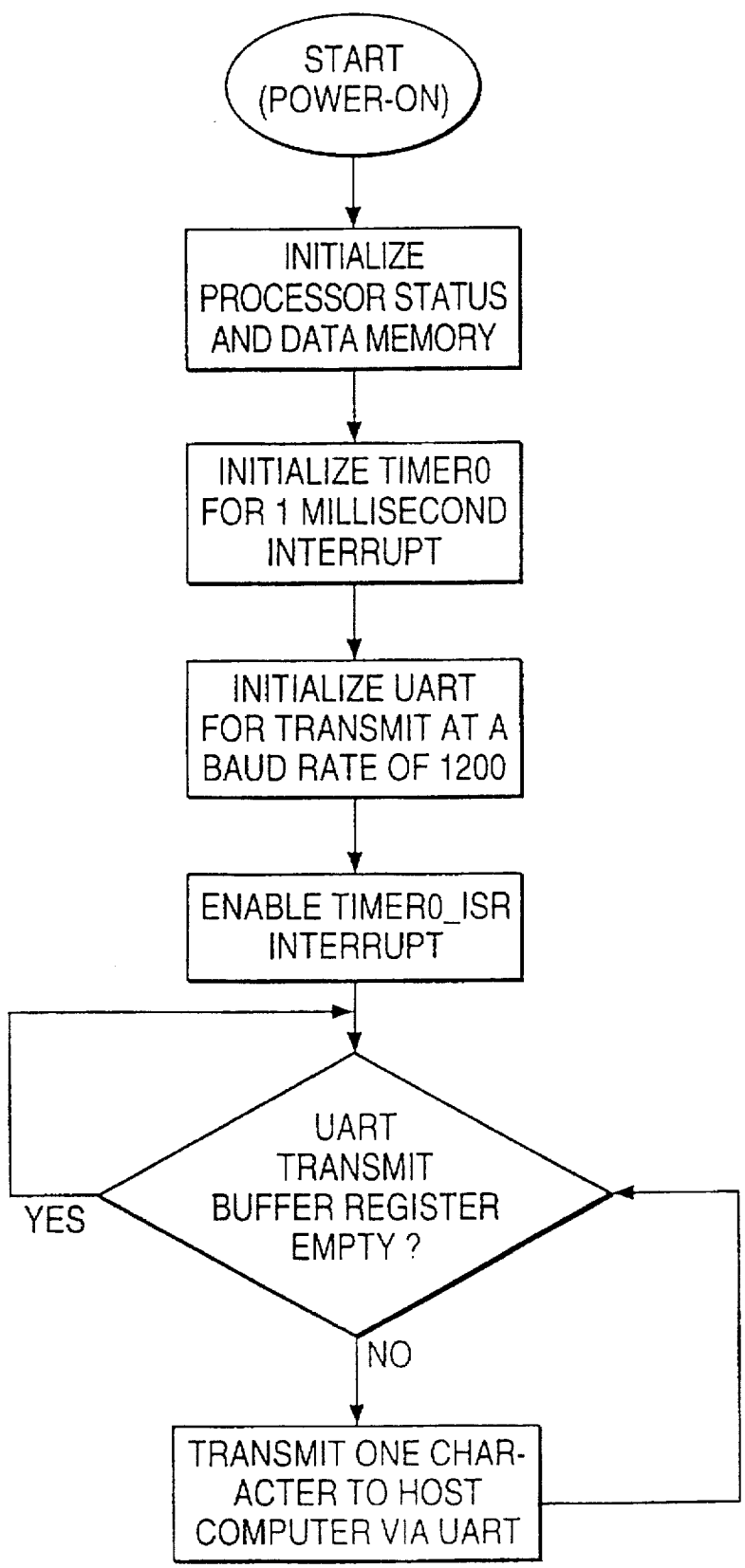
FIGS. 4 & 5 show the flow chart of the detector, debouncer and communication code.

FIG. 4 illustrates a Main Routine. The Main Routine illustrates the general operations in the dual chordic keyboard (1 and 11), including the steps of initializing the keyboard (1 and 11) and transmitting data corresponding to input chords to the smart machine (10) or host computer.

Figure 5:
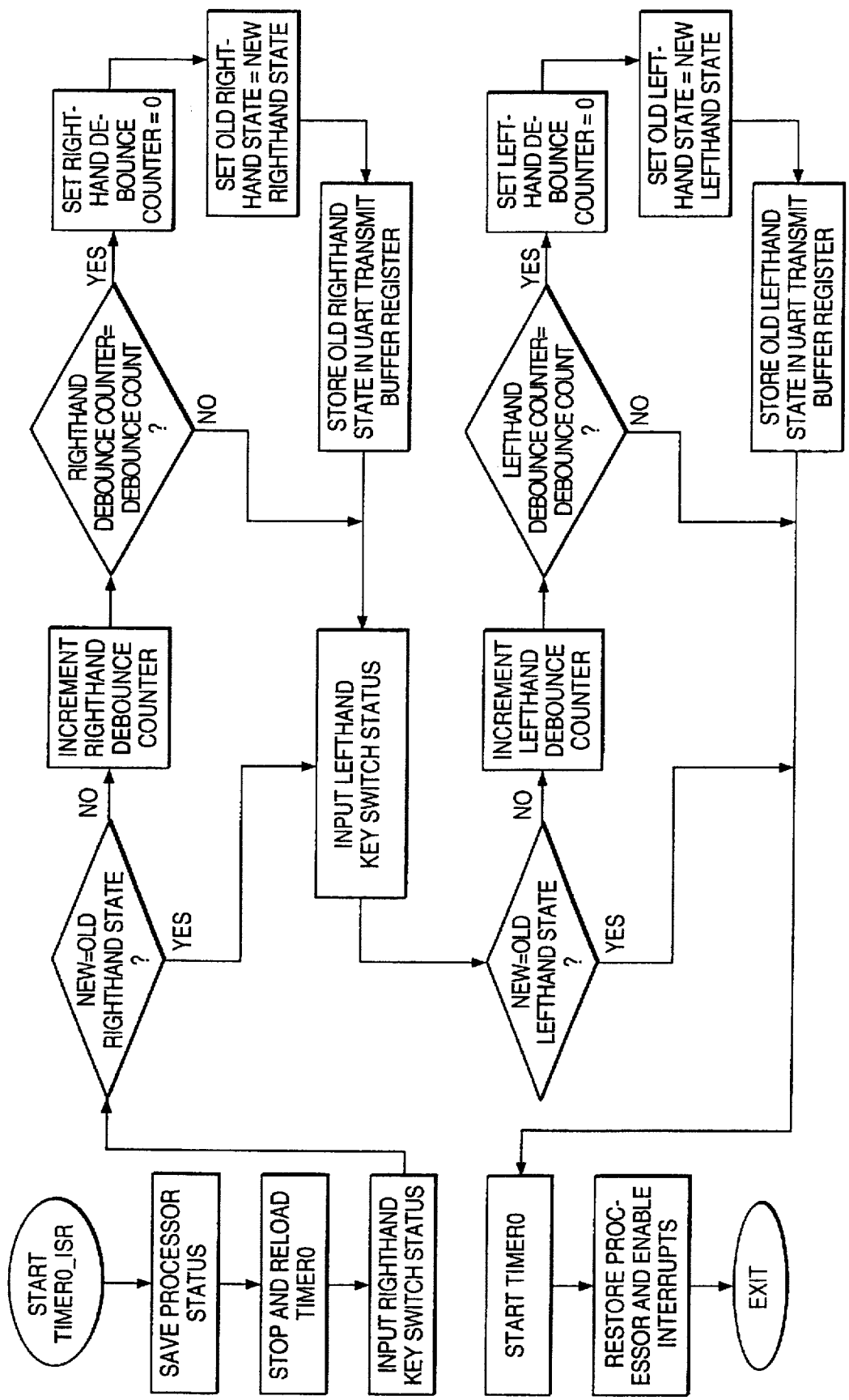

FIG. 5 illustrates a Timer O_ISR Interrupt Service Routine. This routine includes the general operations of the timer interrupt routine of the keyboard (1 and 11) used to continually check for input data corresponding to chords.

Using an Intel 80-C51 micro-computer as the micro-computer (61), the software shown in Appendix I can be used to perform these tasks.

The micro-computer transmit/receive port (62) is connected to a TTL to RS-232C converter (63), the output of which is connected and electrically coupled to the transmission medium (9). Other means of coupling the micro-computer (61) to the transmission medium (9) could be employed, such as infra-red or optical coupling. Additionally, a parallel protocol and interface, instead of a serial protocol and interface, could be used to transmit the chord from the micro-computer (61) to the Smart Machine (10) through the transmission medium (9).

In the preferred embodiment of the invention, a reset network (64), crystal oscillator network (65), and power supply (66) are used to support the micro-computer (61) in a means that would be known to one skilled in the art.

In a preferred embodiment of the invention, eight bit bytes of data are formatted by micro-computer (61) to be transmitted to the Smart Machine (10). Seven of the eight bits of data are used to indicate the state of each of the seven keys (4) and (5) on keyboard (1) or the seven keys (12) and (13) on keyboard (11). The eighth bit is used to indicate whether the chord is originating from keyboard (1) or keyboard (11).

In the preferred embodiment of the invention, the port (2) of micro-computer (61) is utilized for keyboard (11) and port 0 of micro-computer (61) is used for keyboard (1).

Figure 6A:
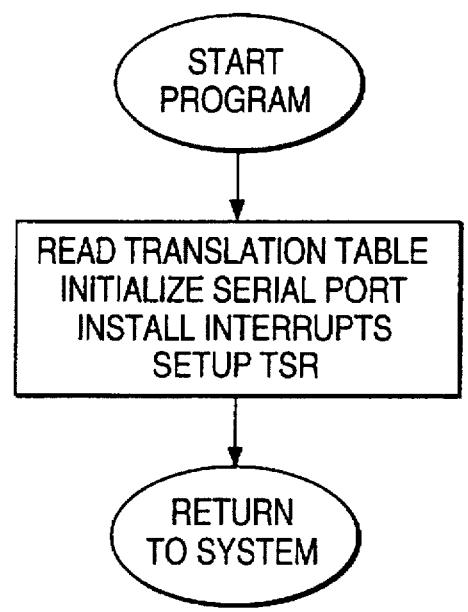
FIGS. 6 & 7 show the flow chart for the chordic keyboard Driver Program.
Figure 6B:
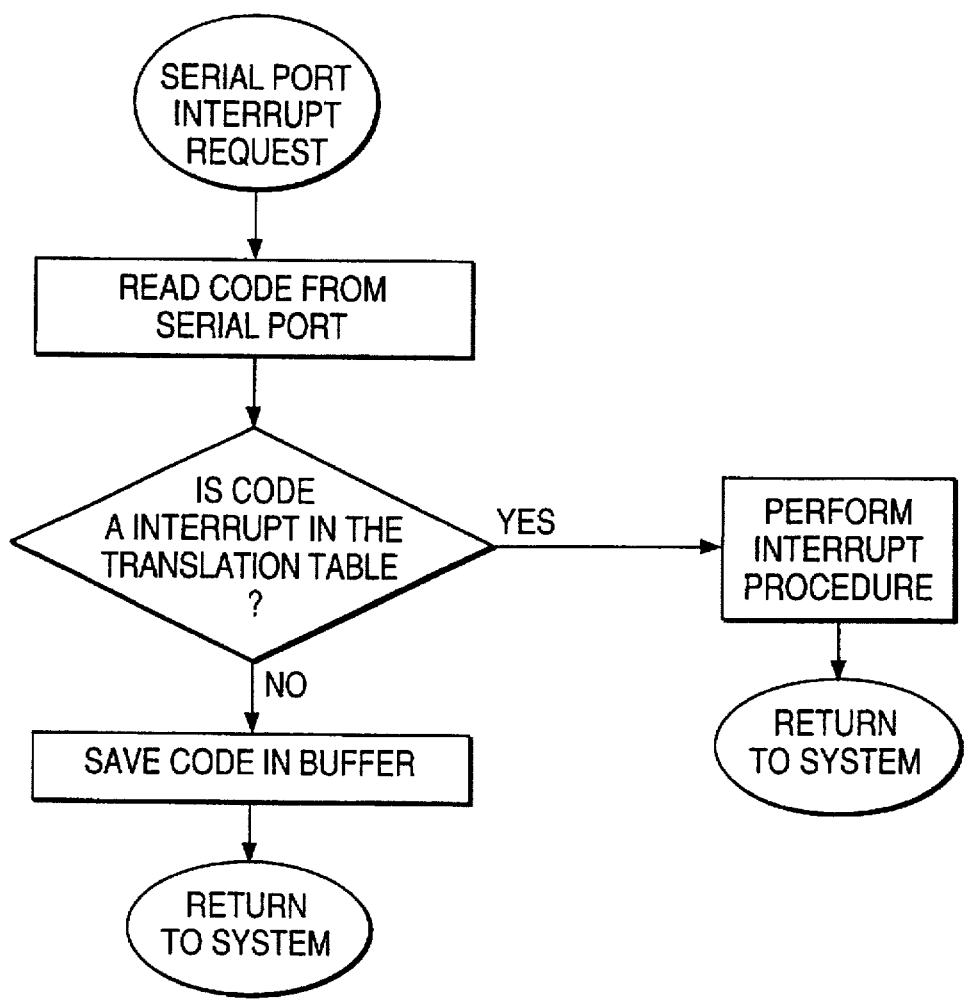
Figure 7:
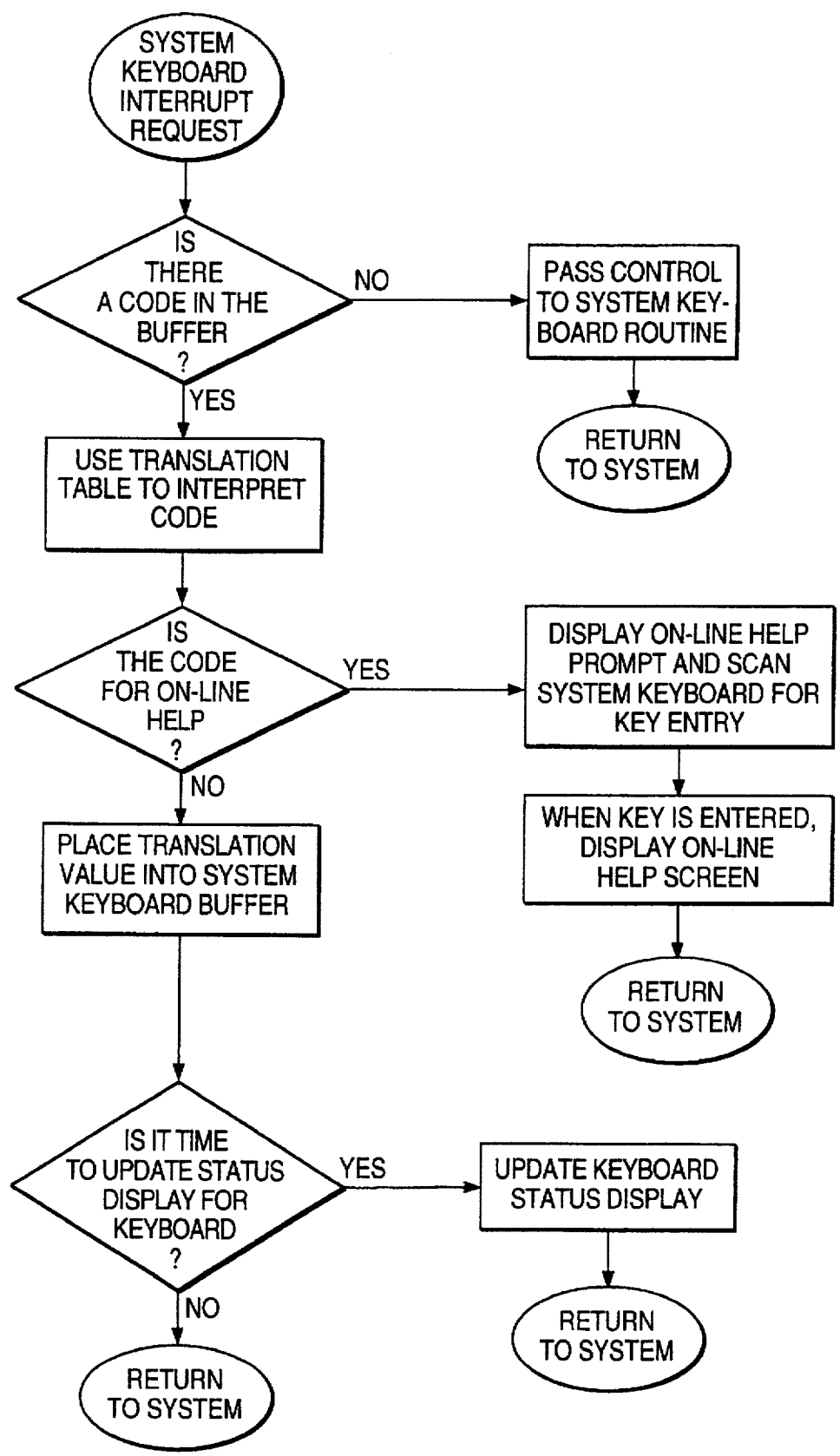

In the Smart Machine (10), a Driver Program (3) based on the flow chart shown in FIGS. 6 & 7 is loaded and executing.

FIGS. 6 and 7 illustrate the steps of a Driver Program. The Driver Program is a part of the chordic keyboard driver program (3) in the smart machine (10) of FIG. 1 and includes the general operations of the smart machine (10) used to initialize the chordic keyboard system and to receive data from the chordic keyboard (1 and 11) corresponding to input chords. FIG. 7 illustrates a portion of the Driver Program continued from FIG. 6 and, specifically, the steps of the Driver Program in FIG. 6 implemented in the smart machine (10) to interpret the data received from the chordic keyboard corresponding to input chords into conventional character data for display.

In the PC class machines which are prevalent today, and which run under the MS-DOS operating system, the listing of the source code actually used to compile the program is shown in Appendices II through X.

Figure 9:
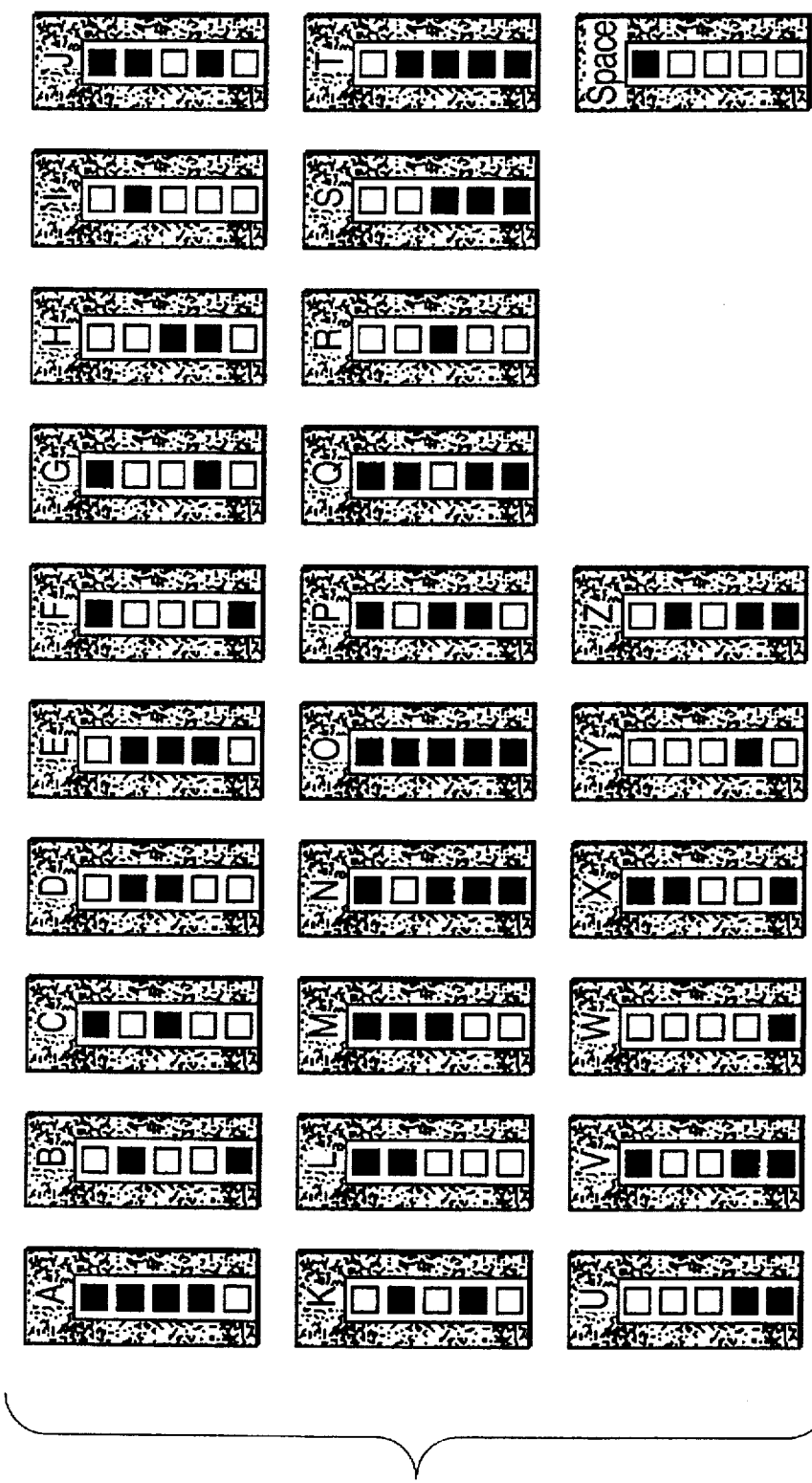
FIG. 9 shows the chord assignment for the English alphabet and space bar as the primary symbols.

The assignment of the English primary chords (i.e., the 26 letters and the space bar as represented by the software listed above) is shown in FIG. 9. In FIG. 9, the top box of each character code corresponds to the thumb key of each of keyboards (1) and (11). The four boxes below the top correspond respectively to the index finger key, the middle finger key, the ring finger key, and the little finger key. The assignment is based on the Gopher Correlation of the MP Index (Table "A"), the use-frequency index (Table "B" as grouped in accordance with Table "C"); hereinafter described.

The primary chord map for the English alphabet and space bar was derived in the following manner. As shown by reference to Table "D," each of the chords was assigned, in order of difficulty to one of seven groups based on the perceptual index and to one of eight groups based on the motor index. The perceptual index ranks the perceptual goodness and coherence of the spatial patterns that are created by the keys which are depressed together in each of the 31 basic chord combinations. This scale was constructed based on the ability of humans to commit to memory patterns displayed for short durations on a computer screen, and the speed at which these patterns could be retrieved from memory and compared with a subsequently displayed pattern. The motor difficulty index ranks the 31 basic chord combinations of the five fingers according to the biomechanical and motor difficulty of producing each chord. It was constructed using the judgments of humans employing the Paired-Comparison Standard scaling method and the Minimum Normit Chi-Square statistical technique, to determine scale values. In Table "D", group one represents the easiest to memorize or use and group 7 for the perceptual index and group 8 for the motor index represents the hardest to memorize or use, respectively.

The scores for each chord were then added together to form a chord-difficulty index for each chord. The composite chord-difficulty index was then used to assign the primary symbols (i.e., the English alphabet and space bar) to chords so as to match the eight groups of primary symbols (based on frequency of use) with eight groups of averaged composite chord-difficulty indices. The results are shown in Table E wherein the most frequently used group of symbols is assigned the lowest average composite chord-difficulty index and each successively and frequently used group of primary symbols is assigned to the next highest average composite chord-difficulty index. This procedure, or correlation, we refer to as the Gopher Correlation.

Figure 10C:
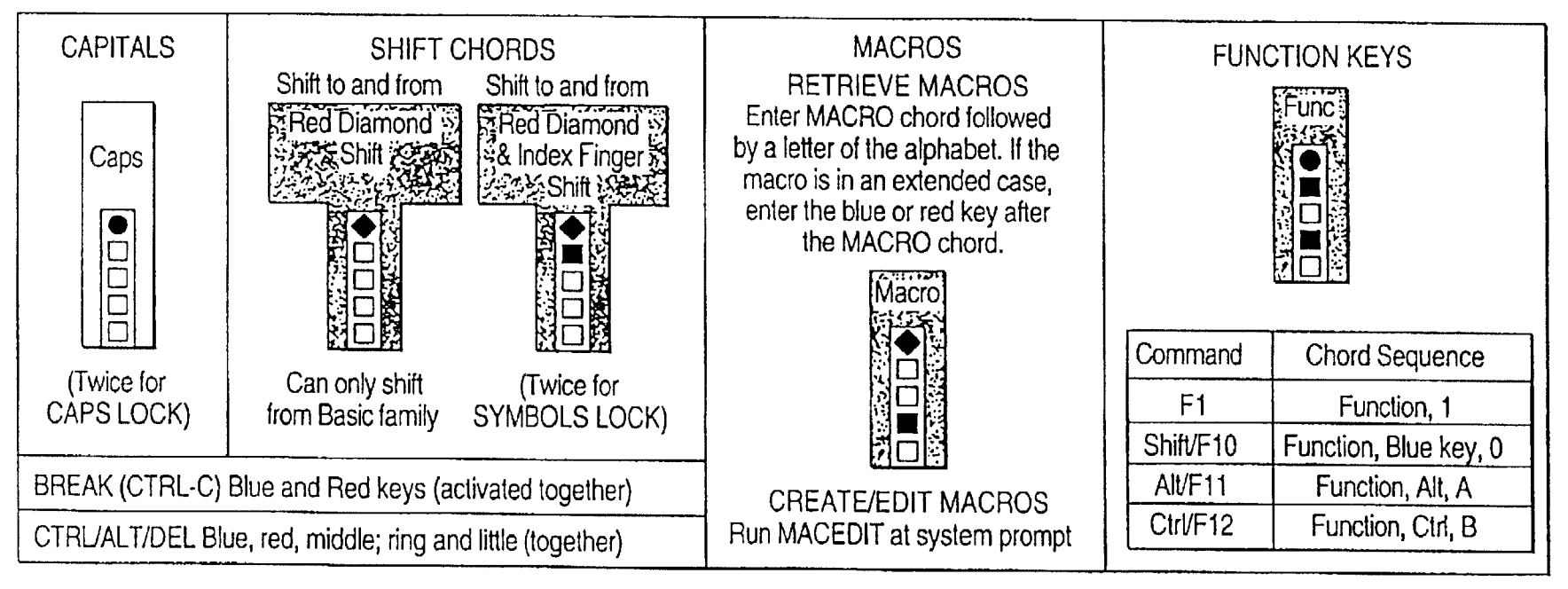
Figure 11B:
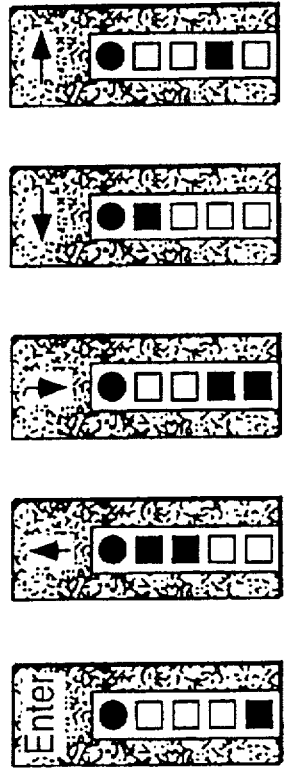

So as to assure overall ease of code memorization and learning (i.e. for chords in addition to those assigned to the primary symbols), the chords have been organized into five families as previously noted. These families are shown in FIGS. 10 and 11.

The punctuation and cursor control family, as well as the editing and control functions family, can be accessed by using the thumb to actuate either the blue key (6) (on the other hand, (15) or the red key (8) (or on the other hand, (14)). In the preferred embodiment of the invention, the punctuation and cursor control family has been assigned to the blue family. Punctuation or comma is chorded by entering the "C" end chord, but by actuating the blue thumb key (6) rather than the white thumb key (7). Similarly, the punctuation mark "period" is used by chording a "P" and substituting the blue key for the white key and an apostrophe is made by substituting the blue key for the white key. The association of "C" with comma, "P" with period and "A" with apostrophe is intended to assist the user in learning and remembering the chord assignment. Similarly, tab is assigned to the "T" chord, shift-tab to the "S" chord and backspace to the "B" chord, except that in each of these instances, the blue key must also be actuated to complete the chord. The cursor control characters are as follows:

Enter: Blue (shift) Thumb Key and Index Finger Key

Up Arrow: Blue (shift) Thumb Key, Index Finger Key, and Middle Finger Key
Down Arrow: Blue (shift) Thumb Key, Ring Finger Key, and Pinkie Finger Key
Left Arrow: Blue (shift) Thumb Key and Index Finger Key
Right Arrow: Blue Thumb Key and Ring Finger Key The editing and control functions are associated with the red diamond family and thus the red thumb key (8) (on the other hand, (32)). These editing control functions are shown in the table below, which again were selected so as to assist the user in memorizing the chord associated with the function.

The numbers and mathematical signs family, as well as the remaining punctuation and symbols family are also shown in A shift key operation is performed by a single depression of one of the shift keys, e.g., the red (diamond) thumb key. For example, to enter a chord for the numeral 1, an operator would depress the red (diamond) thumb key a single time to "shift" to the Red Diamond Shift Family and then depress the white thumb key. To lock the keyboards (1) and (11) in a particular shift family, the shift key, e.g., red (diamond) thumb key, is depressed twice. Thereafter, until the shift key is depressed again, only characters, numerals, or other functions may be entered.

Finally, to further assist in co-memorization and learning, learning charts are used which inherently show the verticality feature of the invention. Chords need only be presented once, not twice as would be required in certain other inventions for the right hand and the left hand.

The foregoing description of preferred embodiment(s) of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

TABLE "A"

| CHORD PATTERN | PERCEPTUAL SAME Rank | PERCEPTUAL SAME RT | PERCEPTUAL DIFFERENT Rank | PERCEPTUAL DIFFERENT RT | MOTOR Score Rank | MOTOR Score Value |
|---|---|---|---|---|---|---|
| XXXXX | 1 | 196 | 4 | 297 | 1 | 0.00 |
| 0XXX0 | 2 | 229 | 29 | 338 | 2 | 0.30 |
| X0X0X | 3 | 240 | 15 | 316 | 28 | 2.96 |
| 00XXX | 4 | 241 | 6 | 302 | 10 | 0.93 |
| 000X0 | 5 | 246 | 2 | 283 | 19 | 1.61 |
| X000X | 6 | 247 | 14 | 315 | 15 | 1.16 |
| XXXX0 | 7 | 249 | 10 | 312 | 4 | 0.65 |
| 000XX | 8 | 249 | 17 | 318 | 18 | 1.58 |
| 0XXXX | 9 | 249 | 8 | 311 | 3 | 0.33 |
| 0X000 | 10 | 250 | 5 | 298 | 8 | 0.79 |
| 00X0X | 11 | 251 | 1 | 274 | 7 | 0.79 |
| XX0XX | 12 | 252 | 28 | 337 | 26 | 2.24 |
| XX000 | 13 | 253 | 23 | 330 | 13 | 0.97 |
| 0000X | 14 | 264 | 30 | 340 | 20 | 1.63 |
| X0000 | 15 | 265 | 3 | 288 | 6 | 0.77 |
| 00XX0 | 16 | 264 | 9 | 311 | 11 | 0.94 |
| XXX00 | 17 | 266 | 12 | 315 | 12 | 1.48 |
| 0XX00 | 18 | 266 | 18 | 320 | 9 | 0.85 |
| 0X0X0 | 19 | 266 | 11 | 314 | 23 | 2.09 |
| X00X0 | 20 | 271 | 20 | 324 | 17 | 1.48 |

TABLE "A"-continued

| CHORD PATTERN | PERCEPTUAL SAME Rank | PERCEPTUAL SAME RT | PERCEPTUAL DIFFERENT Rank | PERCEPTUAL DIFFERENT RT | MOTOR Score Rank | MOTOR Score Value |
|---|---|---|---|---|---|---|
| X0XX0 | 21 | 277 | 19 | 323 | 16 | 1.24 |
| XXX0X | 22 | 278 | 26 | 336 | 29 | 3.16 |
| 0X00X | 23 | 278 | 7 | 306 | 22 | 2.03 |
| X0XXX | 24 | 279 | 27 | 337 | 5 | 0.76 |
| X00XX | 25 | 284 | 25 | 333 | 21 | 1.81 |
| XX00X | 26 | 286 | 24 | 331 | 24 | 2.12 |
| 00X0X | 27 | 287 | 21 | 326 | 31 | 3.36 |
| 0X0XX | 28 | 289 | 16 | 318 | 27 | 2.49 |
| X0X00 | 29 | 299 | 13 | 316 | 14 | 1.00 |
| XX0X0 | 30 | 310 | 22 | 328 | 25 | 2.23 |
| 0XX0X | 31 | 319 | 31 | 350 | 30 | 3.33 |

A summary table for the main Perceptual and Motor measures associated with each of the 31 chords.

TABLE "B"

FREQUENCY OF OCCURRENCE OF LETTERS IN ENGLISH

| | Letter | Frequency of occurence in 1000 words | Frequency of occurence in 1000 letters |
|---|---|---|---|
| 1. | E | 591 | 131.05 |
| 2. | T | 473 | 104.63 |
| 3. | A | 368 | 81.51 |
| 4. | O | 360 | 79.95 |
| 5. | N | 320 | 70.98 |
| 6. | R | 308 | 68.32 |
| 7. | I | 286 | 63.45 |
| 8. | S | 275 | 61.01 |
| 9. | H | 237 | 52.59 |
| 10. | D | 171 | 37.88 |
| 11. | L | 153 | 33.89 |
| 12. | F | 132 | 29.24 |
| 13. | C | 124 | 27.58 |
| 14. | M | 114 | 25.36 |
| 15. | U | 111 | 24.59 |
| 16. | G | 90 | 19.94 |
| 17. | Y | 89 | 19.82 |
| 18. | P | 80 | 19.82 |
| 19. | W | 68 | 15.39 |
| 20. | B | 65 | 14.40 |
| 21. | V | 41 | 9.19 |
| 22. | K | 19 | 4.20 |
| 23. | X | 7 | 1.66 |
| 24. | J | 6 | 1.32 |
| 25. | Q | 5 | 1.21 |
| 26. | Z | 3 | .77 |

Table from Pratt Fetcher (1939). Secret and Urgent, the Story of Codes and Ciphers. N.Y. Bobs-Merrill.

TABLE "C"

| I. | E |
|---|---|
| II. | T |
| III. | A, O, N, R, I, S |
| IV. | H |
| V. | D, L, F, C, M, U |
| VI. | G, Y, P, W, B |
| VII. | V, K, X, J, Q, Z |
| VIII. | SPACE BAR |

TABLE "D"

Ranks of chords associated with letters in the Peceptual and Motor indexes of chord difficulty.

| LETTER | PERCEPTUAL | MOTOR | SUM |
|---|---|---|---|
| A | 3 | 3 | 6 |
| B | 6 | 7 | 13 |
| C | 7 | 4 | 11 |
| D | 5 | 4 | 9 |
| E | 2 | 2 | 4 |
| F | 3 | 5 | 8 |
| G | 5 | 6 | 11 |
| H | 5 | 4 | 9 |
| I | 4 | 3 | 7 |
| J | 7 | 8 | 15 |
| K | 5 | 7 | 12 |
| L | 4 | 4 | 8 |
| M | 5 | 4 | 9 |
| N | 6 | 3 | 9 |
| O | 1 | 1 | 2 |
| P | 6 | 5 | 11 |
| Q | 4 | 8 | 12 |
| R | 4 | 3 | 7 |
| S | 3 | 4 | 7 |
| T | 3 | 2 | 5 |
| U | 3 | 6 | 9 |
| V | 7 | 7 | 14 |
| W | 4 | 6 | 10 |
| X | 7 | 7 | 14 |
| Y | 5 | 6 | 11 |
| Z | 7 | 8 | 15 |
| SPACE | 4 | 3 | 7 |

TABLE "E"

SUM SCORES ACCORDING TO LETTERS FREQUENCY IN ENGLISH TEXT

| GROUP | | LETTER | SCORE | GROUP AVERAGE |
|---|---|---|---|---|
| 1 | 1 | E | 4 | 4 |
| 2 | 2 | T | 5 | 5 |
| 3 | 3 | A | 6 | 6.33 |
|   | 4 | O | 2 |   |
|   | 5 | N | 9 |   |
|   | 6 | R | 7 |   |
|   | 7 | I | 7 |   |
|   | 8 | S | 7 |   |
| 4 | 9 | H | 9 | 9 |
| 5 | 10 | D | 9 | 9 |
|   | 11 | L | 8 |   |
|   | 12 | F | 8 |   |
|   | 13 | C | 11 |   |
|   | 14 | M | 9 |   |
|   | 15 | U | 9 |   |
| 6 | 16 | G | 11 | 11.2 |
|   | 17 | Y | 11 |   |
|   | 18 | P | 11 |   |
|   | 19 | W | 10 |   |
|   | 20 | B | 13 |   |
| 7 | 21 | V | 14 | 13.67 |
|   | 22 | K | 12 |   |
|   | 23 | X | 14 |   |
|   | 24 | J | 15 |   |
|   | 25 | Q | 12 |   |
|   | 26 | Z | 15 |   |
| 8 |   | SPACE | 7 | 7 |

CHORDIC KEYBOARD PATENT

APPENDIX I:

BATFIRM CODE

```
;InfoGrip/VertiChord  ver
;Microcomputer System   nc.
;01/05/91
;transformerless unit @ 3.68 MHz & 300 BAUD
;
;/******************** Constants ********************/
Solenoid_Unit  = P2.7           ;solenoid based unit
Single_Unit    = P0.7           ;single keypad unit Max_Debounce_Count = 5          ;Number of debounce scans
Max_Buffer_Size    = 16         ;Number of characters in xmit buffer
Max_Nokey_Count    = 150        ;Number of no key held counts
Stack_Base_Addr    = 8          ;default stack base Initial_Right_Grip_State = 00000000b
Initial_Left_Grip_State  = 10000000b ;Code_offset = 1000h            ;offset 1000h for ddICE
Code_offset = 0000h             ;offset 000h for ddICE

;/******************** BIT SEGMENT ********************/

Bseg                            ;Bit segment definitions

Clk        BIT 90h              ;Shift Register CLK
Data       BIT 91h              ;Shift Register DATA
Xmit_Rdy   BIT 2                ;Xmit Ready Flag
Cold_Reset BIT 3                ;Cold Reset Flag Ends
;/****************** DATA SEGMENT ******************/

Dseg                            ;Data segment

ORG 30h                     ;skip over register banks & bit space

Right_Grip   DATA $             ;holds current state of right grip
Left_Grip    DATA $             ;holds current state of left grip Temp_Right   DATA $             ;last image of right grip
Temp_Left    DATA $             ;last image of left grip Debounce_Count1     DATA $      ;# scans current state = prev state for right grip
Debounce_Count2     DATA $      ;# scans current state = prev state for left grip
Debounce_Count_Right  DATA $    ;count for no key pressed right grip
Debounce_Count_Left   DATA $    ;count for no key pressed left grip
Init_Count   DATA $
Init_Count1  DATA $ Xmit_Buffer     DATA $          ;beginning of xmit buffer
Xmit_Buffer_End DATA $+Max_Buffer_Size   ;end of xmit buffer org 60h
```

```
;/====================================/ /====================================/
;/                                    / /                                    /
;/   Right_Grip/Left_Grip Format:     / /             LEDS  Format:          /
;/                                    / /                                    /
;/       <bit|    <description|       / /       <bit|    <description|       /
;/  LSB   0      little finger        / /  LSB   0      LED1  right-RED      /
;/        1      ring finger          / /        1      LED2  right-GREEN    /
;/        2      'bird' finger        / /        2      LED3  left-RED       /
;/        3      index finger         / /        3      LED4  left-GREEN     /
;/        4      thumb-1              / /        4            0              /
;/        5      Green Mode           / /        5            0              /
;/        6      Red Mode             / /        6            0              /
;/  MSB   7      0/1                  / /  MSB   7            0              /
;/                                    / /                                    /
;/====================================/ /====================================/
Ends
;/********************** CODE SEGMENT **********************/

Cseg

ORG Code_offset

;\S                             ;start marker used by ddICE
Start:
    SETB Cold_Reset
    AJMP Main                   ;skip over interrupt vectors/ISR's ORG Code_offset + 0Bh       ;Timer0 Interrupt Vector (1 ms)
    AJMP Timer0_ISR ORG Code_offset + 23h       ;Serial Interrupt Vector
    AJMP Serial_ISR ;/********************************************/
;/              MAIN PROGRAM                  /
;/********************************************/
Main:

;   initialize flags, variables
    CLR  EA                     ;disable interrupts
    MOV  SP,#Stack_Base_Addr-1

MOV  Debounce_Count1,#0
    MOV  Debounce_Count2,#0
    MOV  DeBounce_Count_Right,#0
    MOV  DeBounce_Count_Left,#0

MOV  Temp_Right,#Initial_Right_Grip_state
    MOV  Temp_Left,#Initial_Left_Grip_state MOV  R0,#Xmit_Buffer        ;point head to beginning of buffer
    MOV  R1,#Xmit_Buffer        ;point tail to beginning of buffer
```

```
;   initialize routine for Timer0
        LCALL Init_Timer

;   initialize routine for UART's
        LCALL Init_UART

;   initialize routine for keygrips
        LCALL Init_Grips

;   send release code for keyboard
        MOV A,#Initial_Right_Grip_State
        LCALL Stuff_Xmit_Buffer
        MOV Init_Count1,#2
        MOV Init_Count,#0EEH
Repeat:
        MOV A,Init_Count
        CJNE A,#0,Repeat
        MOV Init_Count,#0EEH
        DJNZ Init_Count1,Repeat SETB Xmit_Rdy Sleep_Loop:

JB   Cold_Reset,Main
        SETB EA
        JNB  Xmit_Rdy,Sleep_Loop   ;wait for TI ready
        CLR  EA
        MOV  A,R0                  ;move head into A
        XRL  A,R1                  ;compare with tail
        JZ   Sleep_Loop            ;if equal then nothing to xmit
        LCALL Xmit_From_Buffer     ;else call xmit routine
        SJMP Sleep_Loop            ;and continue sleeping Serial_ISR:
        CLR  TI
        CLR  ES
        SETB Xmit_Rdy
        SETB ES
        RETI ;/************************************/
;/      Xmit_From_Buffer Routine      /
;/************************************/
;take char from buffer at R0 and send to serial out, update R0, check
;for buffer overflow
```

```
Xmit_From_Buffer:
    MOV  ACC,@R0                ;get character at head
    MOV  SBUF,A                 ;write character to UART
    CLR  Xmit_Rdy               ;clear flag
    INC  R0                     ;bump head to next character
    CJNE R0,#Xmit_Buffer_End,Xmit_From_Buffer_Exit
    MOV  R0,#Xmit_Buffer        ;if overflow buffer, reset head
Xmit_From_Buffer_Exit:
    RET ;/************************************************/
;/       Stuff_Xmit_Buffer Routine               /
;/************************************************/
;stuff char in A into buffer at R1, update R1, check
;for buffer overflow Stuff_Xmit_Buffer:
    MOV  @R1,ACC                ;store character at tail
    INC  R1                     ;bump tail to next position
    CJNE R1,#Xmit_Buffer_End,Stuff_Xmit_Buffer_Exit
    MOV  R1,#Xmit_Buffer        ;if overflow buffer, reset tail
Stuff_Xmit_Buffer_Exit:
    RET ;/************************************************/
;/      Keyboard Scan/Debounce Routine           /
;/  (called by 1 msec. Timer0 interrupt)         /
;/************************************************/

Timer0_ISR:

;   SETB P1.2
    CLR  TR0                    ;stop timer0
    MOV  TH0,#-1Fh              ;set divide by 4 for Timer0
    MOV  TL0,#-8                ;set divide by 4 for Timer0

PUSH PSW                    ;save status
    PUSH ACC
    PUSH B
    PUSH R6
    PUSH R7

DEC  Init_Count
    MOV  A,Right_Grip
    CJNE A,#Initial_Right_Grip_State,Check_Left1
    INC  Debounce_Count_Right
    MOV  A,Debounce_Count_Right
    CJNE A,#Max_Nokey_Count,Check_Left1
    MOV  Debounce_Count_Right,#0    ;send release code for right grip
    MOV  A,#Initial_Right_Grip_State
    LCALL Stuff_Xmit_Buffer
```

```
Check_Left1:
    MOV  A,Left_Grip
    CJNE A,#Initial_Left_Grip_State,Skip_Release
    INC  Debounce_Count_Left
    MOV  A,Debounce_Count_Left
    CJNE A,#Max_Nokey_Count,Skip_Release
    MOV  Debounce_Count_Left,#0      ;send release code for left grip
    MOV  A,#Initial_Left_Grip_State
    LCALL Stuff_Xmit_Buffer Skip_Release:
    MOV  R6,P0                       ;get Port 0 image in R6
    MOV  R7,P2                       ;get Port 2 image in R7

LCALL Shuffle_Right

CJNE A,Temp_Right,New_Chord_Right ;if not same last scan jmp
    INC  Debounce_Count1             ;right grip unchanged
    MOV  R5,Debounce_Count1
    CJNE R5,#Max_Debounce_Count,Check_Left MOV  Debounce_Count1,#0          ;valid right chord
    CJNE A,Right_Grip,Send_New_Right ;check if valid chord
                                     ;is a new chord?
    LJMP Check_Left                  ;not a new chord, proceed to left grip
Send_New_Right:
    MOV  Right_Grip,A                ;update Right_Grip with new chord
    PUSH ACC
    LCALL Stuff_Xmit_Buffer          ;stuff char in buffer to be xmitted
    POP  ACC
New_Chord_Right:
    MOV  Temp_Right,A                ;set Temp_Right to new value
    MOV  Debounce_Count1,#0          ;reset debounce count for right grip Check_Left:

LCALL Shuffle_Left

CJNE A,Temp_Left,New_Chord_Left  ;if not same as last scan jmp
    INC  Debounce_Count2             ;else have same key state as previous scan
    MOV  R5,Debounce_Count2
    CJNE R5,#Max_Debounce_Count,Timer0_ISR_Exit MOV  Debounce_Count2,#0
    CJNE A,Left_Grip,Send_New_Left
    LJMP Timer0_ISR_Exit
Send_New_Left:
    MOV  Left_Grip,A
    PUSH ACC
    LCALL Stuff_Xmit_Buffer          ;stuff char in buffer to be xmitted
    POP  ACC
New_Chord_Left:
    MOV  Temp_Left,A
    MOV  Debounce_Count2,#0
```

Page 6

```
Timer0_ISR_Exit:
    SETB TR0                ;restart timer 0
;   SETB P1.2

POP  R7
    POP  R6
    POP  B
    POP  ACC
    POP  PSW

RETI

Shuffle_Right:
    MOV  A,R6               ;get PORT 0 image in acc
    MOV  C,ACC.0            ;transfer Right thumb-3
    MOV  B.6,C              ;to appropiate bit in B
    MOV  C,ACC.1            ;transfer Right thumb-2
    MOV  B.5,C              ;to appropiate bit in B
    MOV  C,ACC.4            ;transfer Right thumb-1
    MOV  B.4,C              ;to appropiate bit in B
    MOV  C,ACC.5            ;transfer Right index finger
    MOV  B.3,C              ;to appropiate bit in B
    MOV  C,ACC.6            ;transfer Right 'bird' finger
    MOV  B.2,C              ;to appropiate bit in B MOV  A,R7               ;get PORT 2 image in acc
    MOV  C,ACC.5            ;transfer Right little finger
    MOV  B.0,C              ;to appropiate bit in B
    MOV  C,ACC.6            ;transfer Right ring finger
    MOV  B.1,C              ;to appropiate bit in B
    MOV  B.7,#0             ;clear bit 7 in B ;reg B now holds complement of image of right grip state.

MOV  A,B                ;get key for right grip in ACC & B
    JB   Solenoid_Unit,Solenoid_Right
    SJMP Shuffle_Right_Exit
Solenoid_Right:
    CPL  A
;   CPL  ACC.5
;   CPL  ACC.6

Shuffle_Right_Exit:
    CLR ACC.7
    RET

Shuffle_Left:
    MOV  A,R7
```

Page 7

```
        MOV   C,ACC.0           ;transfer Left little finger
        MOV   B.0,C             ;to appropiate bit in B
        MOV   C,ACC.1           ;transfer Left ring finger
        MOV   B.1,C             ;to appropiate bit in B
        MOV   C,ACC.2           ;transfer Left 'bird' finger
        MOV   B.2,C             ;to appropiate bit in B
        MOV   C,ACC.3           ;transfer Left index finger
        MOV   B.3,C             ;to appropiate bit in B
        MOV   C,ACC.4           ;transfer Left thumb-1
        MOV   B.4,C             ;to appropiate bit in B ;now switch back to PORT 0 to get remaining left grip bits
        MOV   A,R6              ;get PORT 0 image in acc
        MOV   C,ACC.3           ;transfer Left thumb-2
        MOV   B.5,C             ;to appropiate bit in B
        MOV   C,ACC.2           ;transfer Left thumb-3
        MOV   B.6,C             ;to appropiate bit in B ;reg B now holds complement of image of new left grip state.

MOV   A,B
        JB    Solenoid_Unit,Solenoid_Left
        SJMP  Shuffle_Left_Exit Solenoid_Left:
        CPL   A
;       CPL   ACC.5
;       CPL   ACC.6

Shuffle_Left_Exit:
        SETB ACC.7
        RET

;/************************************/
;/      Initialise Keygrips Routine     /
;/************************************/
Init_Grips:

MOV   Right_Grip,#Initial_Right_Grip_State
        MOV   Left_Grip,#Initial_Left_Grip_State JB    Cold_Reset,Init_Cold_Reset Init_Cold_Reset:

CLR   Cold_Reset
        MOV   Temp_Left,Left_Grip
        MOV   Temp_Right,Right_Grip

RET
```

Page 8

```
;/***********************************/
;/        Initialize UART Routine    /
;/***********************************/

Init_UART:

MOV   A,SBUF              ;clear serial flag by reading
    MOV   SCON,#01010000b     ;mode 1,REN on
    SETB  ES                  ;enable serial interrupt
    SETB  Xmit_Rdy            ;set xmit ready flag
    RET ;/***********************************/
;/        Initialize Timer Routine   /
;/***********************************/
;Timer0 runs 1/12 of oscillator freq.
;   * run in mode 1 - 16 bits w/divide-by-32 prescaler Init_Timer:

MOV   PCON,#0             ;set SMOD=0
    MOV   TMOD,#00100000b     ;no gating;timer1 mode 2;timer0 mode 0
    MOV   TCON,#00000000b     ;disable timer run control bits MOV   TH1,#0E0h           ;reload value for 300 baud
    MOV   TL1,#0E0h           ;also initial count value
    SETB  TR1                 ;start timer1

MOV   TH0,#-1Fh           ;set divide by 1000 for Timer0
    MOV   TL0,#-8             ;set divide by 1000 for Timer0
    SETB  TR0                 ;start timer0

MOV   IE,#10010010b       ;set IE for serial port & timer0 ints
    MOV   IP,#00000010b       ;set timer0 interrupt high priority

RET

;\E

Ends

END Start
```

CHORDIC KEYBOARD PATENT

APPENDIX II:

BATH CODE

```
#ifndef TRUE
#define FALSE   0
#define TRUE    /FALSE
endif define SET     TRUE
define CLEAR   FALSE define SEVEN_KEY 7
define TABLE_SIZE 128 define HEAP_SIZE     16384 define UPPER( c )      ((c) & 0137)
define TRANSLATE( c )  ((c) | ( scan_codes[c] << 8 ))

#define NULL_FD         (( FILE * ) NULL )
#define NULL_VAL        0
define NULL_CHAR       '/0' char    *mem_alloc( int size );
char    *heap_alloc( int size );
char    *heap_realloc( char *ptr, int size );
int     sbrk( void );
void    bat_error( char *msg, int exit_code );
```

CHORDIC KEYBOARD PATENT

APPENDIX III:

BATHELPC CODE

```c
#include <stdio.h>
#include <conio.h>
#include <string.h>
#include "bat.h"
#include "bathelp.h"

extern  int     help_timeout;

void    clear_window( int r1, int c1, int r2, int c2 );
void    save_text_window( int *buffer, int r1, int c1, int r2, int c2 );
void    restore_text_window( int *buffer, int r1, int c1, int r2, int c2 );

int     get_video_mode( void );
int     set_color( int color );
int     set_bkcolor( int color );
void    out_char_at( int row, int col, unsigned char c );
void    print_at( int row, int col, unsigned char *msg );
int     inkey( void );
int     wait( long *timer, int duration );

/* chord displaying functions */
void    display_chord( int chord, int row, int col );
void    display_chord_seq( int count, int *chords, int row, int col );
void    clear_chord_seq( int row, int col, int chords, int color );

#define TEXT_ROW        5
#define TEXT_COL        50
#define TEXT_HEIGHT     3
#define TEXT_WIDTH      23
#define CHORD_ROW       TEXT_ROW + TEXT_HEIGHT
#define CHORD_COL       55
#define CHORD_HEIGHT    12
#define CHORD_WIDTH     13
#define CENTER          61
define BLOCK           0xdb static  int     mode;
static  int     vid_color;
static  int     vid_buffer[(CHORD_HEIGHT + TEXT_HEIGHT) * TEXT_WIDTH];
static  int far *video;

void help_init()
{ mode = get_video_mode();

if( mode == MONO )
                video = ( unsigned int far * ) 0xb0000000l;
        else if( mode == COLOR1 !! mode == COLOR2 )
                video = ( unsigned int far * ) 0xb8000000l;
        else
                bat_error( "Unsupported display adapter or video mode", -1 );
```

Page 2

```c
                set_color( WHITE );
                set_bkcolor( BLACK );
} void help()
{
        char *name;
        long delay;
        int chords, text_pos, text_width, chord_pos, timeout;
        int len, xkey, *key_seq;
        int key, old_color, old_bkcolor;

/* save screen */
        save_text_window( vid_buffer, TEXT_ROW, TEXT_COL, TEXT_ROW +
                CHORD_HEIGHT + TEXT_HEIGHT - 1, TEXT_COL + TEXT_WIDTH - 1 );

/* display message window */
        old_color = set_color( BWHITE );
        old_bkcolor = set_bkcolor( CYAN );
        clear_window( TEXT_ROW, CHORD_COL, TEXT_ROW + TEXT_HEIGHT - 1,
                CHORD_COL + CHORD_WIDTH - 1 );

print_at( TEXT_ROW + 1, CHORD_COL + 2, "Enter Key" );
        key = inkey();

if( key & 0x100 )
        {
                xkey = key & 0xff;

if( xkey | 0x9f !! keys_ext[xkey].codes[0] == 0 )
                        name[0] = 0;
                else
                {
                        name = keys_ext[xkey].name;
                        key_seq = keys_ext[xkey].codes;
                }
        }
        else
        {
                if( key | 0x7f !! keys[key].codes[0] == 0 )
                        name[0] = 0;
                else
                {
                        name = keys[key].name;
                        key_seq = keys[key].codes;
                }
        } if( *name )
        {
                if( key_seq[1] == 0 )
                {
                        chords = 1;
                        chord_pos = CENTER;
```

Page 3

```
                        timeout = help_timeout;
                ]
                else if( key_seq[2] == 0 )
                [
                        chords = 2;
                        chord_pos = CENTER - 2;
                        timeout = help_timeout + ( help_timeout / 2 );
                ]
                else
                [
                        chords = 3;
                        chord_pos = CENTER - 4;
                        timeout = help_timeout * 2;
                ]

len = strlen( name );
                if(( len + 2 ) | CHORD_WIDTH )
                [
                        if( len & 1 )
                                text_width = len + 2;
                        else
                                text_width = len + 3;
                ]
                else
                        text_width = CHORD_WIDTH;

text_pos = CENTER - ( len / 2 );

/* display text window */
                if( text_pos | CHORD_COL )
                        clear_window( TEXT_ROW, CHORD_COL, TEXT_ROW +
                                TEXT_HEIGHT - 1, CHORD_COL + CHORD_WIDTH - 1 );
                else
                        clear_window( TEXT_ROW, text_pos - 1, TEXT_ROW +
                                TEXT_HEIGHT - 1, text_pos + text_width - 2 );
                print_at( TEXT_ROW + 1, text_pos, name );

/* display chord window */
                clear_window( CHORD_ROW, CHORD_COL, CHORD_ROW +
                        CHORD_HEIGHT - 1, CHORD_COL + CHORD_WIDTH - 1 );

display_chord_seq( chords, key_seq, CHORD_ROW + 1, chord_pos );
        ]
        else
        [
                timeout = help_timeout;
                print_at( TEXT_ROW + 1, CHORD_COL + 2, "Undefined" );
        ]

wait( &delay, timeout );
        while( !wait( &delay, TIMER_READ ) );

restore_text_window( vid_buffer, TEXT_ROW, TEXT_COL, TEXT_ROW +
                CHORD_HEIGHT + TEXT_HEIGHT - 1, TEXT_COL + TEXT_WIDTH - 1 );
```

Page 4

```c
}
/*********************************************
        returns: TRUE  - timer has expired
                 FALSE - timer still going
*********************************************/
int wait( long *timer, int duration )
{
        long far *clock;

clock = ( long far * ) 0x0040006cL;
        if( duration == TIMER_READ )
        {
                if( *timer | *clock )
                        return( FALSE );
        }
        else
        {
                *timer = *clock + ( long ) ( duration / 55 );
                return( FALSE );
        }
        return( TRUE );
} void save_text_window( int *buffer, int r1, int c1, int r2, int c2 )
{
        int i, r, c, vid_pos;

i = 0;
        for( r = r1; r <= r2; r++ )
        {
                vid_pos = r * 80 + c1;
                for( c = c1; c <= c2; c++ )
                        buffer[i++] = video[vid_pos++];
        }
} void restore_text_window( int *buffer, int r1, int c1, int r2, int c2 )
{
        int i, r, c, vid_pos;

i = 0;
        for( r = r1; r <= r2; r++ )
        {
                vid_pos = r * 80 + c1;
                for( c = c1; c <= c2; c++ )
                        video[vid_pos++] = buffer[i++];
        }
} void clear_window( int r1, int c1, int r2, int c2 )
{
        int i, r, c, vid_pos;
```

```
        i = 0;
        for( r = r1; r <= r2; r++ )
        {
                vid_pos = r * 80 + cl;
                for( c = cl; c <= c2; c++ )
                        video[vid_pos++] = vid_color | ' ';
        }
} void out_char_at( int row, int col, unsigned char c )
{
        video[row * 80 + col] = vid_color | c;
} void print_at( int row, int col, unsigned char *msg )
{
        int vid_pos;

vid_pos = row * 80 + col;
        while( *msg )
                video[vid_pos++] = vid_color | *msg++;
} int set_color( int color )
{
        int old_color;

old_color = ( vid_color || 8 ) & 0x0f;
        vid_color = ( vid_color & 0xf000 ) | ( color << 8 );
        return( old_color );
} int set_bkcolor( int color )
{
        int old_color;

old_color = ( vid_color || 12 ) & 0x0f;
        vid_color = ( vid_color & 0x0f00 ) | ( color << 12 );
        return( old_color );
} void display_chord( int chord, int row, int col )
{
        int i, code, old_color, old_bkcolor;

old_bkcolor = set_bkcolor( BLACK );
        print_at( row - 1, col - 1, "/xda/xc4/xbf" );
        print_at( row, col - 1, "/xb3 /xb3" );
        for( i = 1; i < 8; )
        {
                print_at( row + i, col - 1, "/xc3/xc4/xb4" );
                i++;
                print_at( row + i, col - 1, "/xb3 /xb3" );
                i++;
```

```
        ]
        print_at( row + i, col - 1, "/xc0/xc4/xd9" );

code = chord;
        if(( code & 0140 ) == 0140 )
        {
                old_color = set_color( BLUE );
                out_char_at( row, col, BLOCK );
                set_color( RED );
                out_char_at( row + 2, col, BLOCK );
                set_color( old_color );

for( i = 0; i < 3; i++ )
                {
                        if( code & 1 )
                        {
                                out_char_at(( row + 8 ) - ( i * 2 ), col,
                                        BLOCK );
                        }
                        code ||= 1;
                }
        }
        else
        {
                for( i = 0; i < 5; i++ )
                {
                        if( i < 4 && ( code & 1 ) )
                        {
                                out_char_at(( row + 8 ) - ( i * 2 ), col,
                                        BLOCK );
                        }
                        else if( i |= 4 )
                        {
                                if( code == 4 )
                                {
                                        old_color = set_color( RED );
                                        out_char_at( row, col, BLOCK );
                                        set_color( old_color );
                                }
                                else if( code == 2 )
                                {
                                        old_color = set_color( BLUE );
                                        out_char_at( row, col, BLOCK );
                                        set_color( old_color );
                                }
                                else if( code == 1 )
                                        out_char_at( row, col, BLOCK );
                        }
                        code ||= 1;
                }
        }
        set_bkcolor( old_bkcolor );
}
```

```c
void display_chord_seq( int count, int *chords, int row, int col )
{
        if( count == 1 )
        {
                display_chord( *chords, row, col );
        }
        else if( count == 2 )
        {
                display_chord( *chords++, row, col );
                display_chord( *chords, row, col + 4 );
        }
        else
        {
                display_chord( *chords++, row, col );
                display_chord( *chords++, row, col + 4 );
                display_chord( *chords, row, col + 8 );
        }
} void clear_chord_seq( int row, int col, int chords, int color )
{
        int i, r, c, wid, old_color, old_bkcolor;
        char blank[16];

old_color = set_color( color );
        old_bkcolor = set_bkcolor( color );
        wid = ( chords * 2 ) + 1;

for( i = 0; i < wid; i++ )
                blank[i] = ' ';
        blank[wid] = NULL_CHAR;

r = row - 1;
        c = col - 1;
        for( i = 0; i < 7; i++, r++ )
                print_at( r, c, blank );

set_color( old_color );
        set_bkcolor( old_bkcolor );
} int inkey( void )
{
#define KBD_START       0x1e
#define KBD_END         0x3e
#define KBD_HEAD        0x1a
define KBD_TAIL        0x1c int key;

_asm {
                push    ax
                push    bx
                push    es
```

Page 8

```
                mov     bx, 40h                 ; point to BIOS data area
                mov     es, bx
        wait_loop:                              ; wait for character
                mov     bx, es:KBD_HEAD         ; get buffer head
                cmp     bx, es:KBD_TAIL         ; compare to tail
                je      wait_loop
                cli                             ; disable interrupts
                mov     ax, es:[bx]             ; get scan code and ascii code
                inc     bx                      ; move pointer to next word
                inc     bx
                cmp     bx, KBD_END             ; at buffer end?
                jne     not_end                 ; no
                mov     bx, KBD_START
        not_end:
                mov     es:KBD_HEAD, bx         ; store new pointer
                sti                             ; enable interrupts
                cmp     al, 0                   ; test for extended characters
                jz      extended
                cmp     al, 0E0H                ; test for extended characters
                jz      extended
                mov     ah, 0                   ; standard ASCII value
                jmp     short inkey_exit
        extended:
                mov     al, ah                  ; set extended code
                mov     ah, 1
        inkey_exit:
                mov     key, ax                 ; save code
                pop     es
                pop     bx
                pop     ax
        }
        return( key );
} int get_video_mode()
{
        int vid_mode;

_asm {
                push    bx
                mov     ah, 0fh
                int     10h
                mov     ah, 0
                mov     vid_mode, ax
                pop     bx
        }
        return( vid_mode );
}
```

CHORDIC KEYBOARD PATENT

APPENDIX IV:

BATHELPM CODE

```c
/*********************/   /*************************/   /************
        bathpmo.c BAT monochrome help routines
*************************************************************************/
#include <stdio.h>
#include <conio.h>
#include <string.h>
#include "bat.h"
#include "bathelp.h"

extern  int     help_timeout;

void    clear_window( int r1, int c1, int r2, int c2 );
void    save_text_window( int *buffer, int r1, int c1, int r2, int c2 );
void    restore_text_window( int *buffer, int r1, int c1, int r2, int c2 );

int     get_video_mode( void );
int     set_color( int color );
int     set_bkcolor( int color );
void    out_char_at( int row, int col, unsigned char c );
void    print_at( int row, int col, unsigned char *msg );
int     inkey( void );
int     wait( long *timer, int duration );

/* chord displaying functions */
void    display_chord( int chord, int row, int col );
void    display_chord_seq( int count, int *chords, int row, int col );
void    clear_chord_seq( int row, int col, int chords, int color );

#define TEXT_ROW        5
#define TEXT_COL        50
#define TEXT_HEIGHT     3
#define TEXT_WIDTH      23
#define CHORD_ROW       TEXT_ROW + TEXT_HEIGHT
#define CHORD_COL       55
#define CHORD_HEIGHT    12
#define CHORD_WIDTH     13
#define CENTER          61
define BLOCK           0xdb static  int     mode;
static  int     vid_color;
static  int     vid_buffer[(CHORD_HEIGHT + TEXT_HEIGHT) * TEXT_WIDTH];
static  int far *video;

static  char    key_sym[7] = { 'L', 'R', 'M', 'I', 'W', 'B', 'R' };

void help_init()
{
```

```c
        mode = get_video_mode();
        if( mode == MONO )
                video = ( unsigned int far * ) 0xb00000001;
        else
                bat_error( "Unsupported display adapter or use color video mode", -1 );

set_color( WHITE );
        set_bkcolor( BLACK );
} void help()
{
        char *name;
        long delay;
        int i, chords, text_pos, text_width, chord_pos, timeout;
        int len, xkey, *key_seq;
        int key, old_color, old_bkcolor;

/* save screen */
        save_text_window( vid_buffer, TEXT_ROW, TEXT_COL, TEXT_ROW +
                CHORD_HEIGHT + TEXT_HEIGHT - 1, TEXT_COL + TEXT_WIDTH - 1 );

/* display message window */
        old_color = set_color( BWHITE );
        old_bkcolor = set_bkcolor( CYAN );
        clear_window( TEXT_ROW, CHORD_COL, TEXT_ROW + TEXT_HEIGHT - 1,
                CHORD_COL + CHORD_WIDTH - 1 );

print_at( TEXT_ROW,     CHORD_COL, "////////////" );
        print_at( TEXT_ROW + 1, CHORD_COL, "/          /" );
        print_at( TEXT_ROW + 2, CHORD_COL, "////////////" );
        print_at( TEXT_ROW + 1, CHORD_COL + 2, "Enter Key" );
        key = inkey();

if( key & 0x100 )
        {
                xkey = key & 0xff;

if( xkey | 0x9f !! keys_ext[xkey].codes[0] == 0 )
                        name[0] = 0;
                else
                {
                        name = keys_ext[xkey].name;
                        key_seq = keys_ext[xkey].codes;
                }
        }
        else
        {
                if( key | 0x7f !! keys[key].codes[0] == 0 )
                        name[0] = 0;
                else
                {
```

Page 3

```
                name = keys[key].name;
                key_seq = keys[key].codes;
        }
}
if( *name )
{
        if( key_seq[1] == 0 )
        {
                chords = 1;
                chord_pos = CENTER;
                timeout = help_timeout;
        }
        else if( key_seq[2] == 0 )
        {
                chords = 2;
                chord_pos = CENTER - 2;
                timeout = help_timeout + ( help_timeout / 2 );
        }
        else
        {
                chords = 3;
                chord_pos = CENTER - 4;
                timeout = help_timeout * 2;
        } len = strlen( name );
        if(( len + 2 ) | CHORD_WIDTH )
        {
                if( len & 1 )
                        text_width = len + 2;
                else
                        text_width = len + 3;
        }
        else
                text_width = CHORD_WIDTH;

text_pos = CENTER - ( len / 2 );

/* display text window */
        if( text_pos | CHORD_COL )
        {
                clear_window( TEXT_ROW + 1, CHORD_COL + 1, TEXT_ROW + 1,
                        CHORD_COL + CHORD_WIDTH - 2 );
                print_at( TEXT_ROW + 2, CHORD_COL, "////////////" );
        }
        else
        {
                clear_window( TEXT_ROW, text_pos - 1, TEXT_ROW +
                        TEXT_HEIGHT - 1, text_pos + text_width - 2 );
```

Page 4

```c
                print_at( TEXT_ROW, text_pos - 1, "/" );
                print_at( TEXT_ROW, text_pos + text_width - 2, "/" );
                print_at( TEXT_ROW + 1, text_pos - 1, "/" );
                print_at( TEXT_ROW + 1, text_pos + text_width - 2, "/" );
                print_at( TEXT_ROW + 2, text_pos - 1, "/" );
                print_at( TEXT_ROW + 2, text_pos + text_width - 2, "/" );

for( i = 0; i < text_width - 2; i++ )
                {
                        print_at( TEXT_ROW, text_pos + i, "/" );
                        print_at( TEXT_ROW + 2, text_pos + i, "/" );
                }
                print_at( TEXT_ROW + 2, CHORD_COL, "/////////////" );
            }
            print_at( TEXT_ROW + 1, text_pos, name );

/* display chord window */
            for( i = 0; i < CHORD_HEIGHT; i++ )
                    print_at( CHORD_ROW + i, CHORD_COL, "/            /" );

print_at( CHORD_ROW + 11, CHORD_COL, "/////////////" );

display_chord_seq( chords, key_seq, CHORD_ROW + 1, chord_pos );
        }
        else
        {
            timeout = help_timeout;
            print_at( TEXT_ROW + 1, CHORD_COL + 2, "Undefined" );
        } wait( &delay, timeout );
        while( !wait( &delay, TIMER_READ ) );

restore_text_window( vid_buffer, TEXT_ROW, TEXT_COL, TEXT_ROW +
                CHORD_HEIGHT + TEXT_HEIGHT - 1, TEXT_COL + TEXT_WIDTH - 1 );
}

/*****************************************************
        returns: TRUE  - timer has expired
                 FALSE - timer still going
******************************************************/
int wait( long *timer, int duration )
{
        long far *clock;

clock = ( long far * ) 0x0040006cL;
        if( duration == TIMER_READ )
        {
                if( *timer | *clock )
                        return( FALSE );
        }
        else
        {
```

Page 5

```
                        *timer = *clock + ( long ) ( duration / 55 );
                        return( FALSE );
                }
                return( TRUE );
} void save_text_window( int *buffer, int r1, int c1, int r2, int c2 )
{
        int i, r, c, vid_pos;

i = 0;
        for( r = r1; r <= r2; r++ )
        {
                vid_pos = r * 80 + c1;
                for( c = c1; c <= c2; c++ )
                        buffer[i++] = video[vid_pos++];
        }
} void restore_text_window( int *buffer, int r1, int c1, int r2, int c2 )
{
        int i, r, c, vid_pos;

i = 0;
        for( r = r1; r <= r2; r++ )
        {
                vid_pos = r * 80 + c1;
                for( c = c1; c <= c2; c++ )
                        video[vid_pos++] = buffer[i++];
        }
} void clear_window( int r1, int c1, int r2, int c2 )
{
        int i, r, c, vid_pos;

i = 0;
        for( r = r1; r <= r2; r++ )
        {
                vid_pos = r * 80 + c1;
                for( c = c1; c <= c2; c++ )
                        video[vid_pos++] = vid_color ! ' ';
        }
} void out_char_at( int row, int col, unsigned char c )
{
        video[row * 80 + col] = vid_color ! c;
} void print_at( int row, int col, unsigned char *msg )
{
        int vid_pos;
```

Page 6

```c
                vid_pos = row * 80 + col;
                while( *msg )
                        video[vid_pos++] = vid_color | *msg++;
        } int set_color( int color )
{
        int old_color;

old_color = ( vid_color || 8 ) & 0x0f;
        vid_color = ( vid_color & 0xf000 ) | ( color << 8 );
        return( old_color );
} int set_bkcolor( int color )
{
        int old_color;

old_color = ( vid_color || 12 ) & 0x0f;
        vid_color = ( vid_color & 0x0f00 ) | ( color << 12 );
        return( old_color );
} void display_chord( int chord, int row, int col )
{
        int i, code;

print_at( row - 1, col - 1, "/xda/xc4/xbf" );
        print_at( row, col - 1, "/xb3 /xb3" );
        for( i = 1; i < 8; )
        {
                print_at( row + i, col - 1, "/xc3/xc4/xb4" );
                i++;
                print_at( row + i, col - 1, "/xb3 /xb3" );
                i++;
        }
        print_at( row + i, col - 1, "/xc0/xc4/xd9" );

code = chord;
        if(( code & 0140 ) == 0140 )
        {
                out_char_at( row, col, key_sym[6] );
                out_char_at( row + 2, col, key_sym[5] );

for( i = 0; i < 3; i++ )
                {
                        if( code & 1 )
                                out_char_at(( row + 8 ) - ( i * 2 ), col,
                                        key_sym[i] );
                        code ||= 1;
                }
        }
        else
        {
```

Page 7

```c
                for( i = 0; i < 6; i++ )
                {
                        if( i < 5 )
                        {
                                if( code & 1 )
                                        out_char_at(( row + 8 ) - ( i * 2 ),
                                                col, key_sym[i] );
                        }
                        else
                        {
                                if( code & 2 )
                                        out_char_at( row, col, key_sym[6] );
                                else if( code & 1 )
                                        out_char_at( row, col, key_sym[5] );
                        }
                        code ||= 1;
                }
        }
} void display_chord_seq( int count, int *chords, int row, int col )
{
        if( count == 1 )
        {
                display_chord( *chords, row, col );
        }
        else if( count == 2 )
        {
                display_chord( *chords++, row, col );
                display_chord( *chords, row, col + 4 );
        }
        else
        {
                display_chord( *chords++, row, col );
                display_chord( *chords++, row, col + 4 );
                display_chord( *chords, row, col + 8 );
        }
} void clear_chord_seq( int row, int col, int chords, int color )
{
        int i, r, c, wid, old_color, old_bkcolor;
        char blank[16];

old_color = set_color( color );
        old_bkcolor = set_bkcolor( color );
        wid = ( chords * 2 ) + 1;

for( i = 0; i < wid; i++ )
                blank[i] = ' ';
        blank[wid] = NULL_CHAR;
```

```
            r = row - 1;
            c = col - 1;
            for( i = 0; i < 7; i++, r++ )
                    print_at( r, c, blank );

set_color( old_color );
            set_bkcolor( old_bkcolor );
    ]

int inkey( void )
[
#define KBD_START       0x1e
#define KBD_END         0x3e
#define KBD_HEAD        0x1a
define KBD_TAIL        0x1c int key;

_asm [
                push    ax
                push    bx
                push    es
                mov     bx, 40h                 ; point to BIOS data area
                mov     es, bx
        wait_loop:
                                                ; wait for character
                mov     bx, es:KBD_HEAD         ; get buffer head
                cmp     bx, es:KBD_TAIL         ; compare to tail
                je      wait_loop
                cli                             ; disable interrupts
                mov     ax, es:[bx]             ; get scan code and ascii code
                inc     bx                      ; move pointer to next word
                inc     bx
                cmp     bx, KBD_END             ; at buffer end?
                jne     not_end                 ; no
                mov     bx, KBD_START
        not_end:
                mov     es:KBD_HEAD, bx         ; store new pointer
                sti                             ; enable interrupts
                cmp     al, 0                   ; test for extended characters
                je      extended
                cmp     al, 0E0H                ; test for extended characters
                je      extended
                mov     ah, 0                   ; standard ASCII value
                jmp     short inkey_exit
        extended:
                mov     al, ah                  ; set extended code
                mov     ah, 1
        inkey_exit:
                mov     key, ax                 ; save code
                pop     es
                pop     bx
                pop     ax
        ]
        return( key );
```

Page 9

```
} int get_video_mode()
{
        int vid_mode;

_asm {
                push    bx
                mov     ah, 0fh
                int     10h
                mov     ah, 0
                mov     vid_mode, ax
                pop     bx
        }
        return( vid_mode );
}
```

CHORDIC KEYBOARD PATENT

APPENDIX V:

BATMEM CODE

```
/******************** ***************************  ***
            Memo        agement Routines
**********************. .******************************/
#include <stdio.h>
include <stdlib.h>
#include <malloc.h>
#include "bat.h"

static  char    *heap_start = NULL;
static  char    *heap_end   = NULL;
static  int     heap_size   = 0;
static  int     heap_init   = 1;

char *mem_alloc( int size )
{
        char *ptr;

ptr = ( char * ) malloc( size );
        if( ptr )
                return( ptr );
        bat_error( "Out of memory", 1 );
} char *heap_alloc( int size )
{
        char *ptr;

if( heap_init )
        {
                ptr = ( char * ) mem_alloc( HEAP_SIZE );
                heap_start = ptr;
                heap_end = &heap_start[ size + 1 ];
                heap_size = size;
                heap_init = 0;
        }
        else
        {
                ptr = heap_end;
                heap_size += size;
                heap_end = &heap_start[ heap_size + 1 ];
        }
        return( ptr );
} char *heap_realloc( char *ptr, int size )
{
        heap_size = ( ptr - heap_start ) + size;
        if( heap_size | HEAP_SIZE )
                bat_error( "Out of table memory", 1 );

heap_end = &heap_start[ heap_size + 1 ];
        return( ptr );
}

/*
        Get the offset to the end of the heap.
        The sbrk() function was eliminated in Microsoft C V6.0
*/
int sbrk()
{
        return(( int ) heap_end );
}
```

CHORDIC KEYBOARD PATENT

APPENDIX VI:

BAT CODE

```c
/*      InfoGrip TSR to handl    t interrupts and translation
/*      Invocations are as fo.
/*  infogrip <cr> - if TSR installed, de-install and notify        */
/*                  if not installed, print USAGE                  */
/*  infogrip translation_table <cr> - if already installed, print USAGE */
/*                                    if not installed, install    */ include <stdio.h>
include <stdlib.h>
#include <string.h>
#include <dos.h>
#include <conio.h>
#include "bat.h"
#include "batconf.h"
#include "comm.h"

define BIOS    1 define outchar( a ) comm_putc( (a), COM1 )
define bat_installed is_inst
#define deinstall_bat uninst
#define SEVEN_KEY 7
define TABLE_SIZE 128
#define TABLE_NAME_SIZE 4
define STATUS_DELAY   14      /* approx 700 ms */ extern  long    current_time;
extern  int     is_inst( void );
extern  void    uninst( void );
extern  void    tsr_init( int port_no, int baud );
extern  int     cmp_video( char *str, char far *video, int length );
extern  void    put_video( char *str, char far *video, int length );
extern  void    exchange_video( char *out, char *in, char far *video, int length );
extern  void    reboot( void );

/*
        Configuration Variables
*/
struct BAT_CONFIG config = {
        BAT_ID,         /* configuration id                 */
        BAT_VERSION,    /* BAT version                      */
        "BAT.TAB",      /* translation table                */
        COM1,           /* com port                         */
        1,              /* status display flag              */
        72,             /* status display position left     */
        77,             /* status display position right    */
        0,              /* status change beep               */
        7,              /* repeat delay ( approx 700 ms )   */
        1,              /* repeat rate  ( approx 100 ms )   */
        15,             /* On-Line Help timeout             */
        0               /* CGA snow elimination             */
};
int     cga_snow;

#ifdef HELP
/* On-Line Help declarations */ int     start_help = 0;     /* invoke help flag     */
int     help_timeout;       /* help timeout         */
```

Page 2

```
void    help_init( void );
void    help( void );
#endif

/*
        LOCAL Variables
*/
unsigned char far *video_memory;

char    left_table_char = 'A';
char    right_table_char = 'A';
int     default_xlate_table_index = 0;

int     repeat_delay;           /* auto-repeat delay             */
int     repeat_rate;            /* auto-repeat rate              */
long    last_left_key_time;     /* left key auto-repeat time     */
long    last_right_key_time;    /* right key auto-repeat time    */
int     status_lcol;            /* left status display column    */
int     status_rcol;            /* right status display column   */
long    status_time;            /* display status time           */
int     status_change = 1;      /* status update flag            */
int     initial_release = 0;    /* wait for initial release code */ struct KEYBOARD_DEF
{
        unsigned short next;
        unsigned short last;
        unsigned short buffer[16];
};

struct KEYBOARD_DEF far *keyboard = NULL;

unsigned short keyboard_start = NULL_VAL;
unsigned short keyboard_end = NULL_VAL;

char    ***xlate_table_lookup = NULL;
char    *xlate_table_names = NULL;
char    *left_xlate_table[TABLE_SIZE];
char    **left_xlate_ptr;
char    *right_xlate_table[TABLE_SIZE];
char    **right_xlate_ptr;
int     left_cap_state = 0;
int     right_cap_state = 0;

struct STACK
{
        char    **xlate_table;
        char    table_char;
};

struct STACK left_stack[16];
struct STACK right_stack[16];
```

```
int     left_stack_ptr = 0;
int     right_stack_ptr = 0;

char    *buffer_pointer = NULL;
int     current_entry = 0;
int     offset = 0;

int     left_c = 0;
int     right_c = 0;

static char scan_codes[128] =
[
        0X03,0X1E,0X30,0X2E,0X20,0X12,0X21,0X22,
        0X0E,0X0F,0X24,0X25,0X26,0X1C,0X31,0X18,
        0X19,0X10,0X13,0X1F,0X14,0X16,0X2F,0X11,
        0X2D,0X15,0X2C,0X29,0X00,0X00,0X00,0X00,
        0X39,0X02,0X28,0X04,0X05,0X06,0X08,0X28,
        0X0A,0X0B,0X09,0X0D,0X33,0X0C,0X34,0X35,
        0X0B,0X02,0X03,0X04,0X05,0X06,0X07,0X08,
        0X09,0X0A,0X27,0X27,0X33,0X00,0X34,0X35,
        0X03,0X1E,0X30,0X2E,0X20,0X12,0X21,0X22,
        0X23,0X17,0X24,0X25,0X26,0X32,0X31,0X18,
        0X19,0X10,0X13,0X1F,0X14,0X16,0X2F,0X11,
        0X2D,0X15,0X2C,0X1A,0X2B,0X1B,0X07,0X0C,
        0X29,0X1E,0X30,0X2E,0X20,0X12,0X21,0X22,
        0X23,0X17,0X24,0X25,0X26,0X32,0X31,0X18,
        0X19,0X10,0X13,0X1F,0X14,0X16,0X2F,0X11,
        0X2D,0X15,0X2C,0X1A,0X2B,0X1B,0X29,0X53
];
        FILE    *fd;

void    C_store_char( int c );
        void    C_retrieve( void );
        int     move_char( unsigned int c );
        char    *read_line( FILE *fd, char *str );
static  int     ascii_to_integer( char *buf );
static  int     read_integer( void );
static  int     install_bat( FILE *fd );
static  void    usage( void );
static  int     get_char( void );
static  int     is_it_white( int c );
static  void    put_ring_char( unsigned int c );
static  int     get_ring_char( void );
static  void    push_left( char **xlate_table, char c );
static  void    push_right( char **xlate_table, char c );
static  void    pop_left( void );
static  void    pop_right( void );
static  int     copy_left_stack( void );
static  int     copy_right_stack( void );
static  void    buzz( int flag );
static  void    display_names( void );
static  void    post_state( void );
```

Page 4

```c
void main( int argc, char **argv )
{
        char *p, name[80];
        int temp, baud_rate, file_count;

#if BIOS
#else
        union REGS regs;
        regs.h.ah = 15;
        int86( 0x10, ®s, ®s );
        if( regs.h.al == 7 )
                video_memory = ( unsigned char far * ) 0xb00000001;
        else
                video_memory = ( unsigned char far * ) 0xb80000001;
endif keyboard = ( struct KEYBOARD_DEF far * ) 0x40001A1;
        keyboard_start = 0x1e;
        keyboard_end = 0x3e;

if( bat_installed() )
        {
                if( argc == 1 )
                {
                        deinstall_bat();
                        exit( 0 );
                }
                else
                        bat_error( "BAT driver already installed", 0 );
        } argc--;
        argv++;

file_count = 0;
        baud_rate = 8300;
        cga_snow = config.snow;
        strcpy( name, config.table );

#if BIOS
        status_lcol = config.status_lcol - 1;
        status_rcol = config.status_rcol - 1;
#else
        status_lcol = ( config.status_lcol - 1 ) * 2;
        status_rcol = ( config.status_rcol - 1 ) * 2;
#endif
        repeat_delay = (( config.repeat_delay * 100 ) / 55 ) + 1;
        repeat_rate = (( config.repeat_rate * 100 ) / 55 ) + 1;

#ifdef HELP
        help_timeout = config.help_timeout * 100;
        help_init();
#endif
```

Page 5

```c
while( argc-- )
{
        p = *argv;
        if( *p == '-' || *p == '/' )
        {
                p++;
                while( *p )
                {
                        switch( toupper( *p ) )
                        {
                                /* auto-repeat delay */
                                case 'A':
                                        p++;
                                        if( toupper( *p ) == 'R' )
                                        {
                                                p++;
                                                repeat_rate = atoi( p );
                                                repeat_rate *= 100;
                                                repeat_rate /= 55;
                                                repeat_rate++;
                                        }
                                        else if( toupper( *p ) == 'D' )
                                        {
                                                p++;
                                                repeat_delay = atoi( p );
                                                repeat_delay *= 100;
                                                repeat_delay /= 55;
                                                repeat_delay++;
                                        }
                                        *p = NULL_VAL;
                                        break;
                                /* Buzzer */
                                case 'B':
                                        p++;
                                        if( *p == '0' )
                                                config.beep = 0;
                                        else if( *p == '1' )
                                                config.beep = 1;
                                        p++;
                                        break;
                                /* status columns */
                                case 'C':
                                        p++;
                                        if( toupper( *p ) == 'L' )
                                        {
                                                p++;
                                                temp = atoi( p ) - 1;
                                                if( temp < 0 ||
                                                    temp > 70 )
                                                        temp = 60;
                                                status_lcol = temp * 2;
                                        }
                                        else if( toupper( *p ) == 'R' )
                                        {
```

Page 6

```
                                        p++;
                                        temp = atoi( p ) - 1;
                                        if( temp < 0 ||
                                            temp > 70 )
                                                temp = 70;
                                        status_rcol = temp * 2;
                                }
                                *p = NULL_VAL;
                                break;
                        /* Disable status display */
                        case 'D':
                                config.status_display++;
                                p++;
                                break;
                        /* COM port number */
                        case 'P':
                                p++;
                                if( *p == '1' )
                                        config.comm_port = COM1;
                                else if( *p == '2' )
                                        config.comm_port = COM2;
                                p++;
                                break;
                        case 'H':
                                p++;
                                baud_rate = B1200;
                                break;
                        /* CGA snow elimination */
                        case 'S':
                                cga_snow = 1;
                                p++;
                                break;
                        default:
                                bat_error( "Invalid Switch", -1 );
                        }
                }
        }
        else if( *p == '?' )
        {
                usage();
                exit( 0 );
        }
        else
        {
                if( file_count++ == 2 )
                        bat_error( "Too many Arguments", -1 );
                strcpy( name, p );
        }
        argv++;
} if(( fd = fopen( name, "r" )) == NULL )
        bat_error( "Unable to open translation file", 1 );
```

Page 7

```c
        if( install_bat( fd ) )
        [
                /* install driver */
                /* Initialize communications port */
#ifdef HELP
                printf( "Installing the BAT driver with On-Line Help " );
#else
                printf( "Installing the BAT driver " );
#endif
                tsr_init( config.comm_port, baud_rate ! 3 );
                bat_error( "BAT installation error", 1 );
        ]
        bat_error( "Unable to process Translation Table definitions", 1 );
]

static int install_bat( FILE *fd )
[
        int i, index, skip, length, table_id;
        char **prev_xlate_table;
        char **cur_xlate_table;
        char *cur_def, *c, buf[80];

current_time = 01;
        status_time = STATUS_DELAY;

xlate_table_lookup = ( char *** ) mem_alloc( 26 * sizeof( char ** ) );
        xlate_table_names = ( char * ) mem_alloc( 26 * TABLE_NAME_SIZE *
                sizeof( char ) );
        memset( xlate_table_names, ' ', ( 26 * TABLE_NAME_SIZE ) );
        cur_xlate_table = NULL;
        skip = FALSE;
/*
        scan translation file for table names
*/
        for( ;; )
        [
                if(( c = read_line( fd, buf )) == NULL )
                        break;
                if( toupper( *c ) >= 'A' && toupper( *c ) <= 'Z' )
                [
                        table_id = toupper( *c ) - 'A';
                        c++;
                        if( isspace( *c ) )
                                c++;
                        if( *c )
                        [
                                for( i = 0 ; *c && i < TABLE_NAME_SIZE ; i++ )
                                        xlate_table_names[TABLE_NAME_SIZE *
                                                table_id + i] = *c++;
                        ]
                        for( ; i < TABLE_NAME_SIZE; i++ )
                                xlate_table_names( TABLE_NAME_SIZE * table_id
                                        + i ] = ' ';
```

Page 8

```
            if( default_xlate_table_index == -1 )
            {
                default_xlate_table_index = table_id;
                left_table_char = right_table_char =
                        ( char ) ( table_id + 'A' );
            }
            prev_xlate_table = cur_xlate_table;
            cur_xlate_table = ( char ** ) mem_alloc( TABLE_SIZE *
                    sizeof( char * ));
            if( prev_xlate_table != NULL )
                memcpy( cur_xlate_table, prev_xlate_table,
                        TABLE_SIZE * sizeof( char * ));
            else
            {
                for( i = 0 ; i < TABLE_SIZE ; i++ )
                        cur_xlate_table[i] = NULL;
            }
            xlate_table_lookup[table_id] = cur_xlate_table;
            skip = FALSE;
        }
    }
    /*
        read in translation tables
    */
    rewind( fd );
    for( ;; )
    {
        if(( c = read_line( fd, buf )) == NULL )
            break;
        if( toupper( *c ) >= 'A' && toupper( *c ) <= 'Z' )
        {
            table_id = toupper( *c ) - 'A';
            cur_xlate_table = xlate_table_lookup[table_id];
            continue;
        }
        else if( *c >= '0' && *c <= '9' )
        {
            if( cur_xlate_table == NULL )
            {
                printf( "No translation table name specified - skipping definitions/n" );
                skip = TRUE;
                continue;
            }
            index = ascii_to_integer( c );
            if( index < 1 !! index >= TABLE_SIZE )
            {
                printf( "Invalid table entry index specified (%d) - skipping table entry/n", index );
                continue;
            }
            /* skip value */
            while( *c && !is_it_white( *c ) )
                c++;
            /* skip white space */
```

Page 9

```
                        while( *c && is_it_white( *c ) )
                                c++;
                        if( !*c )
                        {
                                cur_xlate_table[index] = NULL;
                                continue;
                        }
                        length = 32;
                        cur_def = ( char * ) heap_alloc( length * sizeof(char));
                        i = 0;
                        for( ;; )
                        {
                                if( !*c )
                                {
                                        /* check for line continuation */
                                        if( cur_def[i - 1] != '//' )
                                                break;
                                        if( cur_def[i - 2] == '//' )
                                                break;

if(( c = read_line( fd, buf )) == NULL )
                                                break;
                                }
                                cur_def[i++] = *c++;
                                if( i == length )
                                {
                                        length *= 2;
                                        cur_def = ( char * ) heap_realloc(
                                                cur_def, length * sizeof(char));
                                }
                        }
                        cur_def = ( char * ) heap_realloc( cur_def, ( i + 1 ) *
                                sizeof( char ));
                        cur_def[i] = NULL_CHAR;
                        cur_xlate_table[index] = cur_def;
                }
        }
        if( default_xlate_table_index == -1 )
                return( FALSE );
        for( i = 0; i < TABLE_SIZE; i++ )
                left_xlate_table[i] = right_xlate_table[i] =
                        xlate_table_lookup[default_xlate_table_index][i];
        left_xlate_ptr = right_xlate_ptr =
                xlate_table_lookup[default_xlate_table_index];
        return( TRUE );
} char *read_line( FILE *fd, char *str )
{
        int i;
        char *ptr;
```

```
            if(( ptr = fgets( str, 80, fd )) == NULL )
                    return( NULL );
            i = 0;
            while( ptr[i] && ptr[i] != '/n' )
                    i++;
            ptr[i] = 0;
            return( ptr );
    }
    static int ascii_to_integer( char *buf )
    {
            int value;

value = 0;
            if( *buf == '0' )
            {
                    buf++;
                    if( toupper( *buf ) == 'X' )
                    {
                            /* this is a hex value */
                            buf++;
                            for( ;; )
                            {
                                    if( *buf >= '0' && *buf <= '9' )
                                            value += ( *buf - '0' );
                                    else if( toupper( *buf ) >= 'A' &&
                                            toupper( *buf ) <= 'F' )
                                    {
                                            value += ( toupper( *buf ) - 'A' + 10 );
                                    }
                                    else
                                            break;
                                    value <<= 4;
                                    buf++;
                            }
                            return( value >> 4 );
                    }
                    /* this is an octal value */
                    for( ;; )
                    {
                            if( *buf >= '0' && *buf <= '7' )
                                    value += ( *buf - '0' );
                            else
                                    break;
                            value <<= 3;
                            buf++;
                    }
                    return( value >> 3 );
            }
            /* this is a decimal value */
            for( ;; )
            {
```

Page 11

```
                if( *buf >= '0' && *buf <= '9' )
                        value += ( *buf - '0' );
                else
                        break;
                value *= 10;
                buf++;
        }
        return( value / 10 );
} static int read_integer()
{
        int c, value;

value = 0;
        c = get_char();
        if( c == '0' )
        {
                c = get_char();
                if( toupper( c ) == 'X' )
                {
                        c = get_char();
                        /* this is a hex value */
                        for( ;; )
                        {
                                if( c >= '0' && c <= '9' )
                                        value += (c - '0');
                                else if( toupper(c) >= 'A' && toupper(c) <= 'F' )
                                        value += ( toupper( c ) - 'A' + 10 );
                                else
                                        break;
                                value <<= 4;
                                c = get_char();
                        }
                        return( value >> 4 );
                }
                /* this is an octal value */
                for( ;; )
                {
                        if( c >= '0' && c <= '7' )
                                value += ( c - '0' );
                        else
                                break;
                        value <<= 3;
                        c = get_char();
                }
                return( value >> 3 );
        }
        /* this is a decimal value */
        for( ;; )
        {
                if( c >= '0' && c <= '9' )
                        value += ( c - '0' );
                else
```

Page 12

```
                        break;
                value *= 10;
                c = get_char();
        }
        return( value / 10 );
} static int get_char()
{
        if( buffer_pointer[offset] == NULL_CHAR )
                return( EOF );
        return( buffer_pointer[offset++] );
} static int is_it_white( int c )
{
        if( c == ' ' || c == '/t' || c == '/n' || c == EOF )
                return( TRUE );
        return( FALSE );
} static unsigned int c_last = NULL_VAL;

/*      The following code handles the device interrupts */

/*****************************************************************
        Called by communications port interrupt 0B or 0C.
        Decodes codes from infogrip.
        Stores code upon key release.
*****************************************************************/
void C_store_char( int c )
{
        if( !initial_release )
        {
                if( c == 0 )
                        initial_release++;
                return;
        }
        c &= 0377;
        if( c & 0200 )  /* left hand */
        {
                if( c & 0177 )
                        left_c |= c;
                else if( left_c )
                {
                        put_ring_char( left_c | 0200 );
                        left_c = 0;
                }
                last_left_key_time = current_time + repeat_delay;
        }
        else
        {
                if( c )
                        right_c |= c;
```

Page 13

```c
                else if( right_c )
                {
                        put_ring_char( right_c );
                        right_c = 0;
                }
                last_right_key_time = current_time + repeat_delay;
        }
} static unsigned int ring_buffer[128];
static int start_of_ring = 0;
static int end_of_ring = 0;

/*************************************************************
        Store infogrip code into local ring buffer.
        Process any interrupt calls ( /I<int> ).
*************************************************************/
static void put_ring_char( unsigned int c )
{
        int i, cc;
        union REGS inreg;
        union REGS outreg;
        char **xlate_table;

if( c & 0200 )
                xlate_table = left_xlate_table;
        else
                xlate_table = right_xlate_table;
        cc = c & 0177;

if( xlate_table[cc] && xlate_table[cc][0] == '/' &&
                toupper( xlate_table[cc][1] ) == 'I' )
        {
                int interrupt_number;
                int save_offset;
                char *save_buffer_pointer;

save_buffer_pointer = buffer_pointer;
                save_offset = offset;
                buffer_pointer = xlate_table[cc];
                offset = 2;
                interrupt_number = read_integer();
                if( interrupt_number == 0x19 )
                        reboot();
                buffer_pointer = save_buffer_pointer;
                offset = save_offset;
                int86( interrupt_number, &inreg, &outreg );
                return;
        }
        i = (( end_of_ring + 1 ) & 0177 );
        if( i == start_of_ring )
                return; /* buffer full */
        ring_buffer[i] = c;
        end_of_ring = i;
}
```

Page 14

```c
/*************************************************************
    Get infogrip code from local ring buffer.
    Also take care of auto-repeat
*************************************************************/
static int get_ring_char()
{
        if( left_c && ( current_time > last_left_key_time ))
        {
                put_ring_char( left_c | 0200 );
                last_left_key_time = current_time + repeat_rate;
        }
        if( right_c && ( current_time > last_right_key_time ))
        {
                put_ring_char( right_c );
                last_right_key_time = current_time + repeat_rate;
        }
        if( start_of_ring == end_of_ring )
                return( 0 );

start_of_ring++;
        start_of_ring &= 0177;
        return( ring_buffer[start_of_ring] );
}

/*************************************************************
    Called from keyboard interrupt 16.
    Decode characters received from local ring buffer.
    Send translated code to the keyboard buffer.
*************************************************************/
void C_retrieve()
{
        int c;

buzz( 0 );
        if( c_last )
        {
                /*
                c_last contains character because keyboard buffer
                was not empty on last store attempt.
                See if keyboard buffer is empty.
                */
                if( move_char( c_last ) )
                        c_last = NULL_VAL;      /* yes */
                else
                        return;                 /* no */
        }
        for( ;; )
        {
                if( current_entry )
                {
                        if( current_entry & 0200 )
                                buffer_pointer =
                                        left_xlate_table[current_entry & 0177];
                        else
```

Page 15

```
                buffer_pointer =
                        right_xlate_table[current_entry];
        c = get_char();
        if( c != EOF )
        {
                if( c != '//' )
                {
                        c &= 0377;
                        if( current_entry & 0200 )
                        {
                                if( left_cap_state )
                                {
                                        c = UPPER( c );
                                        if( left_cap_state == 1 )
                                                left_cap_state = 0;
                                }
                        }
                        else
                        {
                                if( right_cap_state )
                                {
                                        c = UPPER( c );
                                        if( right_cap_state == 1 )
                                                right_cap_state = 0;
                                }
                        }
                        if( move_char( TRANSLATE( c )) == FALSE )
                        {
                                c_last = TRANSLATE( c );
                                return;
                        }
                        continue;
                }
                if(( c = get_char() ) == '//' )
                {
                        if( move_char( TRANSLATE( c )) == FALSE )
                        {
                                c_last = TRANSLATE( c );
                                return;
                        }
                        continue;
                } switch( UPPER( c ) )
                {
                /******************************************
                   Case Change
                   Format: C
                ******************************************/
                case 'C':
                        if( current_entry & 0200 )
                        {
                                left_cap_state++;
                                if( left_cap_state > 2 )
```

Page 16

```
                                left_cap_state = 0;
                }
                else
                {
                        right_cap_state++;
                        if( right_cap_state > 2 )
                                right_cap_state = 0;
                }
                status_change++;
                continue;
/*******************************************
   Invoke Help
   Format: H
*******************************************/
        case 'H':
#ifdef HELP
                help();
#endif
                current_entry = 0;
                continue;
/*******************************************
   Extended Character
   Format: E<code>
   code = Extended code value
         AL = 0
         AH = Extended Code
*******************************************/
        case 'E':
                c = read_integer() << 8;
                if( buffer_pointer[offset] )
                        --offset;
                if( move_char( c ) == FALSE )
                {
                        c_last = c;
                        return;
                }
                continue;

/*******************************************
   Set Keyboard Status
   Format: S<byte>
   byte = Status byte value
*******************************************/
        case 'S':
                read_integer();
                if( buffer_pointer[offset] )
                        --offset;
                continue;

/*******************************************
   Redefined Translate Table
   Format: R<grip><tab>
   grip = L - Left
          R - Right
```

```
            C - Current
            B - Both
      tab   = Table ID
 *******************************************/
 case 'R':
     c = UPPER( get_char() );
     if( c == 'R' )
     {
         c = UPPER( get_char() );
         if( c >= 'A' && c <= 'Z' )
             push_right( xlate_table_lookup[c - 'A'], ( char ) c );
     }
     else if( c == 'L' )
     {
         c = UPPER( get_char() );
         if( c >= 'A' && c <= 'Z' )
             push_left( xlate_table_lookup[c - 'A'], ( char ) c );
     }
     else if( c == 'C' )
     {
         c = UPPER( get_char() );
         if( c >= 'A' && c <= 'Z' )
         {
             if( current_entry & 0200 )
                 push_left( xlate_table_lookup[c - 'A'], ( char ) c );
             else
                 push_right( xlate_table_lookup[c - 'A'], ( char ) c );
         }
     }
     else if( c == 'B' )
     {
         c = UPPER( get_char() );
         if( c >= 'A' && c <= 'Z' )
         {
             push_left( xlate_table_lookup[c - 'A'], ( char ) c );
             push_right( xlate_table_lookup[c - 'A'], ( char ) c );
         }
     }
     current_entry = 0;
     continue;
/****************************************
  Pop Previous Translate Table
  Format: P<grip>
  grip = L - Left
         R - Right
         C - Current
         B - Both
 *******************************************/
 case 'P':
     c = UPPER( get_char() );
     if( c == 'R' )
         pop_right();
     else if( c == 'L' )
         pop_left();
```

Page 18

```c
        else if( c == 'C' )
        {
                if( current_entry & 0200 )
                        pop_left();
                else
                        pop_right();
        }
        else if( c == 'B' )
        {
                pop_left();
                pop_right();
        }
        current_entry = 0;
        continue;
/*******************************************
   Double Pop Previous Translate Table
   Format: Q<grip>
    grip = L - Left
           R - Right
           C - Current
           B - Both
********************************************/
case 'Q':
        c = UPPER( get_char() );
        if( c == 'R' )
        {
                pop_right();
                pop_right();
        }
        else if( c == 'L' )
        {
                pop_left();
                pop_left();
        }
        else if( c == 'C' )
        {
                if( current_entry & 0200 )
                {
                        pop_left();
                        pop_left();
                }
                else
                {
                        pop_right();
                        pop_right();
                }
        }
        else if( c == 'B' )
        {
                pop_left();
                pop_left();
                pop_right();
                pop_right();
        }
```

Page 19

```
                            current_entry = 0;
                            continue;
                    /*****************************************
                        Ring Bell
                    *****************************************/
                    case 'B':
                            c = read_integer();
                            if( c == 0 )
                                    c = 4;
                            buzz( c );
                            continue;
                    /*****************************************
                        ????
                    *****************************************/
                    case 0:
                            current_entry = 0;
                            continue;
                    /*****************************************
                        ASCII Code
                        Format: xx
                    *****************************************/
                    default:
                            if( buffer_pointer[offset] )
                                    --offset;
                            c = read_integer() & 0377;
                            if( buffer_pointer[offset] )
                                    --offset;
                            if( move_char( TRANSLATE( c )) == FALSE )
                            [
                                    c_last = TRANSLATE( c );
                                    return;
                            ]
                            continue;
                    ]
            ]
    ]
    if(( c = get_ring_char()) == 0 )
    [
            display_names();
            return;
    ]
    current_entry = c;
    offset = 0;
    ]
]

/************************************************************
        Move character to keyboard buffer.

Return: TRUE  - character stored
                FALSE - buffer full
************************************************************/
int move_char( unsigned int c )
[
```

Page 20

```c
        unsigned short ptr;
        unsigned short far *far_ptr;

ptr = keyboard->last;
        ptr += 2;
        if( ptr == keyboard_end )
                ptr = keyboard_start;
        if( ptr == keyboard->next )
                return( FALSE );
        far_ptr = (unsigned short far *) (keyboard->last | 0x4000001);
        *far_ptr = c;
        keyboard->last = ptr;
        return( TRUE );
} static void push_left( char **xlate_table, char c )
{
        int i;

status_change++;
        if( left_stack_ptr == 16 )
                left_stack_ptr = copy_left_stack( );
        left_stack[left_stack_ptr].xlate_table = left_xlate_ptr;
        left_stack[left_stack_ptr].table_char = left_table_char;
        left_table_char = c;
        left_stack_ptr++;

/*
                left_xlate_table = xlate_table;
        */
        left_xlate_ptr = xlate_table;
        for( i = 0; i < TABLE_SIZE; i++ )
        {
                if( xlate_table[i] != NULL )
                        left_xlate_table[i] = xlate_table[i];
        }
} static void push_right( char **xlate_table, char c )
{
        int i;

status_change++;
        if( right_stack_ptr == 16 )
                right_stack_ptr = copy_right_stack();
        right_stack[right_stack_ptr].xlate_table = right_xlate_ptr;
        right_stack[right_stack_ptr].table_char = right_table_char;
        right_table_char = c;
        right_stack_ptr++;
        /*
        right_xlate_table = xlate_table;
        */
        right_xlate_ptr = xlate_table;
        for( i = 0; i < TABLE_SIZE; i++ )
```

Page 21

```c
        {
                if( xlate_table[i] != NULL )
                        right_xlate_table[i] = xlate_table[i];
        }
} static void pop_left()
{
        int i;
        char **xlate_table;

status_change++;
        if( left_stack_ptr )
        {
                --left_stack_ptr;
                /*
                left_xlate_table = left_stack[left_stack_ptr].xlate_table;
                */
                left_xlate_ptr = xlate_table =
                        left_stack[left_stack_ptr].xlate_table;
                for( i = 0; i < TABLE_SIZE; i++ )
                {
                        if( xlate_table[i] != NULL )
                                left_xlate_table[i] = xlate_table[i];
                }
                left_table_char = left_stack[left_stack_ptr].table_char;
        }
} static void pop_right()
{
        int i;
        char **xlate_table;

status_change++;
        if( right_stack_ptr )
        {
                --right_stack_ptr;
                /*
                right_xlate_table = right_stack[right_stack_ptr].xlate_table;
                */
                right_xlate_ptr = xlate_table =
                        right_stack[right_stack_ptr].xlate_table;
                for( i = 0; i < TABLE_SIZE; i++ )
                {
                        if( xlate_table[i] != NULL )
                                right_xlate_table[i] = xlate_table[i];
                }
                right_table_char = right_stack[right_stack_ptr].table_char;
        }
} static int copy_left_stack()
{
```

Page 22

```c
        int i;
        for( i = 0 ; i < 15 ; i++ )
        [
                left_stack[i].table_char = left_stack[i + 1].table_char;
                left_stack[i].xlate_table = left_stack[i + 1].xlate_table;
                left_stack[i].table_char = left_stack[i + 1].table_char;
        ]
        return i;
} static int copy_right_stack()
{
        int i;
        for( i = 0 ; i < 15 ; i++ )
        [
                right_stack[i].xlate_table = right_stack[i + 1].xlate_table;
                right_stack[i].table_char = right_stack[i + 1].table_char;
        ]
        return i;
} static void buzz( int flag )
{
        int ax, timer_rate;
        static long end_time;

if( flag )
        {
                if( config.beep )
                [
                        if( flag == 1 )
                                timer_rate = ( int ) ( 1193180L / 500 );
                        else if( flag == 2 || flag == 4 )
                                timer_rate = ( int ) ( 1193180L / 1000 );
                        else
                                timer_rate = ( int ) ( 1193180L / 2000 );
                ]
                else if( flag == 4 )
                        timer_rate = ( int ) ( 1193180L / 1000 );
                else
                        return;

outp( 0x43, 0xb6 );                     /* initialize 8253 */
                outp( 0x42, timer_rate & 0x00ff );      /* load low byte   */
                outp( 0x42, timer_rate >> 8 );          /* load high byte  */
                end_time = current_time + 2;
                ax = inp( 0x61 );
                ax |= 3;
                outp( 0x61, ax );
        }
        else if( current_time >= end_time )
        {
                ax = inp( 0x61 );
                ax &= ~3;
```

Page 23

```c
                outp( 0x61, ax );
        }
} static void display_names()
{
        if( !config.status_display )
                return;
        if( !status_change && status_time > current_time )
                return;

post_state();
        status_change = 0;
        status_time = current_time + STATUS_DELAY;
} static void post_state()
{
#if BIOS
        char *ind1, *ind2;
        union REGS inregs, outregs;
        int i;
        unsigned char row, col;

/* get cursor position */
        inregs.h.ah = 0x03;
        inregs.h.bh = 0;
        int86( 0x10, &inregs, &outregs );
        row = outregs.h.dh;
        col = outregs.h.dl;

ind1 = &xlate_table_names[ TABLE_NAME_SIZE * ( left_table_char - 'A' )];
        ind2 = &xlate_table_names[ TABLE_NAME_SIZE * ( right_table_char - 'A')];

/* set cursor postion */
        inregs.h.ah = 0x02;
        inregs.h.bh = 0;
        inregs.h.dh = 0;
        inregs.h.dl = ( char ) status_lcol;
        int86( 0x10, &inregs, &outregs );

for( i = 0; i < TABLE_NAME_SIZE; i++ )
        {
                /* output character in tty mode */
                inregs.h.ah = 0x0E;
                inregs.h.al = *ind1++;
                inregs.h.bh = 0;
                inregs.h.bl = 7;
                int86( 0x10, &inregs, &outregs );
        }

/* set cursor postion */
        inregs.h.ah = 0x02;
        inregs.h.bh = 0;
```

Page 24

```
        inregs.h.dh = 0;
        inregs.h.dl = ( char ) status_rcol;
        int86( 0x10, &inregs, &outregs );

for( i = 0; i < TABLE_NAME_SIZE; i++ )
        [
                /* output character in tty mode */
                inregs.h.ah = 0x0E;
                inregs.h.al = *ind2++;
                inregs.h.bh = 0;
                inregs.h.bl = 7;
                int86( 0x10, &inregs, &outregs );
        }

/* set cursor postion */
        inregs.h.ah = 0x02;
        inregs.h.bh = 0;
        inregs.h.dh = row;
        inregs.h.dl = col;
        int86( 0x10, &inregs, &outregs );

#else
        char far *to_addr;
        char *from_addr;

from_addr = &xlate_table_names[ TABLE_NAME_SIZE *
                ( left_table_char - 'A' )];
        to_addr = &video_memory[status_lcol];
        put_video( from_addr, to_addr, TABLE_NAME_SIZE );

from_addr = &xlate_table_names[ TABLE_NAME_SIZE *
                ( right_table_char - 'A' )];
        to_addr = &video_memory[status_rcol];
        put_video( from_addr, to_addr, TABLE_NAME_SIZE );
#endif
} void bat_error( char *msg, int exit_code )
[
        printf( "BAT Error - %s./n", msg );
        if( exit_code < 0 )
        [
                usage();
                exit_code *= -1;
        }
        exit( exit_code );
} static void usage()
[
        printf( "/n/nTo install:    BAT [TRANSLATE_TABLE_NAME] [switches]<cr>/n" );
        printf( "To un-install: BAT<cr>/n/n" );
        printf( "Switches:/n" );
        printf( "   /AD<delay> - Set auto-repeat delay ( 1/10 sec )./n" );
```

Page 25

```c
        printf( "  /AR<rate>  - Set auto-repeat rate ( 1/10 sec )./n" );
        printf( "  /B<flag>   - Enable/Disable status change beep./n" );
        printf( "  /CL<col>   - Set left status column  ( 1 - 71 )./n" );
        printf( "  /CR<col>   - Set right status column ( 1 - 71 )./n" );
        printf( "  /D         - Disable status display./n" );
        printf( "  /H         - Set high speed (1200 Baud)./n" );
        printf( "  /P<port>   - Set COM port 1 or 2./n" );
        printf( "  /S         - CGA /"snow/" elimination./n" );
} if 0
static void post_debug( char *msg )
{
        int i;

i = 0;
        while( *msg )
        {
                video_memory[i] = *msg++;
                i += 2;
        }
        while( i < 40 )
        {
                video_memory[i] = ' ';
                i += 2;
        }
} void idle( void )
{
        static int i = 0;
        static int div = 0;
        static char buf[4] = { '!', '/', '-', '//' };

if( ++div != 10 )
                return;
        div = 0;
        video_memory[118] = buf[i];
        i++;
        i &= 3;
}
#endif
```

CHORDIC KEYBOARD PATENT

APPENDIX VII:

BATHELP CODE

```
/* video definitions */ define MONO     7
define COLOR1   2
define COLOR2   3 define BLACK      0x00
define BLUE       0x01
#define GREEN      0x02
#define CYAN       0x03
#define RED        0x04
#define MAGENTA    0x05
#define BROWN      0x06
#define WHITE      0x07
#define GRAY       0x08
#define LBLUE      0x09
#define LGREEN     0x0a
#define LCYAN      0x0b
#define LRED       0x0c
#define LMAGENTA   0x0d
#define YELLOW     0x0e
define BWHITE     0x0f /* timer functions */
define TIMER_READ   0
define TIMER_SET    1 struct KEYS {
        char    *name;
        int     codes[3];
};

struct KEYS keys[] = [
        "<CTRL @|",       0,      0,      0,
        "<CTRL A|",       0112,   036,    0,
        "<CTRL B|",       0112,   011,    0,
        "<CTRL C|",       0112,   024,    0,
        "<CTRL D|",       0112,   014,    0,
        "<CTRL E|",       0112,   016,    0,
        "<CTRL F|",       0112,   012,    0,
        "<CTRL G|",       0112,   022,    0,
        "<BACKSPACE|",    051,    0,      0,
        "<TAB|",          057,    0,      0,
        "<CTRL J|",       0112,   032,    0,
        "<CTRL K|",       0112,   012,    0,
        "<CTRL L|",       0112,   030,    0,
        "<ENTER|",        041,    0,      0,
        "<CTRL N|",       0112,   027,    0,
        "<CTRL O|",       0112,   037,    0,
        "<CTRL P|",       0112,   026,    0,
        "<CTRL Q|",       0112,   033,    0,
        "<CTRL R|",       0112,   004,    0,
        "<CTRL S|",       0112,   007,    0,
        "<CTRL T|",       0112,   017,    0,
        "<CTRL U|",       0112,   003,    0,
        "<CTRL V|",       0112,   023,    0,
        "<CTRL W|",       0112,   001,    0,
```

```
"<CTRL X|",      0112,  031,  0,
"<CTRL Y|",        12,  002,  0,
"<CTRL Z|",      0112,  013,  0,
"<ESCAPE|",      0107,    0,  0,
"<CTRL //|",        0,    0,  0,
"<CTRL ]|",         0,    0,  0,
"<CTRL /|",         0,    0,  0,
"<CTRL _|",         0,    0,  0,
"<SPACE|",        020,    0,  0,
"! Exclamation",       0110, 016, 0,
"/" Quote",            0110, 014, 0,
"# Pound",             0110, 026, 0,
"$ Dollar",            0100, 003, 0,
"% Percent",           0100, 026, 0,
"& Ampersand",         0110, 036, 0,
"/' Apostrophe",        056,   0, 0,
"( Open Parenthesis",  0110, 037, 0,
") Close Parenthesis", 0110, 031, 0,
"* Asterisk",          0100, 034, 0,
"+ Plus",              0100, 036, 0,
", Comma",              044,   0, 0,
"- Hyphen",            0110, 006, 0,
". Period",             046,   0, 0,
"/ Forward Slash",     0110, 021, 0,
"0",                   0100, 037, 0,
"1",                   0100, 020, 0,
"2",                   0100, 010, 0,
"3",                   0100, 004, 0,
"4",                   0100, 002, 0,
"5",                   0100, 001, 0,
"6",                   0100, 030, 0,
"7",                   0100, 024, 0,
"8",                   0100, 022, 0,
"9",                   0100, 021, 0,
": Colon",             0110, 024, 0,
"; Semicolon",         0110, 007, 0,
"< Less Than",         0100, 013, 0,
"= Equal",             0100, 016, 0,
"| Greater Than",      0100, 006, 0,
"? Question Mark",     0110, 033, 0,
"@ At Sign",           0110, 001, 0,
"A",                    040, 036, 0,
"B",                    040, 011, 0,
"C",                    040, 024, 0,
"D",                    040, 014, 0,
"E",                    040, 016, 0,
"F",                    040, 021, 0,
"G",                    040, 022, 0,
"H",                    040, 006, 0,
"I",                    040, 010, 0,
"J",                    040, 032, 0,
"K",                    040, 012, 0,
"L",                    040, 030, 0,
"M",                    040, 034, 0,
```

```
    "N",                  ?,     027,    0,
    "O",                  J,     037,    0,
    "P",                040,     026,    0,
    "Q",                040,     033,    0,
    "R",                040,     004,    0,
    "S",                040,     007,    0,
    "T",                040,     017,    0,
    "U",                040,     003,    0,
    "V",                040,     023,    0,
    "W",                040,     001,    0,
    "X",                040,     031,    0,
    "Y",                040,     002,    0,
    "Z",                040,     013,    0,
    "[  Open Bracket",          0110,    010,   0,
    "// Back Slash",            0110,    011,   0,
    "]  Close Bracket",         0110,    030,   0,
    "/  Caret",                 0110,    012,   0,
    "_  Underline",             0110,    003,   0,
    "/  Grave (Quote)",         0110,    022,   0,
    "a",                036,     0,      0,
    "b",                011,     0,      0,
    "c",                024,     0,      0,
    "d",                014,     0,      0,
    "e",                016,     0,      0,
    "f",                021,     0,      0,
    "g",                022,     0,      0,
    "h",                006,     0,      0,
    "i",                010,     0,      0,
    "j",                032,     0,      0,
    "k",                012,     0,      0,
    "l",                030,     0,      0,
    "m",                034,     0,      0,
    "n",                027,     0,      0,
    "o",                037,     0,      0,
    "p",                026,     0,      0,
    "q",                033,     0,      0,
    "r",                004,     0,      0,
    "s",                007,     0,      0,
    "t",                017,     0,      0,
    "u",                003,     0,      0,
    "v",                023,     0,      0,
    "w",                001,     0,      0,
    "x",                031,     0,      0,
    "y",                002,     0,      0,
    "z",                013,     0,      0,
    "[  Open Brace",            0110,    002,   0,
    "!  Vertical Line",         0110,    023,   0,
    "]  Close Brace",           0110,    013,   0,
    "/  Tilde",                 0110,    017,   0,
    "<DEL|",            0101,    0,      0
};

struct KEYS keys_ext[] = {
/*100*/ "<KP 0|",       0,       0,      0,
```

|            |              |       |      |    |
|------------|--------------|-------|------|----|
|            | "<KP 1\|",   |       | 0,   | 0, |
|            | "<KP 2\|",   |       | 0,   | 0, |
|            | "<KP 3\|",   | 0,    | 0,   | 0, |
|            | "<KP 4\|",   | 0,    | 0,   | 0, |
|            | "<KP 5\|",   | 0,    | 0,   | 0, |
|            | "<KP 6\|",   | 0,    | 0,   | 0, |
|            | "<KP 7\|",   | 0,    | 0,   | 0, |
|            | "<KP 8\|",   | 0,    | 0,   | 0, |
|            | "<KP 9\|",   | 0,    | 0,   | 0, |
|            | "",          | 0,    | 0,   | 0, |
|            | "",          | 0,    | 0,   | 0, |
|            | "",          | 0,    | 0,   | 0, |
|            | "<KP ENTER\|", | 0,  | 0,   | 0, |
|            | "",          | 0,    | 0,   | 0, |
|            | "<SHFT TAB\|", | 047, | 0,  | 0, |
| /*110*/    | "<ALT Q\|",  | 0117, | 033, | 0, |
|            | "<ALT W\|",  | 0117, | 001, | 0, |
|            | "<ALT E\|",  | 0117, | 016, | 0, |
|            | "<ALT R\|",  | 0117, | 004, | 0, |
|            | "<ALT T\|",  | 0117, | 017, | 0, |
|            | "<ALT Y\|",  | 0117, | 002, | 0, |
|            | "<ALT U\|",  | 0117, | 003, | 0, |
|            | "<ALT I\|",  | 0117, | 010, | 0, |
|            | "<ALT O\|",  | 0117, | 037, | 0, |
|            | "<ALT P\|",  | 0117, | 026, | 0, |
|            | "",          | 0,    | 0,   | 0, |
|            | "",          | 0,    | 0,   | 0, |
|            | "",          | 0,    | 0,   | 0, |
|            | "",          | 0,    | 0,   | 0, |
|            | "<ALT A\|",  | 0117, | 036, | 0, |
|            | "<ALT S\|",  | 0117, | 007, | 0, |
| /*120*/    | "<ALT D\|",  | 0117, | 014, | 0, |
|            | "<ALT F\|",  | 0117, | 021, | 0, |
|            | "<ALT G\|",  | 0117, | 022, | 0, |
|            | "<ALT H\|",  | 0117, | 006, | 0, |
|            | "<ALT J\|",  | 0117, | 032, | 0, |
|            | "<ALT K\|",  | 0117, | 012, | 0, |
|            | "<ALT L\|",  | 0117, | 030, | 0, |
|            | "",          | 0,    | 0,   | 0, |
|            | "",          | 0,    | 0,   | 0, |
|            | "",          | 0,    | 0,   | 0, |
|            | "",          | 0,    | 0,   | 0, |
|            | "",          | 0,    | 0,   | 0, |
|            | "<ALT Z\|",  | 0117, | 013, | 0, |
|            | "<ALT X\|",  | 0117, | 031, | 0, |
|            | "<ALT C\|",  | 0117, | 024, | 0, |
|            | "<ALT V\|",  | 0117, | 023, | 0, |
| /*130*/    | "<ALT B\|",  | 0117, | 011, | 0, |
|            | "<ALT N\|",  | 0117, | 027, | 0, |
|            | "<ALT M\|",  | 0117, | 034, | 0, |
|            | "",          | 0,    | 0,   | 0, |
|            | "",          | 0,    | 0,   | 0, |
|            | "",          | 0,    | 0,   | 0, |
|            | "",          | 0,    | 0,   | 0, |

```
               "",                    0,      0,
               "",          ,,        0,      0,
               "",          0,        0,      0,
               "",          0,        0,      0,
               "<F1|",      052,      020,    0,
               "<F2|",      052,      010,    0,
               "<F3|",      052,      004,    0,
               "<F4|",      052,      002,    0,
               "<F5|",      052,      001,    0,
      /*140*/  "<F6|",      052,      030,    0,
               "<F7|",      052,      024,    0,
               "<F8|",      052,      022,    0,
               "<F9|",      052,      021,    0,
               "<F10|",     052,      037,    0,
               "",          0,        0,      0,
               "",          0,        0,      0,
               "<HOME|",    0106,     0,      0,
               "<UP|",      054,      0,      0,
               "<PGUP|",    0103,     0,      0,
               "",          0,        0,      0,
               "<LEFT|",    050,      0,      0,
               "<CENTER|",  0,        0,      0,
               "<RIGHT|",   042,      0,      0,
               "",          0,        0,      0,
               "<END|",     0116,     0,      0,
      /*150*/  "<DOWN|",    043,      0,      0,
               "<PGDN|",    0114,     0,      0,
               "<INS|",     0111,     0,      0,
               "<DEL|",     0101,     0,      0,
               "<SHFT F1|", 052,      040,    020,
               "<SHFT F2|", 052,      040,    010,
               "<SHFT F3|", 052,      040,    004,
               "<SHFT F4|", 052,      040,    002,
               "<SHFT F5|", 052,      040,    001,
               "<SHFT F6|", 052,      040,    030,
               "<SHFT F7|", 052,      040,    024,
               "<SHFT F8|", 052,      040,    022,
               "<SHFT F9|", 052,      040,    021,
               "<SHFT F10|",052,      040,    037,
               "<CTRL F1|", 052,      0112,   020,
               "<CTRL F2|", 052,      0112,   010,
      /*160*/  "<CTRL F3|", 052,      0112,   004,
               "<CTRL F4|", 052,      0112,   002,
               "<CTRL F5|", 052,      0112,   001,
               "<CTRL F6|", 052,      0112,   030,
               "<CTRL F7|", 052,      0112,   024,
               "<CTRL F8|", 052,      0112,   022,
               "<CTRL F9|", 052,      0112,   021,
               "<CTRL F10|",052,      0112,   037,
               "<ALT F1|",  052,      0117,   020,
               "<ALT F2|",  052,      0117,   010,
               "<ALT F3|",  052,      0117,   004,
               "<ALT F4|",  052,      0117,   002,
               "<ALT F5|",  052,      0117,   001,
```

```
            "<ALT F6|",       2,      0117,   030,
            "<ALT F7|",      .2,      0117,   024,
            "<ALT F8|",      052,     0117,   022,
/*170*/     "<ALT F9|",      052,     0117,   021,
            "<ALT F10|",     052,     0117,   037,
            "<CTRL PRTSC|",  0,       0,      0,
            "<CTRL LEFT|",   0,       0,      0,
            "<CTRL RIGHT|",  0,       0,      0,
            "<CTRL END|",    0,       0,      0,
            "<CTRL PGDN|",   0,       0,      0,
            "<CTRL HOME|",   0,       0,      0,
            "<ALT 1|",       0,       0,      0,
            "<ALT 2|",       0,       0,      0,
            "<ALT 3|",       0,       0,      0,
            "<ALT 4|",       0,       0,      0,
            "<ALT 5|",       0,       0,      0,
            "<ALT 6|",       0,       0,      0,
            "<ALT 7|",       0,       0,      0,
            "<ALT 8|",       0,       0,      0,
/*180*/     "<ALT 9|",       0,       0,      0,
            "<ALT 0|",       0,       0,      0,
            "<ALT -|",       0,       0,      0,
            "<ALT =|",       0,       0,      0,
            "<CTRL PGUP|",   0,       0,      0,
            "<F11|",         052,     036,    0,
            "<F12|",         052,     011,    0,
            "<SHFT F11|",    052,     040,    036,
            "<SHFT F12|",    052,     040,    011,
            "<CTRL F11|",    052,     0112,   036,
            "<CTRL F12|",    052,     0112,   011,
            "<ALT F11|",     052,     0117,   036,
            "<ALT F12|",     052,     0117,   011,
            "",              0,       0,      0,
            "",              0,       0,      0,
            "",              0,       0,      0,
/*190*/     "<NUMLOCK|",     0,       0,      0,
            "",              0,       0,      0,
            "<CTRL INS|",    0,       0,      0,
            "<CTRL DEL|",    0,       0,      0,
            "",              0,       0,      0,
            "",              0,       0,      0,
            "",              0,       0,      0,
            "",              0,       0,      0,
            "",              0,       0,      0,
            "",              0,       0,      0,
            "<KP *|",        0,       0,      0,
            "<KP +|",        0,       0,      0,
            "",              0,       0,      0,
            "",              0,       0,      0,
            "<KP .|",        0,       0,      0,
            "<KP /|",        0,       0,      0
};
```

CHORDIC KEYBOARD PATENT

APPENDIX VIII:

BATCONF CODE

```
/* BAT configuration   t */
#define BAT_ID          "BATID**"
define BAT_VERSION     0x0003 struct BAT_CONFIG {
        char    id[10];         /* configuration id              */
        int     version;        /* BAT version                   */
        char    table[14];      /* translation table             */
        int     comm_port;      /* com port                      */
        int     status_display; /* status display flag           */
        int     status_lcol;    /* status display position left  */
        int     status_rcol;    /* status display position right */
        int     beep;           /* status change beep            */
        int     repeat_delay;   /* auto-repeat delay             */
        int     repeat_rate;    /* auto-repeat rate              */
        int     help_timeout;   /* help display timeout          */
        int     snow;           /* CGA snow elimination          */
};
```

CHORDIC KEYBOARD PATENT

APPENDIX IX:

TSR CODE

```
;-- Public declarations of internal functions ---------------------------

PUBLIC  _tsr_init
        PUBLIC  _is_inst
        PUBLIC  _uninst

;-- Public declarations of internal variables ---------------------------

PUBLIC  _current_time

;-- Variables for the interrupt handler ---------------------------------
;-- (only accessible via the code segment) ------------------------------ id_buf          db      (MAX_ID_LEN + 1) dup (0) ; buffer for the ID string
in_bios         dw      ?

;-- Variables needed for activation of the C program -------------------- c_ss    dw      0       ; C stack segment
c_sp    dw      0       ; C stack pointer
c_ds    dw      0       ; C data segment
c_es    dw      0       ; C extra segment
c_psp   dw      0       ; segment addr of the PSP of the C prg ;-- The following variables store the old addresses of the interrupt ---
;-- handler, which will be replaced by the new interrupt handler     --- int13_ptr       equ this dword          ; old interrupt vector 13h
int13_ofs       dw      0               ; offset address of the old handler
int13_seg       dw      0               ; segment address of the old handler int16_ptr       equ this dword          ; old interrupt vector 16h
int16_ofs       dw      0               ; offset address of the old handler
int16_seg       dw      0               ; segment address of the old handler int1C_ptr       equ this dword          ; old interrupt vector 1Ch
int1C_ofs       dw      0               ; offset address of the old handler
int1C_seg       dw      0               ; segment address of the old handler comint_ptr      equ this dword          ; old COM recieve interrupt vector
comint_ofs      dw      0               ; offset address of the old handler
comint_seg      dw      0               ; segment address of the old handler ;-- Variables which store the information of the interrupted -----------
;-- program.                                                 -----------

;stack save variables for interrupt 16
kbd_ss  dw      0               ; SS and SP of the interrupted prg.
kbd_sp  dw      0
kbd_flags dw    0

;stack save variables for com interrupt
com_ss  dw      0               ; SS and SP of the interrupted prg.
com_sp  dw      0
```

Page 3

```
old8259         db      ?                       ; old mask for 8259

;structure for port control blocks
pcbs    struc
portid  dw      ?                       ; COM1 or COM2
pbase   dw      ?                       ; port address
recvec  db      ?                       ; recieve interrupt vector
timeout db      ?                       ; timeout outer loop
imask   db      ?                       ; mask to enable port interrupt
optsI   db      ?                       ; holds extended I options
lchar   db      ?                       ; holds character attributes
oldier  db      ?                       ; old interrupt enable register
oldlcr  db      ?                       ; old line control register
oldmcr  db      ?                       ; old modem control register
olddll  db      ?                       ; old baud low divisor latch
olddlm  db      ?                       ; old baud high divisor latch
pcbs    ends pcb     pcbs    <|                      ; port control block ; baud rate table for UART initialization
bauds   dw      0417h                   ; 110 baud
        dw      0300h                   ; 150 baud
        dw      0180h                   ; 300 baud
        dw      00C0h                   ; 600 baud
        dw      0060h                   ; 1200 baud
        dw      0030h                   ; 2400 baud
        dw      0018h                   ; 4800 baud
        dw      000Ch                   ; 9600 baud _rsint  proc    near
;
;       COM recieve interrupt handler
;

com_recv:
        ; point to port control block with ds:si
        pushf                           ; save flags
        cli                             ; disable interrupts
        push    ds
        push    si
        mov     si, cs
        mov     ds, si
        lea     si, pcb mov     cs:com_ss, ss           ; save current stack segment and
        mov     cs:com_sp, sp           ; stack pointer mov     ss, cs:c_ss             ; activate the C program's stack
        mov     sp, cs:c_sp push    ax
        push    bx
        push    cx
```

```
        push    dx
        push    bp
        push    ds
        push    es mov     dx, [si].pbase
        in      al, dx              ; read character and clear interrupt
        mov     ah, 0
        push    ax                  ; pass the character on the stack
        mov     al, 020h
        out     020h, al mov     ds, cs:c_ds         ; set segment registers for the C
        mov     es, cs:c_es         ; program sti
        call    near ptr _c_store_char  ; call the start function of the C prg.

pop     ax
        pop     es
        pop     ds
        pop     bp
        pop     dx
        pop     cx
        pop     bx
        pop     ax cli
        mov     ss, cs:com_ss       ; reset stack pointer and stack segment
        mov     sp, cs:com_sp       ; of the interrupted program
        sti pop     si
        pop     ds
        popf                        ; re-enable interrupts - maybe
        iret _rsint  endp ;-------------------------------------------------------------------
;-- The interrupt routine for int16 and int 13 ---------------------
;------------------------------------------------------------------- int13   proc    far mov     cs:in_bios, 1       ; set flag and show that the BIOS disk
                                    ; interrupt is active
        pushf                       ; call the old interrupt handler
        call    cs:int13_ptr        ; simulate via int 13h
        mov     cs:in_bios, 0       ; BIOS disk interrupt no longer active ret     2                   ; back to the caller, but don't remove
                                    ; the flag reg from the stack first
int13   endp
```

Page 5

```
int1C   proc    far
        push    ds
        mov     ds, cs:c_ds             ; application's data segment
        add     _current_time,1         ; high word
        adc     time_high, 0            ; increment timer
        pop     ds
        pushf                           ; call the old interrupt handler
        call    cs:int1C_ptr            ; simulate via int 1Ch ret     2                       ; back to the caller, but don't remove
                                        ; the flag reg from the stack first
int1C   endp ;-- the new interrupt 16h handler --------------------------------------- int16   proc far
        push    ax                      ; save flags
        pushf
        pop     ax
        mov     cs:kbd_flags, ax
        pop     ax
        cmp     cs:in_bios, 0           ; BIOS disk interrupt active?
        jne     id_end                  ; YES ---| id_end cli
        mov     cs:kbd_ss, ss           ; save current stack segment and
        mov     cs:kbd_sp, sp           ; stack pointer
        mov     ss, cs:c_ss             ; activate the C program's stack
        mov     sp, cs:c_sp
        sub     sp, 200                 ; don't clobber the comm interrupt's stack
        sti push    ax                      ; save the processor registers on the
        push    bx                      ; C stack
        push    cx
        push    dx
        push    bp
        push    si
        push    di
        push    ds
        push    es mov     ds, cs:c_ds             ; set segment register for the C
        mov     es, cs:c_es             ; program call    near ptr _c_retrieve    ; call the start function of the C prg.

;-- perform context change back to to the interrupted program -------
        pop     es
        pop     ds
        pop     di
        pop     si
        pop     bp
        pop     dx
```

```
            pop     cx
            pop     bx
            pop     ax cli                             ; disable interrupts
            mov     ss, cs:kbd_ss           ; reset stack pointer and stack segment
            mov     sp, cs:kbd_sp           ; of the interrupted program
            sti                             ; re-enable interrupts
    id_end:
            push    ax                      ; reload flags
            mov     ax, cs:kbd_flags
            push    ax
            popf
            pop     ax
            pushf                           ; simulate calling the old interrupt
            call    cs:int16_ptr            ; handler via int 16h
            ret     2                       ; back to the caller, but don't remove flags
    int16   endp ;-------------------------------------------------------------------
    ;-- TSR_INIT: ends the C program and makes the new interrupt -----------
    ;--          interrupt handler active
    ;-- Call from C: void tsr_init( port_no, baud );

_tsr_init       proc near
            cli                             ; clear interrupts
            mov     bp, sp                  ; move SP to BP ; save registers in case we need to return
            push    ax
            push    bx
            push    cx
            push    dx
            push    bp
            push    si
            push    di
            push    ds
            push    es push    ds                      ; save ds for use later ;-- save the C segment registers ------------------------------ mov     cs:c_ss, ss             ; store the registers in the
            mov     cs:c_sp, sp             ; corresponding variables
            mov     cs:c_es, es
            mov     cs:c_ds, ds ;-- copy the ID string into the internal buffer -------------

TRACE   '.'                     ; 1
            lea     si, ig_string           ; DS:SI now points to the string
            push    cs                      ; move CS to the stack
            pop     es                      ; and restore as ES
```

```
                mov     di, offset id_buf       ; ES:DI now points to ID_BUF
                mov     cx, MAX_ID_LEN          ; copy maxmimum of MAX_ID_LEN chars
ti0:            mov     al, ds:[si]             ; get character from string
                mov     es:[di], al             ; and place in internal buffer
                inc     si                      ; bump si
                inc     di                      ; and di
                or      al, al                  ; test for end of string
                loopne  ti0                     ; continue if char!=0 and CX!=0
                mov     es:[di], al             ; NULL out destination string ;-- get the addresses of the interrupt handler --------------- mov     ax, cs                  ; CS to AX and then load into DS
                mov     ds, ax mov     ax, 3513h               ; get interrupt vector 13h
                int     21h                     ; call DOS interrupt
                mov     int13_ofs, bx           ; store address of the handler in the
                mov     int13_seg, es           ; corresponding variables mov     ax, 351Ch               ; get interrupt vector 1Ch
                int     21h                     ; call DOS interrupt
                mov     int1C_ofs, bx           ; store address of the handler in the
                mov     int1C_seg, es           ; corresponding variables mov     ax, 3516h               ; get interrupt vector 16h
                int     21h                     ; call DOS interrupt
                mov     int16_ofs, bx           ; store address of the handler in the
                mov     int16_seg, es           ; corresponding variables TRACE   '.'                     ; 2
                ; initialize constant parts of each COM pcb
                mov     ax, 040h                ; bios data segment
                mov     es, ax
                lea     si, pcb
                sub     di, di                  ; com pcb address
                mov     bx, 07Ch                ; offset to com1 base address
                mov     ax, [bp + 2]            ; offset to com1 timeout
                cmp     ax, 1                   ; ax has the port number
                jz      init_com2 mov     cl, not C1MASK          ; com1 interrupt mask
                mov     [si].portid, 0          ; com1 port id
                mov     [si].recvec, 0Ch        ; com1 recieve interrupt vector
                jmp     short init_pcb
init_com2:
                inc     di
                inc     di                      ; offset to com2 base address
                inc     bx                      ; offset to com2 timeout
                mov     cl, not C2MASK          ; com2 interrupt mask
                mov     [si].portid, 1          ; com2 port id
                mov     [si].recvec, 0Bh        ; com2 recieve interrupt vector
```

```
; subroutine to initialize parts of a pcb
init_pcb:
        TRACE   '.'                     ; 3 mov     dx, es:[di]             ; port base from bios
        mov     [si].pbase, dx
        mov     al, es:[bx]
        mov     [si].timeout, al        ; copy timeout from bios
        mov     [si].imask, cl          ; save interrupt mask ; save old status of interrupt controller and uarts in      al, 021h
        mov     old8259, al
        lea     si, pcb                 ; coml pcb ; routine to save uart status mov     dx, [si].pbase
        or      dx, dx
        jz      no_port                 ; no port
        add     dx, 3
        in      al, dx
        and     al, 07Fh
        mov     [si].oldlcr, al         ; line control register
        mov     al, 080h
        out     dx, al                  ; set access to baud divisors
        sub     dx, 3
        in      al, dx
        mov     [si].olddll, al         ; baud divisor low
        inc     dx
        in      al, dx
        mov     [si].olddlm, al         ; baud divisor high
        add     dx, 2
        mov     al, [si].oldlcr
        out     dx, al                  ; restore register access
        inc     dx
        in      al, dx
        mov     [si].oldmcr, al         ; modem control register
        sub     dx, 3
        in      al, dx
        mov     [si].oldier, al         ; interrupt enable register
        jmp     short set_port
no_port:
        pop     ds                      ; pop original data segment pop     es
        pop     ds
        pop     di
        pop     si
        pop     bp
        pop     dx
        pop     cx
```

```
              pop     bx
              pop     ax
              ret set_port:
        ; save old COM recieve vector, install new COM handler

TRACE   '.'                     ; 4 cli
              mov     al, [si].recvec         ; get old interrupt vector
              mov     ah, 35h
              int     21h                     ; call DOS interrupt
              mov     comint_ofs, bx          ; store address of the handler in the
              mov     comint_seg, es          ; corresponding variables
              mov     al, [si].recvec         ; set new interrupt vector
              mov     ah, 025h
              lea     dx, com_recv            ; DS:DX stores the addr of the handler
              int     021h

TRACE   '.'                     ; 5

; assert flow control signals and enable port interrupts mov     dx, [si].pbase          ; dx has pbase in it
              add     dx, 4                   ; pbase + 4 ( modem control )
              mov     al, DTR or RTS or OUT2  ; set DTR & RTS high, enable ints
              out     dx, al                  ;
              in      al, 021h
              and     al, [si].imask
              out     021h, al                ; unmask com port on int controller
              sub     dx, 3                   ; pbase + 1 ( interrupt enable )
              mov     al, 1
              out     dx, al                  ; enable receive int on uart ; set up baud rates and character attributes
        ; al bits 5-7 -| baud
        ;         4-3 -| parity (00 - none)
        ;          2  -| stop bits (0 - 1 stop bit)
        ;         1-0 -| word length (11 - 8 bits)

TRACE   '.'                     ; 6 add     dx, 2                   ; pbase + 3 ( line control )
              mov     ax, [bp + 4]            ; ax has baud rate info mov     bl, al
              and     al, 01Fh
              mov     [si].lchar, al mov     cl, 4
              rol     bl, cl
              and     bx, 0Eh                 ; isolate baud rate selection
              mov     al, 080h
```

Page 10

```
        out     dx, al                  ; set dlab to load baud rate divisor
        mov     ax, [bx+bauds]
        sub     dx, 3                   ; pbase + 0
        out     dx, al                  ; set low order divisor on uart
        inc     dx                      ; pbase + 1
        mov     al, ah
        out     dx, al                  ; set high order divisor on uart inc     dx                      ; pbase + 2
        inc     dx                      ; pbase + 3 ( line control )
        mov     al, [si].lchar
        or      al, 040h
        out     dx, al                  ; set character attributes mov     dx, [si].pbase
        add     dx, 5                   ; pbase + 5 ( line status )
        in      al, dx                  ; line status inc     dx                      ; pbase + 6 ( modem status )
        in      al, dx                  ; modem status ;-- install the new interrupt handlers ----------------------

TRACE   '.'                     ; 7 mov     ax, 2513h               ; ftn. no.: set interrupt 13h
        lea     dx, int13               ; DS:DX stores the addr of the handler
        int     21h                     ; call DOS interrupt mov     ax, 2516h               ; ftn. no.: set interrupt 16h
        lea     dx, int16               ; DS:DX stores the addr of the handler
        int     21h                     ; call DOS interrupt mov     ax, 251Ch               ; ftn. no.: set interrupt 1Ch
        lea     dx, int1C               ; DS:DX stores the addr of the handler
        int     21h                     ; call DOS interrupt ;-- calculate number of paragraphs which must remain --------
;-- in memory.                                       --------

TRACE   '.'                     ; 8 pop     ds                      ; need original data segment here
        sti
        call    near ptr _sbrk          ; call C function SBRK
                                        ; AX contains the end addr of the heap
        mov     dx, ax                  ; get break address into DX
        add     dx, 15                  ; avoid loss through integer division
        mov     cl, 4                   ; shift 4 times to the right and then
        shr     dx, cl                  ; divide by 16
        mov     ax, ds                  ; move AX to DS
        mov     bx, _psp                ; get segment address of the PSP
        mov     cs:c_psp, bx            ; save in a variable
        sub     ax, bx                  ; subtract DS from PSP
```

Page 11

```
            add     dx, ax                  ; and add to the number of paragraphs
            mov     ax, 3100h               ; ftn. no.: end resident program push    ax                      ; display " OK/n"
            push    bx
            mov     ah, 0Eh
            mov     bx, 0
            mov     al, ' '
            int     10h
            mov     al, 'O'
            int     10h
            mov     al, 'K'
            int     10h
            mov     al, 0Dh
            int     10h
            pop     bx
            pop     ax int     21h                     ; call DOS interrupt and end program _tsr_init   endp ;----------------------------------------------------------------
;-- IS_INST: determines if the program is already installed ------------
;-- Call from C : int ist_inst();
;-- Return value: 1, if the program was already installed, else 0

_is_inst    proc near
            push    di                      ; save DI on the stack
            push    si                      ; save SI on the stack
            push    es                      ; save ES on the stack ;-- determine segment address of the current int 9 handler -- mov     ax, 3516h               ; get interrupt vector 16h
            int     21h                     ; DOS interrupt puts seg addr in ES
            mov     di, offset id_buf       ; ES:DI points to installed ID_BUF
            lea     si, ig_string           ; DS:SI points to the ID_STRING passed
            mov     cx, 0                   ; return code: not installed isi0:       mov     al, ds:[si]             ; load character from the string
            cmp     al, es:[di]             ; compare to other string
            jne     not_inst                ; not equal --| NOT_INST
            inc     si                      ; increment pointer in String1
            inc     di                      ; increment pointer in String2
            or      al,al                   ; end of string reached?
            jne     isi0                    ; no, keep comparing --| ISI0 mov     cl,1                    ; yes --| the program is installed not_inst:   mov     ax,cx                   ; get return code from ax
            pop     es                      ; restore saved registers from stack
            pop     si
            pop     di
```

```
            retn                              ; back to the caller

_is_inst        endp                          ; end of the procedure

;-----------------------------------------------------------------------
;-- UNINST: reinstalls the TSR program and releases the allocated ------
;--        memory again.
;-- Call from C : void uninst();
;-- Note        : This function should be called only when a prior call
;--              to IS_INST() has returned the value 1.

_uninst         proc near assume  es:IGROUP              ;allow access to the CS variables via ES push    ax
        push    bx
        push    cx
        push    dx
        push    si
        push    di
        push    ds
        push    es cli                            ; don't allow interrupts mov     ax, 3516h              ; get interrupt vector 16h
        int     21h                    ; DOS interrupt puts seg addr in ES mov     ax, 2513h              ; ftn. no.: set handler for int 13
        mov     ds, es:int13_seg       ; segment address of the old handler
        mov     dx, es:int13_ofs       ; offset address of the old handler
        int     21h                    ; reinstall the old handler mov     ax, 2516h              ; ftn. no.: set handler for int 16
        mov     ds, es:int16_seg       ; segment address of the old handler
        mov     dx, es:int16_ofs       ; offset address of the old handler
        int     21h                    ; reinstall the old handler mov     ax, 251Ch              ; ftn. no.: set handler for int 1C
        mov     ds, es:int1C_seg       ; segment address of the old handler
        mov     dx, es:int1C_ofs       ; offset address of the old handler
        int     21h                    ; reinstall the old handler
;
;       remove COM interrupt handler and restore port
;
        ; remove COM handler
        mov     al, es:[si].recvec
        mov     ah, 25h
        mov     ds, es:comint_seg      ; segment address of the old handler
        mov     dx, es:comint_ofs      ; offset address of the old handler
        int     21h                    ; reinstall the old handler
```

Page 13

```
            mov     ax, es                  ; DS is same as old infogrip's CS
            mov     ds, ax
            lea     si, pcb                 ; COM pcb ; restore interrupt controller
            mov     ah, old8259
            mov     al, [si].imask
            not     al
            and     ah, al
            in      al, 021h
            and     al, [si].imask
            or      al, ah
            out     021h, al
            sti ; routine to restore uart status
            mov     dx, [si].pbase
            or      dx, dx
            jz      no_port2                ; no port
            add     dx, 3
            mov     al, 080h
            out     dx, al                  ; set access to baud divisors
            sub     dx, 3
            mov     al, [si].olddll
            out     dx, al                  ; baud divisor low
            inc     dx
            mov     al, [si].olddlm
            out     dx, al                  ; baud divisor high
            add     dx, 2
            mov     al, [si].oldlcr
            out     dx, al                  ; line control register
            inc     dx
            mov     al, [si].oldmcr
            out     dx, al                  ; modem control register
            sub     dx, 3
            mov     al, [si].oldier
            out     dx, al                  ; interrupt enable register no_port2:
            mov     es, esic_psp            ; seg addr of the PSP of the TSR prg
            mov     cx, es                  ; save in CX
            mov     es, es:[ 02ch ]         ; get seg addr of environment from PSP
            mov     ah, 49h                 ; ftn. no.: release allocated memory
            int     21h                     ; call DOS interrupt mov     es, cx                  ; restore ES from CX
            mov     ah, 49h                 ; ftn. no.: release allocated memory
            int     21h                     ; call DOS interrupt pop     es
            pop     ds
            pop     di
            pop     si
            pop     dx
```

Page 14

```
        pop     cx
        pop     bx
        pop     ax retn assume  es:DGROUP           ; combine ES with DGROUP again _uninst endp                        ; end of the procedure _text   ends                        ; end of the code segment
        end                         ; end of the program
```

CHORDIC KEYBOARD PATENT

APPENDIX X:

BATVIDEO CODE

```
;       Static Name A      s
;
        TITLE   igvideo.asm
        .8087
INCLUDELIB      SLIBCE
_TEXT   SEGMENT WORD PUBLIC 'CODE'
_TEXT   ENDS
_DATA   SEGMENT WORD PUBLIC 'DATA'
_DATA   ENDS
CONST   SEGMENT WORD PUBLIC 'CONST'
CONST   ENDS
_BSS    SEGMENT WORD PUBLIC 'BSS'
_BSS    ENDS
DGROUP  GROUP   CONST, _BSS, _DATA
        ASSUME DS: DGROUP, SS: DGROUP
EXTRN   _cga_snow:WORD
_TEXT   SEGMENT bootflg dw      72H, 40H

ASSUME  CS: _TEXT

; C call:
;       void put_video( char *str, char far *video, int length )

PUBLIC  _put_video
_put_video      PROC NEAR
        push    bp
        mov     bp, sp
        push    di
        push    si mov     si, WORD PTR [bp+4]     ; DS:SI = str
        mov     bx, WORD PTR [bp+6]     ; ES:BX = video
        mov     es, WORD PTR [bp+8]
        mov     cx, WORD PTR [bp+10]    ; CX = length
        cmp     cx, 0                   ; check for 0 length
        je      put_exit
        cmp     WORD PTR _cga_snow, 0   ; check for CGA mode
        je      put_loop
        mov     dx, 3daH
retrace2:                               ; wait for vertical retrace
        in      al, dx
        and     al, 08H
        jz      retrace2
put_loop:
        lodsb                           ; move buffer to video
        mov     BYTE PTR es:[bx], al
        inc     bx                      ; bump video pointer
        inc     bx
        loop    put_loop                ; loop if count != 0
put_exit:
        pop     si
        pop     di
        mov     sp, bp
        pop     bp
        ret
        nop
```

Page 2

```
_put_video      ENDP

; C call:
;       void reboot( void )

PUBLIC  _reboot
_reboot PROC NEAR
        les     di, dword ptr [bootflg]

mov     ax, 0               ; cold boot
;       mov     ax, 01234H          ; warm boot
        mov     word ptr es:[di], ax
        cli
        xor     ax, ax
        mov     ds, ax
        mov     es, ax
        mov     ss, ax
        mov     sp, ax
kbwait:
        in      al, 64H             ; wait on AT keyboard controller
        test    al, 2
        jne     kbwait xor     al, al              ; try reset lines
        out     64H, al
        nop
        nop
        nop
        mov     al, 0feH
        out     64H, al
        nop
        nop
        nop
        mov     ax, 0002H           ; jump to reset vector via IRET
        push    ax
        mov     ax, 0f000H
        push    ax
        mov     ax, 0fff0H
        push    ax
        iret _reboot ENDP

IF      0

; C call:
;       int cmp_video( char *str, char far *video, int length )

PUBLIC  _cmp_video
_cmp_video      PROC NEAR
        push    bp
        mov     bp, sp
        push    di
        push    si
```

Page 3

```
        mov     di, WORD PTR [bp+4]      ; DS:DI = str
        mov     si, WORD PTR [bp+6]      ; ES:SI = video
        mov     es, WORD PTR [bp+8]
        mov     cx, WORD PTR [bp+10]     ; CX = compare length
        cmp     cx, 0
        je      cmp_exit
        cmp     WORD PTR _cga_snow, 0    ; check for CGA mode
        je      cmp_lp
        mov     dx, 3daH
retrace1:                                ; wait for vertical retrace
        in      al, dx
        and     al, 08H
        jz      retrace1
cmp_lp:
        mov     al, BYTE PTR [di]        ; compare buffer to video
        cmp     BYTE PTR es:[si], al
        jne     exit_neq
        inc     di                       ; bump buffer pointer
        inc     si                       ; bump video pointer
        inc     si
        loop    cmp_lp                   ; loop if count != 0
        mov     ax,1                     ; return( 1 );
        jmp     SHORT cmp_exit
exit_neq:
        sub     ax, ax                   ; return( 0 );
cmp_exit:
        pop     si
        pop     di
        mov     sp, bp
        pop     bp
        ret
        nop _cmp_video      ENDP ; C call:
;       void exchange_video( char *out, char *in, char far *video, int length )

PUBLIC  _exchange_video
_exchange_video PROC NEAR
        push    bp
        mov     bp, sp
        push    di
        push    si mov     si, WORD PTR [bp+4]      ; DS:SI = out
        mov     di, WORD PTR [bp+6]      ; DS:DI = in
        mov     bx, WORD PTR [bp+8]      ; ES:BX = video
        mov     es, WORD PTR [bp+10]
        mov     cx, WORD PTR [bp+12]     ; CX = length cmp     cx, 0                    ; check for 0 length
        je      exchg_exit
        cmp     WORD PTR _cga_snow, 0
```

Page 4

```
        je      exchg_loop
        mov     dx, 3daH
retrace3:                       ; wait for vertical retrace
        in      al, dx
        and     al, 08H
        jz      retrace3
exchg_loop:
        mov     al, BYTE PTR es:[bx]    ; save old video character
        mov     BYTE PTR [di], al
        mov     al, BYTE PTR [si]       ; get new video character
        mov     BYTE PTR es:[bx], al
        inc     si              ; bump input pointer
        inc     di              ; bump output pointer
        inc     bx              ; bump video pointer
        inc     bx
        loop    exchg_loop
exchg_exit:
        pop     si
        pop     di
        mov     sp, bp
        pop     bp
        ret _exchange_video ENDP

ENDIF

_TEXT   ENDS
END
```

We claim:

1. A chordic keyboard system in a data processing apparatus, wherein the chordic keyboard system is used to communicate with a chordic keyboard including a plurality of keys, the chordic keyboard system comprising:

means for storing data representative of a plurality of chords, wherein each chord corresponds to a subset of the plurality of keys of the chordic keyboard, and for storing a plurality of symbols, wherein data representative of a chord corresponds to one of the plurality of symbols according to a correlation between a frequency-of-use index of the symbol and a composite chord-difficulty index of the chord, the composite chord-difficulty index being computed by ranking the plurality of chords based on a sum of a first index and a second index, the first index ranking the chords based on the ability of humans to memorize an association of the chords with a pattern and the second index ranking the chords based on the biomechanical and motor difficulty of inputting the chords;

means for receiving data from the chordic keyboard identifying a selected chord of the plurality of chords;

means for identifying a selected symbol of the plurality of symbols representative; of the selected chord; and means, coupled to the identifying means, for generating a signal corresponding to the selected symbol.

2. A chordic keyboard system in a data processing apparatus, wherein the chordic keyboard system is used to communicate with a chordic keyboard including a plurality of keys, the chordic keyboard system comprising:

means for storing data representative of a plurality of chords, the data organized as a plurality of groups, wherein each chord corresponds to a subset of the plurality of keys of the chordic keyboard, and for storing a plurality of symbols, wherein data representative of a chord is represented by and corresponds to one of the plurality of symbols according to a correlation between a frequency-of-use index of the symbol and a composite chord-difficulty index of the chord, and wherein the plurality of groups includes an alphabetic group and a cursor control group;

means for receiving data from the chordic keyboard identifying a selected chord of the plurality of chords;

means for identifying, using the stored data and symbols, the group corresponding to the selected chord, and for identifying a selected symbol of the plurality of symbols representative of the selected chord; and means, coupled to the identifying means, for generating a signal corresponding to the selected symbol.

3. A chordic keyboard system in a data processing apparatus, wherein the chordic keyboard system communicates with a chordic keyboard in a plurality of modes, including a let-mode and a num-mode, wherein said chordic keyboard includes a plurality of keys, the chordic keyboard system comprising:

means for storing data representative of a plurality of chords, the data organized as a plurality of data groups, wherein each chord corresponds to a subset of the plurality of keys of the chordic keyboard, and for storing a plurality of symbols, wherein data representative of a chord is mapped to one of the plurality of symbols based on a correlation between a plurality of symbol-groups and a plurality of chord groups in which each of the symbols is assigned to one of the symbol-groups based on a frequency-of-use index of the symbol and each chord is assigned one of the chord groups based on a composite chord-difficulty index of the chord, wherein the composite chord-difficulty index includes both a motor difficulty index and a perceptual difficulty index corresponding to the chord, and wherein the plurality of data groups includes an alphabetic group and a cursor control group;

means for receiving data from the chordic keyboard identifying a selected chord of the plurality of chords and for recognizing that the received data corresponds to a depression of the plurality of keys of the chordic keyboard, wherein the keys are divided into a plurality of groups, including at least one of the following groups: a finger group and a thumb group, wherein the finger group includes a plurality of keys including an index-finger key, a middle-finger key, a ring-finger key, and a little-finger key, and wherein the thumb group includes a plurality of keys including a first thumb key, a second thumb key and a third thumb key;

means for identifying, using the stored data and symbols, the group corresponding to the selected chord, and for identifying a selected symbol of the plurality of symbols representative of the selected chord; and means, coupled to the identifying means, for generating a signal corresponding to the selected symbol.

4. The chordic keyboard system of claim 3 wherein the plurality of symbols includes data representative of the following characters: a, b, c, d, e, f, g, h, i, j, k, l, m, n, o, p, q, r, s, t, u, v, w, x, y, z, and a character representative of a blank space.

5. The chordic keyboard system of claim 4 wherein an operator operates the chordic keyboard, and wherein the receiving means includes means for receiving, in the let-mode, data indicating that the operator has depressed the index-finger key and the middle finger key to identify the selected chord, and wherein the identifying means includes means for identifying data representative of the character "d" as the selected symbol.

6. The chordic keyboard system of claim 4 wherein an operator operates the chordic keyboard, and wherein the receiving means includes means for receiving, in the let-mode, data indicating that the operator has depressed the ring-finger key to identify the selected chord, and wherein the identifying means includes means for identifying data representative of the character "y" as the selected symbol.

7. The chordic keyboard system of claim 4 wherein an operator operates the chordic keyboard, and wherein the receiving means includes means for receiving, in the let-mode, data indicating that the operator has depressed the second thumb key and wherein the identifying means includes means for identifying data representative of the blank space.

8. The chordic keyboard system of claim 4 wherein an operator operates the chordic keyboard, and wherein the receiving means includes means for receiving, in the let-mode, data indicating that the operator has depressed the index-finger key and the little-finger key to identify the selected chord, and wherein the identifying means includes means for identifying data representative of the character "b" as the selected symbol.

9. The chordic keyboard system of claim 8 wherein the identifying means further includes means for identifying data representative of the character "b" in the let-mode as data representative of a mathematical operator "\" in the hum-mode.

* * * * *

UNITED STATES PATENT AND TRADEMARK OFFICE
CERTIFICATE OF CORRECTION

PATENT NO.: 5,642,108

DATED: June 24, 1997

INVENTOR(S): Gopher et al.

It is certified that an error appears in the above-identified patent and that said Letters Patent is hereby corrected as shown below:

Claim 1, column 187, line 24, "representative; of" should read --representative of--.

Claim 9, column 188, line 65, "hum-mode" should read --num-mode--.

Signed and Sealed this

Ninth Day of September, 1997

*Attest:*

BRUCE LEHMAN

*Attesting Officer*      *Commissioner of Patents and Trademarks*